US008079432B2

(12) United States Patent
Ohm et al.

(10) Patent No.: US 8,079,432 B2
(45) Date of Patent: *Dec. 20, 2011

(54) MANEUVERING ROBOTIC VEHICLES HAVING A POSITIONABLE SENSOR HEAD

(75) Inventors: Timothy R. Ohm, Grover Beach, CA (US); Michael Bassett, Needham, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/652,478

(22) Filed: Jan. 5, 2010

(65) Prior Publication Data

US 2010/0116566 A1   May 13, 2010

Related U.S. Application Data

(63) Continuation of application No. 11/842,868, filed on Aug. 21, 2007, now Pat. No. 7,654,348.

(60) Provisional application No. 60/883,731, filed on Jan. 5, 2007, provisional application No. 60/828,611, filed on Oct. 6, 2006.

(51) Int. Cl.
*B62D 55/00* (2006.01)
*B62B 5/02* (2006.01)

(52) U.S. Cl. ......... 180/9.32; 180/907; 180/9.3; 180/8.2; 180/8.3; 180/8.4; 180/8.5; 280/5.32; 280/5.26; 280/5.28; 901/1; 901/47

(58) Field of Classification Search .................. None
See application file for complete search history.

(56) References Cited

U.S. PATENT DOCUMENTS

| | | | |
|---|---|---|---|
| 1,069,761 A | 8/1913 | Buckley |
| 2,917,120 A | 12/1959 | Gates et al. |
| 3,092,200 A | 6/1963 | Chambers |
| 3,166,138 A | 1/1965 | Dunn, Jr. |
| 3,288,234 A | 11/1966 | Feliz |
| 3,311,424 A | 3/1967 | Taylor |
| 3,489,236 A | 1/1970 | Goodwin |
| 3,869,011 A | 3/1975 | Jensen |
| 4,009,761 A | 3/1977 | Meyer |
| 4,027,889 A | 6/1977 | Krofchalk et al. |
| 4,247,125 A | 1/1981 | Rayment |
| 4,477,998 A | 10/1984 | You |
| 4,483,407 A | 11/1984 | Iwamoto et al. |
| 4,492,058 A | 1/1985 | Goldfarb et al. |

(Continued)

FOREIGN PATENT DOCUMENTS

EP   0206930   12/1986

(Continued)

OTHER PUBLICATIONS

PackBot "iRobot PackBot Explorer" Brochure.

(Continued)

*Primary Examiner* — Paul N Dickson
*Assistant Examiner* — Marlon A Arce
(74) *Attorney, Agent, or Firm* — Fish & Richardson P.C.

(57) ABSTRACT

Configurations are provided for vehicular robots or other vehicles to provide shifting of their centers of gravity for enhanced obstacle navigation. Various head and neck morphologies are provided to allow positioning for various poses such as a stowed pose, observation poses, and inspection poses. Neck extension and actuator module designs are provided to implement various head and neck morphologies. Robot control network circuitry is also provided.

22 Claims, 44 Drawing Sheets

U.S. PATENT DOCUMENTS

| | | |
|---|---|---|
| 4,566,550 A | 1/1986 | Misawa |
| 4,566,551 A | 1/1986 | Feliz |
| 4,570,954 A | 2/1986 | Mintz |
| 4,645,222 A | 2/1987 | Hester |
| 4,674,585 A | 6/1987 | Barlow et al. |
| 4,687,068 A | 8/1987 | Pagett |
| 4,688,813 A | 8/1987 | Misawa et al. |
| 4,702,331 A | 10/1987 | Hagihara et al. |
| 4,709,773 A | 12/1987 | Clement et al. |
| 4,730,684 A | 3/1988 | Pedersen |
| 4,813,906 A | 3/1989 | Matsuyama et al. |
| 4,898,256 A | 2/1990 | Lehner |
| 4,919,489 A | 4/1990 | Kopsco |
| 4,932,491 A | 6/1990 | Collins, Jr. |
| 4,932,831 A * | 6/1990 | White et al. ............... 414/732 |
| 4,977,971 A | 12/1990 | Crane, III et al. |
| 4,993,912 A | 2/1991 | King et al. |
| 5,022,812 A | 6/1991 | Coughlan et al. |
| 5,040,626 A * | 8/1991 | Paynter ............... 180/8.1 |
| 5,174,405 A | 12/1992 | Carra et al. |
| 5,197,558 A | 3/1993 | Misawa |
| 5,248,008 A | 9/1993 | Clar |
| 5,308,098 A | 5/1994 | Shea |
| 5,337,846 A | 8/1994 | Ogaki et al. |
| 5,413,367 A | 5/1995 | Ochiai |
| 5,413,454 A * | 5/1995 | Movsesian ............... 414/729 |
| 5,435,405 A * | 7/1995 | Schempf et al. ............... 180/9.1 |
| 5,443,354 A | 8/1995 | Stone et al. |
| 5,451,135 A * | 9/1995 | Schempf et al. ............... 414/694 |
| 5,507,358 A | 4/1996 | Abe et al. |
| 5,513,716 A * | 5/1996 | Kumar et al. ............... 180/8.3 |
| 5,515,934 A | 5/1996 | Davis |
| 5,579,857 A | 12/1996 | Abe et al. |
| 5,833,248 A | 11/1998 | Eguchi |
| 5,868,403 A | 2/1999 | Culp et al. |
| 5,884,718 A | 3/1999 | Yamashiro et al. |
| 5,890,553 A | 4/1999 | Bar-Cohen et al. |
| 5,921,843 A | 7/1999 | Skrivan et al. |
| 6,099,091 A | 8/2000 | Campbell |
| 6,113,343 A * | 9/2000 | Goldenberg et al. ......... 414/729 |
| 6,144,180 A | 11/2000 | Chen et al. |
| 6,158,536 A | 12/2000 | Misawa |
| 6,216,807 B1 | 4/2001 | Eckhoff |
| 6,263,989 B1 | 7/2001 | Won |
| 6,267,196 B1 | 7/2001 | Wilcox et al. |
| 6,431,296 B1 | 8/2002 | Won |
| 6,523,629 B1 | 2/2003 | Buttz et al. |
| 6,619,414 B2 | 9/2003 | Rau |
| 6,662,889 B2 | 12/2003 | De Fazio et al. |
| 6,999,849 B2 | 2/2006 | Bridges |
| 7,083,013 B2 | 8/2006 | Chuan |
| 7,266,421 B1 * | 9/2007 | Blayrac et al. ............... 700/217 |
| 7,348,747 B1 | 3/2008 | Theobold et al. |
| 7,464,775 B2 | 12/2008 | Clemens et al. |
| 7,475,745 B1 | 1/2009 | DeRoos |
| 7,556,108 B2 | 7/2009 | Won |
| 7,654,348 B2 | 2/2010 | Ohm et al. |
| 7,784,570 B2 | 8/2010 | Couture et al. |
| 7,793,743 B2 | 9/2010 | Kamimura |
| 2001/0047895 A1 | 12/2001 | DeFazio |
| 2002/0062999 A1 | 5/2002 | De-Noor et al. |
| 2002/0189871 A1 | 12/2002 | Won |
| 2003/0183428 A1 | 10/2003 | Hedeen |
| 2006/0037789 A1 | 2/2006 | Kritman et al. |
| 2007/0029117 A1 | 2/2007 | Goldenberg et al. |
| 2008/0009313 A1 | 4/2008 | Couture et al. |
| 2008/0093131 A1 * | 4/2008 | Couture et al. ............... 180/9.1 |
| 2008/0143065 A1 * | 6/2008 | DeFazio et al. ............... 280/5.28 |
| 2008/0223630 A1 * | 9/2008 | Couture et al. ............... 180/9.32 |
| 2008/0296853 A1 * | 12/2008 | Langford et al. ............... 280/5.22 |
| 2008/0316306 A1 * | 12/2008 | Burkle et al. ............... 348/86 |

FOREIGN PATENT DOCUMENTS

| | | |
|---|---|---|
| EP | 1502843 | 2/2005 |
| JP | 60176871 | 9/1985 |
| JP | 61160366 | 7/1986 |
| JP | 63203483 | 8/1988 |
| JP | 6032263 | 2/1994 |
| JP | 8152916 | 6/1996 |
| WO | WO 89/00928 | 2/1989 |

OTHER PUBLICATIONS

PackBot "Tactical Mobile Robot" Brochure.

PackBot "Hazardous Duty Mobile Robot" Brochure.

Autonomous Mobile Robots, Chapter 2; Locomotion Concepts Oct. 9, 2004.

"The Personal Rover" The Robotics Institute Carnegie Mellon University Pittsburgh, PA 15213; 2002.

International Search Report and Written Opinion in connection with International Application No. PCT/US2007/080138 dated Jun. 25, 2009, 68 pages.

Partial International Search Report in corresponding application PCT/US2007/080138 dated Nov. 14, 2008.

* cited by examiner

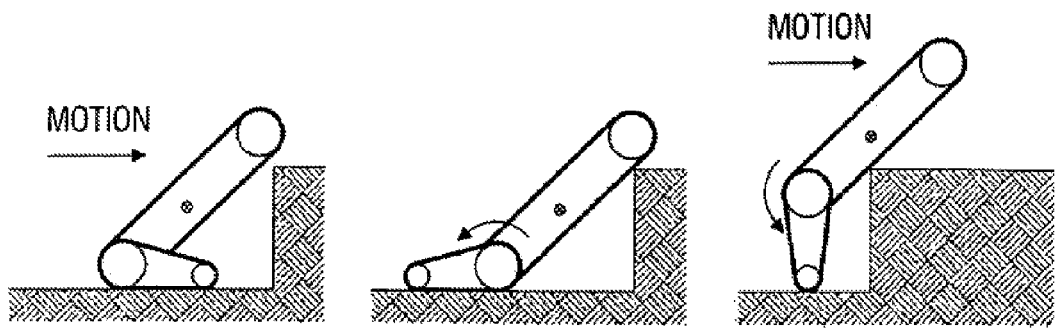
*FIG. 8A*  *FIG. 8B*  *FIG. 8C*
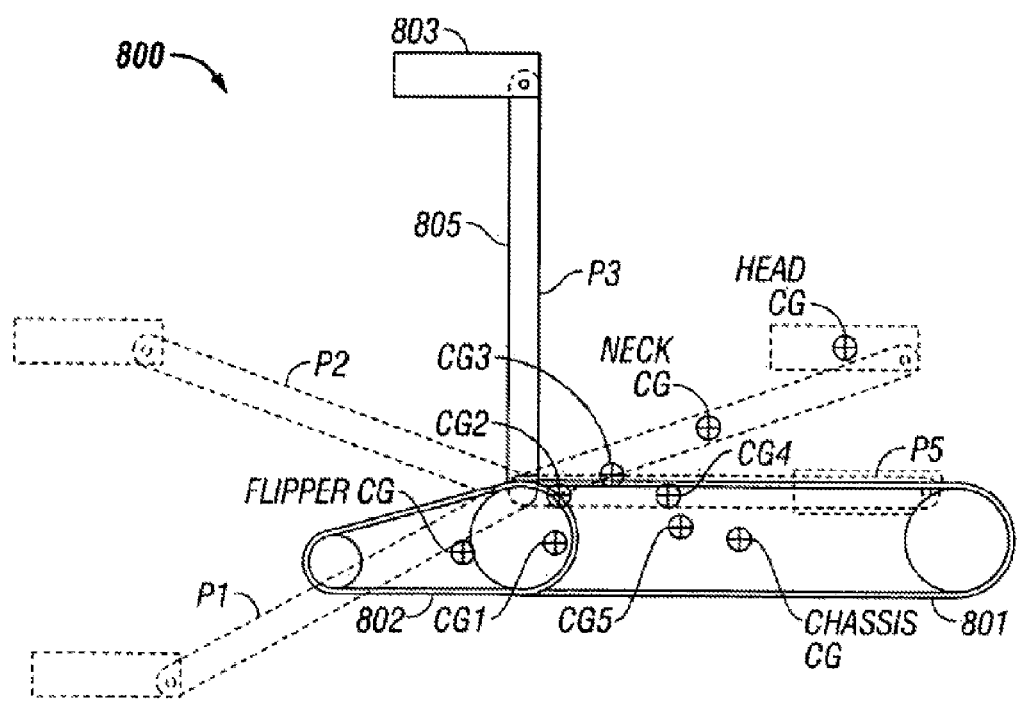
*FIG. 9*

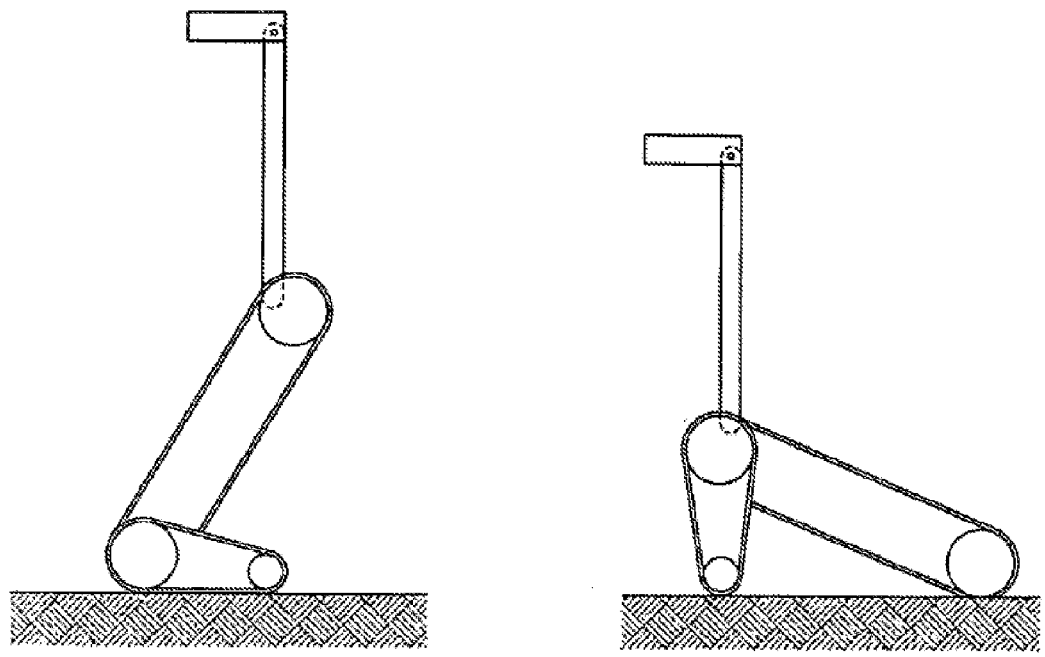
FIG. 10A  FIG. 10B
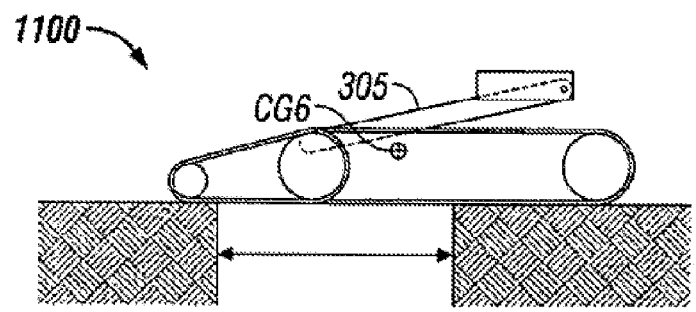
FIG. 11A
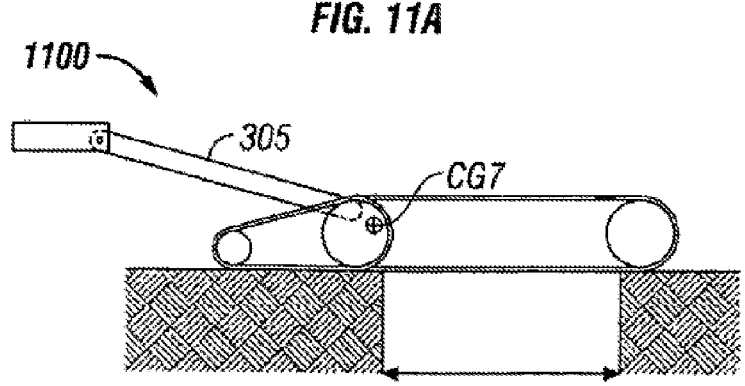
FIG. 11B

MANEUVERING ROBOTIC VEHICLES HAVING A POSITIONABLE SENSOR HEAD

CROSS REFERENCE TO RELATED APPLICATIONS

This U.S. patent application is a continuation of, and claims priority under 35 U.S.C. §120 from, U.S. patent application Ser. No. 11/842,868, filed on Aug. 21, 2007, which claims priority under 35 U.S.C. §119(e) to U.S. Provisional Application 60/883,731, filed on Jan. 5, 2007, and U.S. Provisional Application Ser. No. 60/828,611, filed on Oct. 6, 2006. The disclosures of these prior applications are considered part of the disclosure of this application and are hereby incorporated by reference in their entireties.

STATEMENT AS TO FEDERALLY SPONSORED RESEARCH

This invention was made in part with Government support under contract DAAE07-03-9-F001 awarded by the Technical Support Working Group of the Department of Defense. The Government may have certain rights in the invention.

TECHNICAL FIELD

This invention relates to robotics, and more particularly to mobile robots or vehicles capable of climbing by shifting their center of gravity.

BACKGROUND

Robots are useful in a variety of civilian, military, and law enforcement applications. For instance, some robots may inspect or search buildings with structural damage caused by earthquakes, floods, or hurricanes, or inspect buildings or outdoor sites contaminated with radiation, biological agents such as viruses or bacteria, or chemical spills. Some robots carry appropriate sensor systems for inspection or search tasks. Robots designed for military applications may perform operations that are deemed too dangerous for soldiers. For instance, the robot can be used to leverage the effectiveness of a human "pointman." Law enforcement applications include reconnaissance, surveillance, bomb disposal and security patrols.

Small, man-portable robots are useful for many applications. Often, robots need to climb stairs or other obstacles. Generally, a small robot must span at least three stair corners to climb stairs effectively, and must have a: center of gravity in a central disposition to maintain climbing stability. When the size or length of a robot reaches a certain small size relative to the obstacle or stair it must climb, the robot's center of gravity usually has a deleterious effect on climbing ability. What is needed, therefore, is a robot design that can climb obstacles that are large relative to the size of the robot.

Such robots are also employed for applications that require a robot to inspect under and around various objects and surfaces. What is needed, therefore, are robot sensor heads moveable in various degrees of freedom.

SUMMARY

Various robot head and neck morphologies are provided to allow positioning for various poses such as a stowed pose, observation poses, and inspection poses. Neck extension and actuator module designs are provided to implement various head and neck morphologies. Robot actuator control network circuitry is also provided.

One preferred embodiment is a robot including a chassis having a central open volume, a steerable drive supporting the chassis, and neck extension movable be coupled to the chassis, and a pan link extension having proximal and distal ends being coupled to the neck extension at the proximal end with a first tilt access actuator. The pan link extension has a one axis actuator along its length. A sensor head is coupled to a distal end of the pan link extension. The sensor head as movable using the axes.

Preferred actuator designs provide and actuator module, the module including the actuator motor, control circuitry for the motor, a slip ring and having multiple concentric conductive traces which matched to corresponding contacts on an electrical contact board rotatable with respect to the slip ring.

Configurations are provided for vehicular robots or other vehicles to provide shifting of their center of gravity for enhanced obstacle navigation. In preferred embodiments, a robot chassis with articulated driven flippers has an articulated neck and articulated sensor head mounted toward the front of the chassis. The articulated neck is pivoted forward to shift the vehicle combined center of gravity (combined CO) forward for various climbing and navigation tasks. Flippers may also be employed with the CG shifting effect of moving flippers added to that of the pivoting head and neck. Various embodiments may have different weight distributions to allow different CG shifting capabilities.

One preferred embodiment includes a chassis supporting a skid steered drive and having a leading end, a trailing end, and a chassis center of gravity (chassis CG) therebetween, a set of driven flippers, an articulated neck and an articulated sensor head the chassis, set of flippers, neck, and articulated sensor head adapted to move and thereby produce a corresponding adjustment in the vehicle center of gravity. Such adjustment may be employed to allow stair climbing, obstacle navigation, crevasse navigation, or other desired operations. The articulated neck may include a pan axis element.

Robots according to various morphologies may be positioned in various poses suitable to accomplish their mission. A preferred control scheme provides preset poses in response to certain operator commands. Preset CG shifting poses and preset observation or inspection poses are provided.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 8 depicts a robot using flippers to mount an obstacle backwards.

FIG. 9 shows and example of how a pivotable neck and sensor head contribute significant CG shifting ability.

FIG. 10 depicts elevated neck positions for two configurations.

FIG. 11 depicts a robot in various positions crossing a crevasse.

Like reference symbols in the various drawings indicate like elements.

DETAILED DESCRIPTION

Various tracked robotic vehicles have been developed that are the subject of, for example, U.S. Pat. Nos. 6,431,296, 6,263,989, 6,668,951 and 6,651,885. These patents are instructive on the construction of tracked robotic vehicles having driven flippers, and means of articulation of robotic components, and are hereby incorporated by reference in their entirety into this application. Other robotic vehicle details and features combinable with those described herein may be found in a U.S. Provisional application, filed Oct. 6, 2006, and assigned Ser. No. 60/828,606, the entire contents of which are hereby incorporated by reference.

Figure 1:
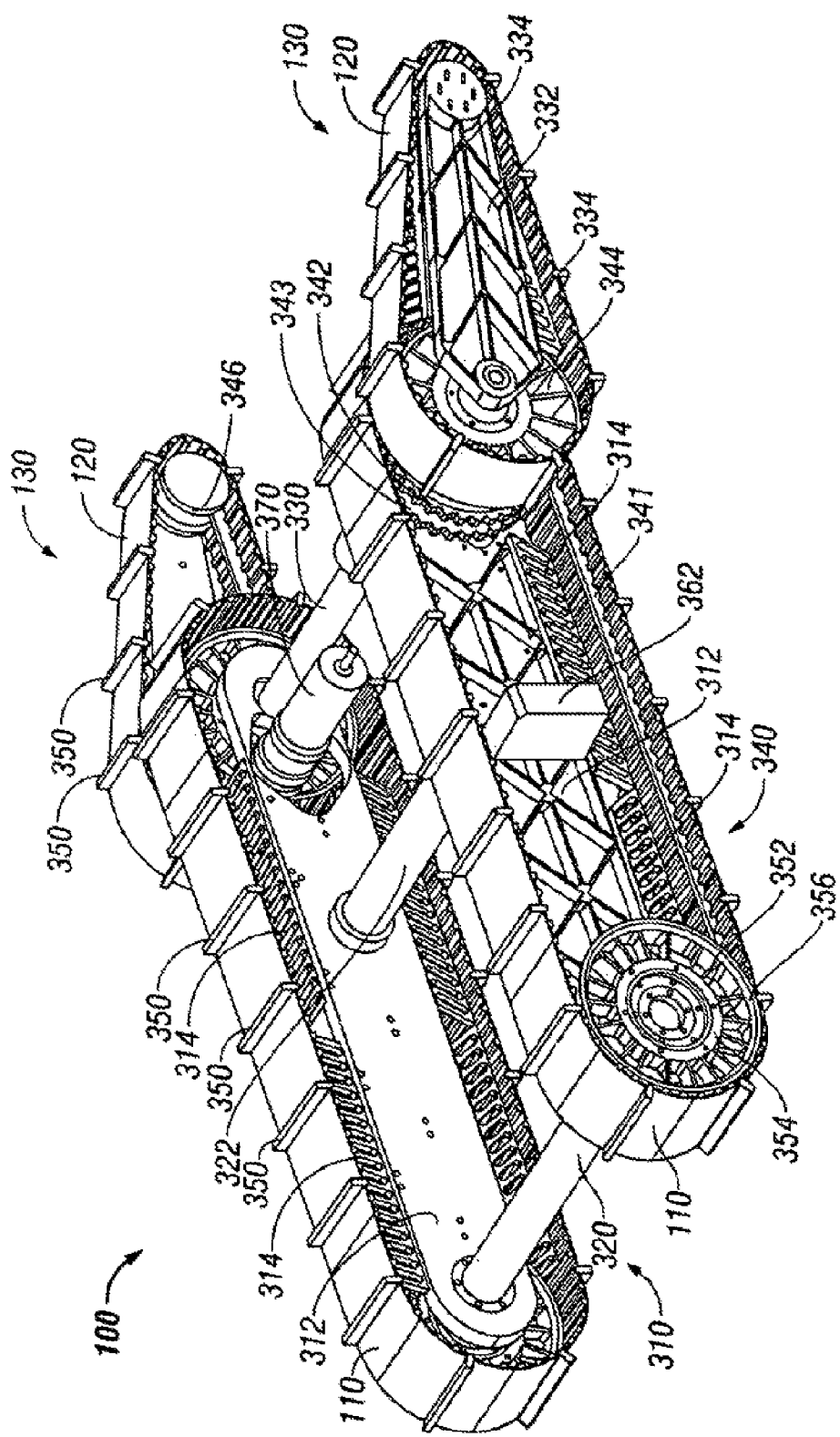
FIG. 1 shows robot with extendable arms or flippers.

FIG. 1 shows robot 100 with extendable arms or flippers 130. The arms are shown fully extended configuration in which forward arms 130 extend beyond the front of main body 140. The combination of forward tracks 120 and main tracks 110 and provide an extended length base. Main body 140 includes a vertically symmetrical rigid frame 310, which includes parallel vertical side plates 312. Side plates 312 are rigidly coupled by tubes 320, 322, and an articulator shaft 330. The rigid components are designed for strength and low weight and are preferably made from a material such as 7075-T6 aluminum. Alternative versions of the robot can use other materials, such as other lightweight metals, polymers, or composite materials.

Alternative versions of the robot can use other types of tracks, such as tracks made up of discrete elements. However, debris may be caught between elements and such tracks are generally heavier than flexible belts. Other flexible materials can also be used for continuous belt tracks. Referring back to FIG. 1, in this embodiment, each front track 120 is narrower but otherwise similar to main tracks 110, having grooves and a V-shaped segment on the inside surface, and soft cleats 350 attached to the outside surface. A front drive pulley 344 drives each front track 120. Each front drive pulley 344 is toothed and has a central V-shaped channel that loosely mates with the V-shaped rib on the inside of the corresponding front track 120. On each side, front drive pulley 344 is coaxial with main drive pulley 342, and both drive pulleys on a particular side turn in unison on a common axle. A smaller smooth surfaced front idler puller 346, which also has a V-shaped channel, supports each front track 120 at the extreme end of the corresponding arm 130.

As depicted in FIG. 1, front tracks 120 are supported by arm side plates 332 using front track supports 334. Front track supports 334 are wedge-shaped and each has a series of angled slots similar to those in main track supports 314. The arm side plates 332 on each side of the robot are rigidly coupled to one another through articulator shaft 330, and therefore move together.

Other designs may be employed to produce a robot with such a skid steered drive and driven flippers. For example, some embodiments may employ techniques taught in the various U.S. patents that are incorporated by reference herein.

Figure 2:
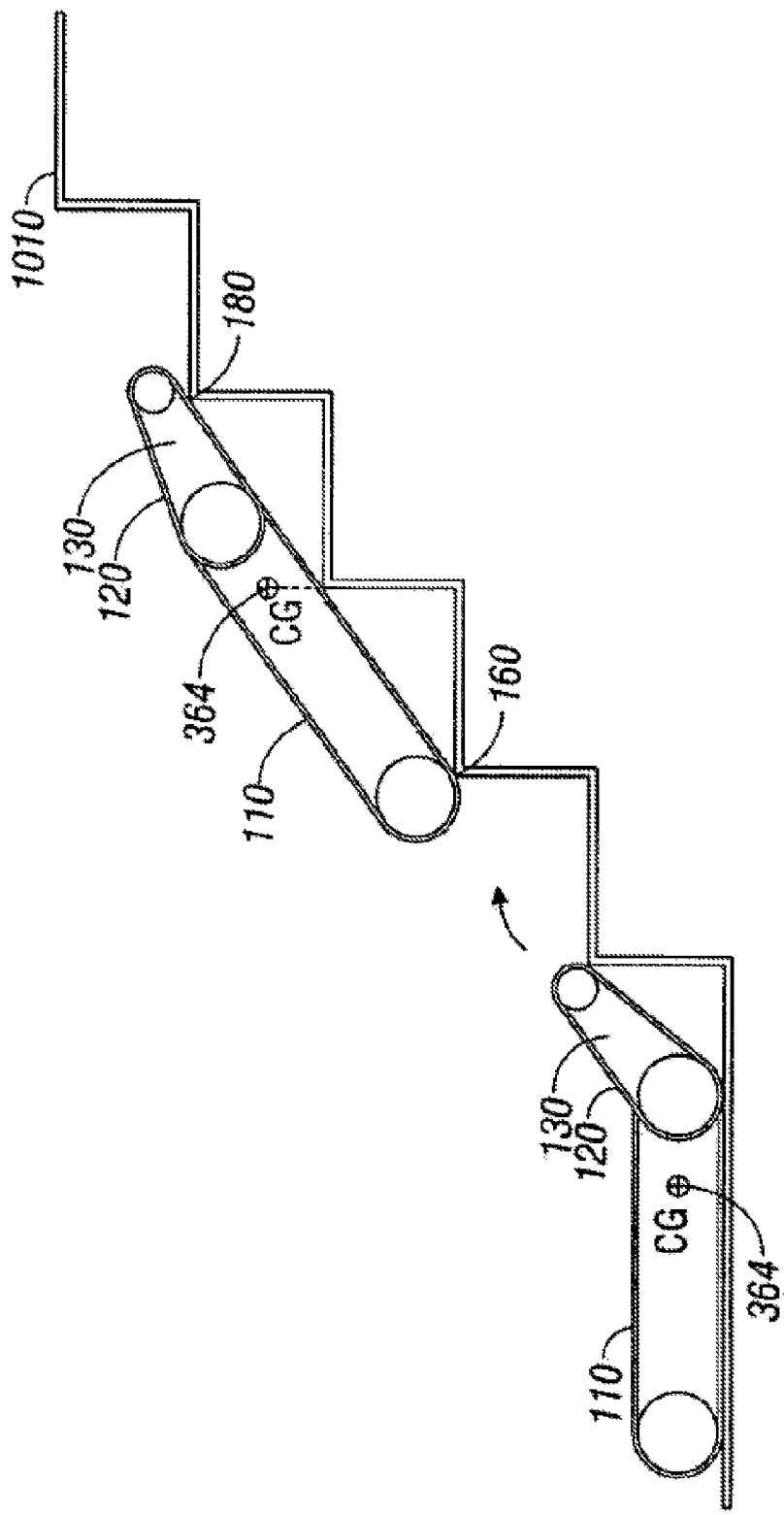
FIG. 2 depicts one method by which a robot may climb stairs.

FIG. 2 depicts one method by which robot 100 may climb stairs. The depicted robot 100 can raise arms 130 in order to mount an obstacle, such as a stair 1010, in its path. To mount the first step of staircase 1010, robot 100 raises its arms 130 and drives forward to raise its main tracks 110 onto the first stair. The robot then assumes a fully extended mode thereby extending its wheelbase to increase it stability and to provide as smooth a ride a possible up the stairs. Cleats (not shown in FIG. 2) provide mechanical locking with the stair edge needed to drive the robot up the stairs.

One embodiment of the robot 100 may be specifically dimensioned to climb common stairs, with step dimensions of up to a 17.8 cm (7-inch) rise and 27.9 cm (11-inch) tread. As the robot tilts or inclines, the vertical projection of the center of gravity (CG) with respect to the ground moves backwards. For stable travel on stairs, the extended wheel base of the main and forward tracks in the fully extended mode span a minimum of two steps (i.e. at least 66.2 cm for 17.8 cm by 27.9 cm stairs) such that the vehicle is supported by at least two stair treads at all times. Note that the depicted robot 100 can climb larger stairs for which it cannot span two steps, but the traverse will not be as smooth as the robot will bob with each step.

To avoid nosing up or down (pitch instability) while climbing stairs, the vertical projections of the center of gravity is located in a stable range which is at least one step span (i.e., 33.1 cm (13 inches) for 17.8 cm by 27.9 cm stairs) in front of the furthest rear main track ground contact 160 and at least one step span behind the front most front track ground contact 180.

Alternative versions of the robot can use shorter track dimensions that do not satisfy the requirement of spanning two steps. Without further modifications, however, the center of gravity can be outside the stable range. Such robots may not be as stable on stairs, although inertial effects add to dynamic stability at increased velocities, smoothing the traverse on stairs. Various methodologies may be used to mitigate this and other climbing and terrain traversing problems. Below we describe different embodiments (having different morphologies) for a basic small tracked vehicle system that may have enhanced capability to climb or traverse.

Figure 3:
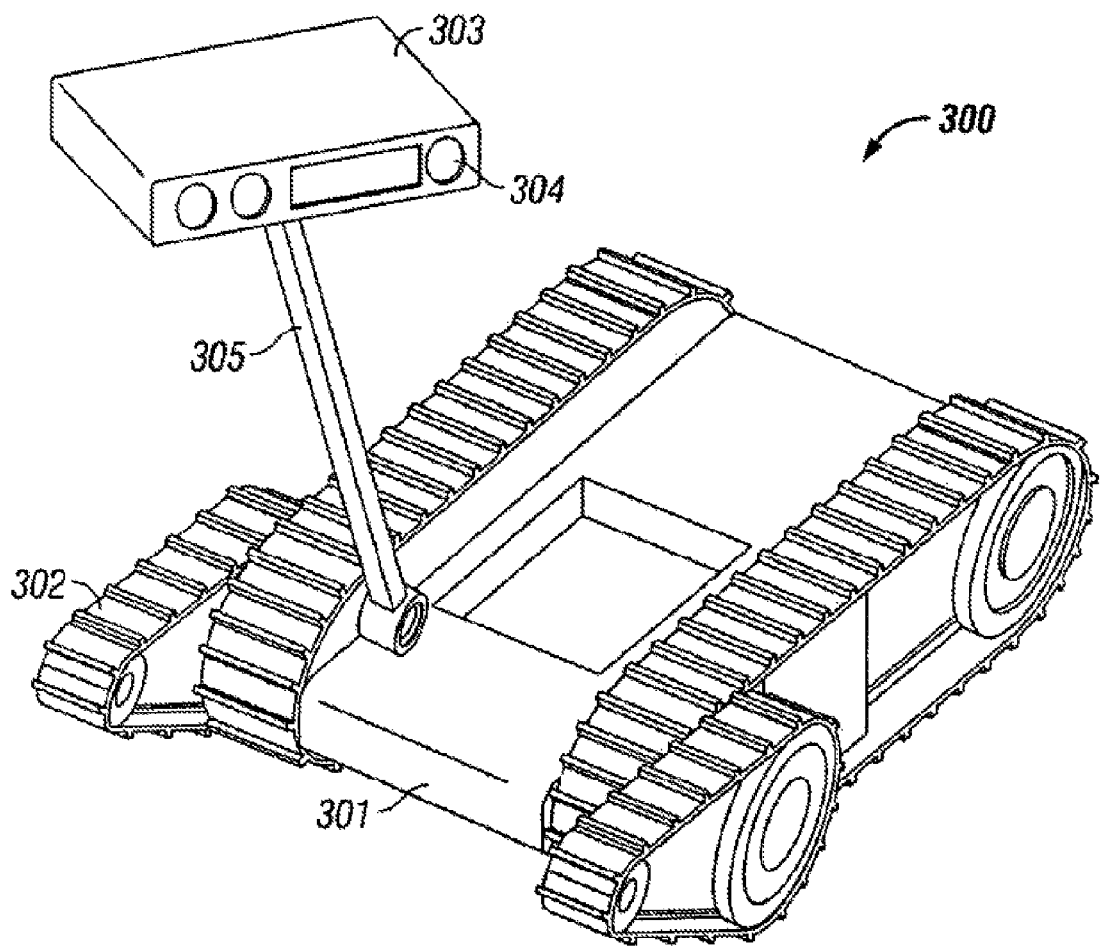
FIG. 3 shows another exemplar tracked vehicle robot.

FIG. 3 shows an exemplar tracked vehicle robot. The depicted system is primarily comprised of four parts: 1) a main tracked vehicle chassis 301, 2) a "flipper" tracks 302 on one end of the vehicle, 3) a sensor head 303 preferably containing drive cameras and other sensors 304, and 4) a neck mechanism 305 that connects head 303 to chassis 301, Many improved robotic vehicle designs may be derivative of this basic platform design. Various designs may be required to carry various payloads such as sensors, transmission equipment, or robotic tools, for example.

The tracked vehicle robot may be required to surmount a variety of obstacles that will require the vehicle center of gravity (CG) to fall within a certain range. These obstacles include, for example, stairs, single vertical steps, and slopes. Included herein are tracked-vehicle morphology capable of meeting these "primary" requirements. Because tracked vehicle robots may be subject to both stringent overall weight and stowed size requirements, it is desirable to be able to negotiate these obstacles with the smallest sized vehicle possible such that these constraints can be met as well. To do this reliably, it is also desirable to achieve all of this with the simplest system possible. Likewise, power consumption of the drive train must be considered to meet varied endurance requirements. Further, the system may be required to elevate the drive sensors 304 to a specific height which may play an important factor is being able to shift the CG to be able to negotiate extreme obstacles.

A typical such obstacle is the ability to climb standard stairs with 7-inch risers by 11-inch landings, for climbing higher obstacles. Climbing slopes is sometimes required. These requirements typically need to be met while minimizing weight, and size for portability, maximizing vehicle endurance, and accommodating extra payloads for certain scenarios. Some small tracked vehicle robots require a minimum drive sensor height above the ground to see over obstacles.

Figure 4:
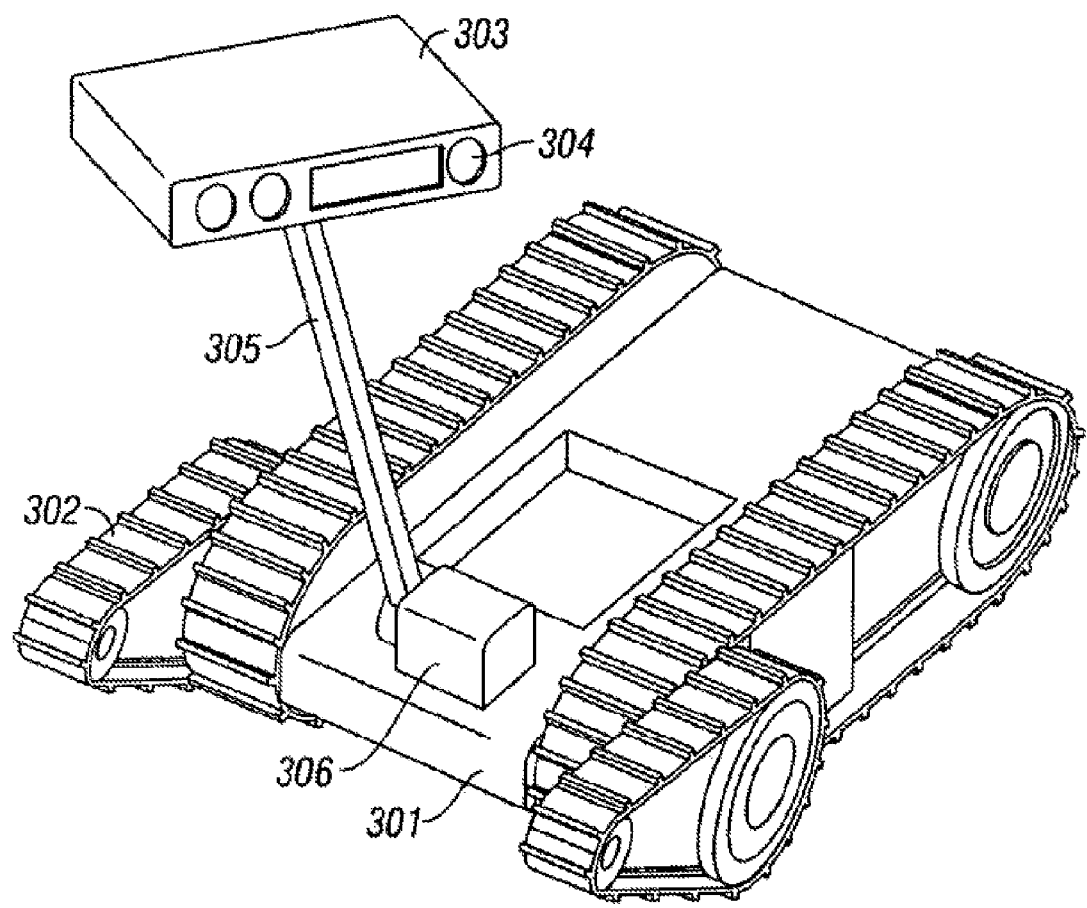
FIG. 4 depicts another tracked robot vehicle.

FIG. 4 depicts another tracked robot vehicle. In this example, neck 305 is attached to chassis centrally, rather than to a vertical wall of the track drive (FIG. 3). The actuator motor 306 in is shown mounted to chassis 301, but may also be provided in a flush housing or other mounting arrangement. Actuator 306 may be powerful enough to move neck and head designs with significant mass for center of gravity shifting (CG shifting) or other applications. Neck 305 may also be provided with tapped holes or other fittings to attach various payloads. Neck 305 may also be relatively much larger in diameter than depicted to provide for housing various components or payloads. Actuators may be backdriveable or non-backdriveable, which may depend on the types of tasks desired for neck 305. Further, while track-driven robots are shown, other drive means may be used such as wheels. Closely spaced or overlapping treaded wheels may be used to provide mobility and climbing capability similar to that of a track drive. Such variations typically encompass the main drive, while preferred flippers use tracks. The flipper and chassis track systems maybe compliant tracks or rigid sectional tracks.

Depicted in FIG. 4 is a payload storage opening in chassis 301. For "head-forward" embodiments such as those in FIG. 3 and FIG. 4, payload storage is preferably at or toward the front of chassis 301. Preferably such storage resides close to the center of the track footprint so as not to adversely affect CG shifting capability as described herein. Payloads may of course also be housed in the track housings on both sides of the chassis, and in or on the neck and head. In some embodiments chassis 301 is configured as depicted with a payload deck, and others may have different structures. Chassis 301 may be provided with tapped holes to accept cargo attachment or fixture attachment. Chassis 301 may also be provided with stowage space or a slot for neck 305 to stow into while in a stowed position such as, for example, P5 depicted in FIG. 9. Head 303 may also be provided with a slot and recessed articulation joint to lower the profile of the head and neck in stowed position. To protect the head, it must stow as much as possible within the profile of the tracks. In one preferred embodiment, the-head will approximately be at least 1.5 inches thick; likewise, the neck and its pan/tilt actuators will probably require at least another 1.5 inches under the head when stowed. Since the track wheel pitch diameter will be around 5 inches, and a typical flipper torque tube will be about 0.75 inch diameter (delivering torque from a flipper actuator), this only leaves a little over 2 inches for the head and neck to stow. Therefore, it will probably not be possible for the head to stow both over the torque tube and remain within the track volume.

Chassis 301 is preferably constructed of strong lightweight materials, and may include a shell around an enclosed volume. A structural volume housing electronics may also support the necessary load paths of the system. In the simplest case where the chassis is modeled as a hollow box, there is adequate strength to also support wheels and running gear on the sides of this box.

Some characteristics for three different embodiments are described below. Note that the values depicted are for one possible morphology and that other morphologies can be derived by reallocating weights from one component to another. For example, in typical examples the flippers will be about 10% of the total robot weight. To provide heavier flippers (say by moving the batteries to the flippers), the battery weight (which is typically around 23% but may vary greatly) would be subtracted out of the chassis and added to the flippers, thus making the flippers contain about 33% of the total robot weight. Further, partial battery capacity may be shifted to the robot head for a heavier head providing, in some designs, an improved CG shifting capability. For example, some designs herein have a head with 15% of the overall robot weight. Designs that provide battery capacity located in the robot sensor head and neck may provide head weight ranging as high as around 17%, 20%, or even 22% or 25%, depending on CG shifting requirements and design constraints. Likewise, a lighter head can be employed if certain components like cameras or transmission gear are removed.

One embodiment of the robot depicted in FIG. 3 and FIG. 4 has the following characteristics, preferred for CG shifting in certain scenarios.

TABLE 1

Weight Distribution for Design 1.

| Component: | Component Weight: | Percentage of overall wt: |
|---|---|---|
| Chassis | 21 lbs | 70 |
| Flippers | 3 lbs | 10 |
| Head | 4.5 lbs | 15 |
| Neck | 1.5 lbs | 5 |
| Payload | 6 lbs (rating) | Additional |

The weights and ratios provided may vary slightly and still provide the desired capabilities. Such embodiment also has physical parameters as follows. Track wheel diameter of about 5 inches; chassis length about 17 inches; flipper length about 9.5 inches; and neck length about 17 inches. Such design provides ability to scale an obstacle in the forward direction having an 11.4 inch height. While these designs have been provided, size and weight ratios may change slightly and still provided the desired climbing and maneuvering enhancements. The three designs herein have been configured to crest standard stair and obstacles in a manner such as depicted in FIGS. 18-21, for example, while still maintaining a robot that can stow flippers and neck to fold into a small, man portable shape. For larger obstacles, the ratios given herein may be scaled appropriately and other ratios may be used successfully with the CG shifting techniques taught herein.

Another embodiment of the robot depicted in FIG. 3 and FIG. 4 has the following characteristics, preferred for CG shifting in certain other scenarios.

TABLE 2

Weight Distribution for Design 2.

| Component: | Component Weight: | Percentage of overall wt: |
|---|---|---|
| Chassis | 19.5 lbs | 65 |
| Flippers | 3 lbs | 10 |
| Head | 4.5 lbs | 15 |
| Neck | 3 lbs | 10 |
| Payload | 6 lbs (rating) | Additional |

This design has similar size parameters to the first listed design, Design 1. Because it is not desired to add "dead weight" or useless weight, the additional neck weight is preferably a result of attaching payloads to the neck or housing payloads inside the neck, as discussed above. This may be desired, for example, to provide camera or RF surveillance equipment, or other sensors, and recording transmission electronics that are spaced above the ground for optimum propagation characteristics. This configuration allows for CG shifting to enable addressing obstacles of about 15.1 inches in one direction, and 11.6 inches in both directions.

Figure 5:
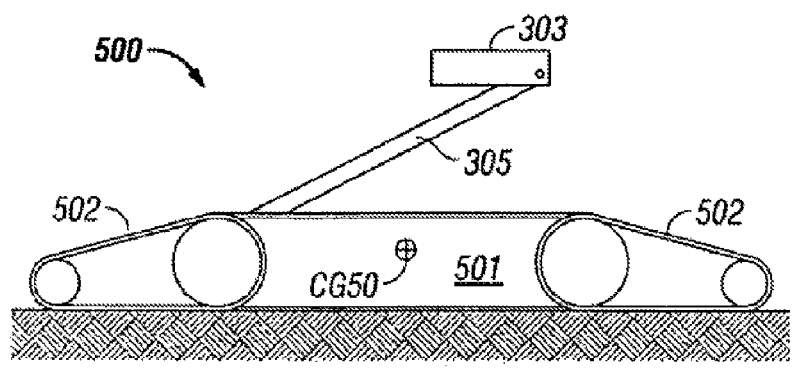
FIG. 5 depicts a side representation of another robot.

FIG. 5 depicts a side representation of another robot. In this robot, lightweight flippers 502 are provided on both ends of chassis 501. Preferably, the lightest feasible head 303 is assumed to offset the extra weight of the rear flippers 502. Chassis 501 is assumed to be slightly shorter than that in the previous embodiment since it is not needed for stability and may be necessary to additionally offset more weight for actuator and extra battery weight (due to added power draw from the extra flipper). Such design has a center of gravity (CG) at the mark CG50 when resting in the depicted position. The added length due to the extra flipper also provides a longer range of locations on which payloads can be mounted without overly shifting the vehicle CG.

TABLE 3

Weight Distribution for Design 3.

| Component: | Component Weight: | Percentage of overall wt: |
|---|---|---|
| Chassis | 22 lbs | 73 |
| Flippers | 3 lbs | 10 each set |
| Head | 1.2 lbs | 4 |
| Neck | 0.9 lbs | 3 |
| Payload | 6 lbs (rating) | Additional |

The preferred implementation of design 3 also has the following physical parameters: wheel diameter, 5 inches; chassis length, 15 inches; flipper length, 9.5 inches; and neck length, 15 inches. Such parameters provide ability to scale a forward obstacle of 13.8 inches height when using the CO shifting techniques described herein.

While several design variations with different parameters are described, variations in size are accommodated for robots with different intended purposes. The designs included are intended to provide small robots that are man-portable yet capable of climbing stairs. Larger robots, or other vehicles, may have little trouble climbing stairs, but may use the CG shifting techniques described herein to enable crossing crevasses, larger obstacles, or other purposes.

Figures 6A, 6B:
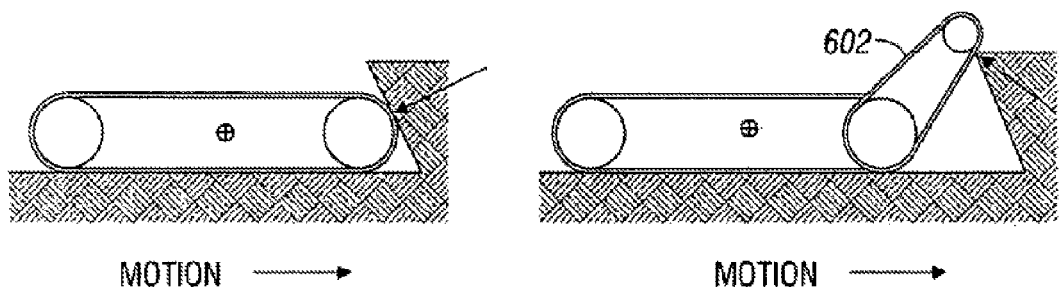
FIG. 6 depicts a robot vehicle encountering an obstacle under two different scenarios.

FIG. 6 depicts a robot vehicle encountering an obstacle under two different scenarios. Regarding stairs and obstacles, the first step in negotiating any obstacle is to make sure the vehicle can transition up the obstacle from a flat surface. For example, if the vehicle encounters a vertical wall but cannot at least get the front of the vehicle to climb it, the vehicle typically will not be able to handle any obstacles that are more than one wheel radius. Preferably, the vehicle CG should be as close to the rear axle as possible and the front of the vehicle should encounter the obstacle as high as possible. On top of this, many obstacles may be undercut such that the vehicle may wedge under it (such as fire-escape stairs as depicted in FIG. 6a), so having a very high approach point is important (large Y dimension). Also, note that such obstacles result in a downward force being applied to the front of the vehicle unless there is some feature on the vehicle that can change this contact angle. It is for these reasons (among others) that the tracked vehicle robot systems preferably have flipper tracks on one end of the vehicle which can be rotated to any orientation, and that this is considered the "front" of the robot. This is depicted in FIG. 6b. For clarity, the end of the vehicle with flippers 602 attached is defined as the "front," but a vehicle may be run "backwards" to scale obstacles if this proves beneficial in some cases.

Figure 7:
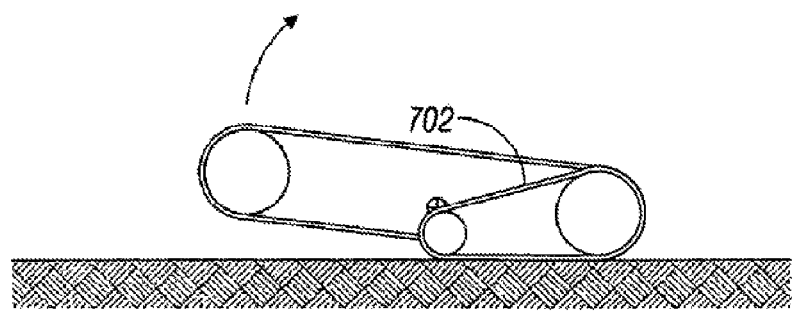
FIG. 7 depicts a robot vehicle having flippers residing within the length of the vehicle.

FIG. 7 depicts a robot vehicle having flippers residing within the length of the vehicle. Such flippers greatly enhance the ability of a small vehicle to scale large objects relative to it size. This is not only due to the reasons above, but also because they increase the vehicle's footprint for a given stowed volume (since the flippers can be folded beside the vehicle when stowed, but can be deployed as necessary for a given obstacle). Flippers also are sometimes employed to right the vehicle when it is inverted. To do so, the vehicle CG must reside within the length of the flipper when it is stowed as shown in FIG. 7.

Assuming the chassis density is somewhat uniform (resulting in its CG being at its geometric center), and the flippers would shift the CG slightly off to the end to which they are mounted, this implies that the flippers typically not be shorter than about 50% of the chassis length. Therefore having the flippers be at least 50% of the chassis length is a good baseline unless the flippers are adapted to have more weight (in which case they could be slightly shorter).

It is also important for the flippers to spin 360 degrees continuously in either direction. This not only is necessary to recover from being inverted, but it also considerably adds to the vehicle mobility over very level and unstable terrain (such as rocks or tall grass). With such movement, the flippers may also act as arms to help pull the vehicle over such terrains.

Depending on what vehicle morphology is employed and where the average CG location is located, the vehicle may be able to surmount larger, obstacles backwards than it can forwards. This happens when the vehicle CG is shifted aft and thus the lightweight flippers can be used to elevate the CG over the obstacle. By using the flippers to achieve "prairie-dog" pose (driving on the flipper tracks only), large obstacles can be approached backwards as depicted in FIG. 8. The flippers are then rotated to lift the front of the vehicle up to help scale the obstacle.

As described above, due to the limitations of the design in FIG. 8, an articulated neck may also be added at the back of the robot. In such embodiments, the neck may be moved to adjust the center of gravity (CG) of the robot and optimize obstacle scaling ability.

FIG. 9 shows and example of how a pivotable neck and sensor head contribute significant CG shifting ability. A mobile robot's CG preferably resides in a well-controlled range in order to negotiate a wide array of obstacles. Further, a typical vehicle with a fixed CG would need to have its CG near ground level and near the center of the track footprint. This, unfortunately, is difficult to achieve since it is difficult to design any "practical" system with the CG so far offset from its volume centroid (most of the volume would need to remain vacant). This is especially true when ground clearance will need to be allotted on the bottom of the chassis.

The alternative to having a fixed CG is having some type of "CG shifting" capability such as that illustrated in FIG. 9. This means that the vehicle CG can be relocated as necessary to negotiate obstacles. In the illustrated example, the flippers 802 do allow for some CG shifting since they can be rotated in any direction and can be designed to contain some percentage of the total weight of robot 800. However, since the flippers need to be in a defined position for many obstacles (and therefore cannot be rotated at will), this limits their ability to contribute adequate CG shifting ability. In contrast, the robot will often be required to have a head that can be elevated via a neck that typically has few constraints regarding its position while scaling obstacles (other than to give a remote operator ample viewing of the surroundings).

The depicted robot 800 in FIG. 9 has a neck 805 that is a single, rigid link. However, some embodiments may have necks with multiple links and articulating joints or "elbows." Neck 805 is illustrated in five different positions to illustrate its range of movement. Since the head is often required for scanning ability to have a high reach such as, for example, at least 20 inches off of the ground, neck 805 is preferably as long as possible while still stowable atop the robot 801 (represented by black outline in FIG. 9). Having such a long neck 805 means that the head 803 does not need to be a very large percentage of the robot weight (without payload) to result in fairly large CG shifts for the vehicle. In fact, the depiction above represents having only about 15% of the robot weight in the head, and another 5% in the neck itself. A longer neck is preferred for better leverage, so some robots have jointed necks or necks extending, in stowed positions, beyond the end of the chassis.

FIG. 9 depicts various target dots toward the center, each corresponding to a combined robot center of gravity for one position of the head. The depicted range of movement is exemplary, and other ranges of movement may be achieved by placing neck 805 in other locations or changing the shape and design of neck 805, for example. Depicted position P1 produces a combined CG at the location marked CG1, thus lowering and moving forward the combined CG relative to most other positions. Depicted position P2 produces a combined CG at the location marked CG2, which is higher than CG1 and forward of most other positions. Depicted position P3 produces a combined CG at the location marked CG3, this is the highest depicted CG. Depicted position P4 produces a combined CG at the location marked CG4. Depicted position P5 is a stowed position, and produces a combined CG at the location marked CG5, thus lowering and moving forward the combined CG relative to most other positions. There are labeled dots also toward the center of the P4 head and neck, as well as the flippers 802 and the chassis 801. These represent the individual component center of gravity for that piece. Movement of the centers of gravity of the head 803, neck 805, and flippers 802 effect the changes in combined CG position as described herein.

The depicted CG locations depend, of course, on the orientation of the vehicle. Climbing orientations with the chassis oriented at a pitch will of course have different CG locations, but the general CG shifting effect is exemplified in this drawing. CG locations also depend on flipper location and the relative weight of the flippers 802 to the rest of robot 800.

In the depicted embodiment, though not visible in this side representation, neck 805 is preferably adapted to move centrally between flippers 802 such that the flippers do not interfere with neck movement. Other positions may be used.

Note that the neck could be reversed from what is depicted above such that it pivots from the rear of the vehicle. This would shift the centroid of the CG range aft, which can be advantageous if more weight is packaged in the flippers.

While CG shifting directed along the front/rear axis is depicted, CG shifting as described herein may of course be accomplished in other directions, such as sideways, or downward. For example, a robot navigating a slope with a sideways slant may benefit from sideways or diagonal CG shifting. Such shifting may be accomplished using various head/neck joint morphologies described herein.

FIG. 10 depicts elevated neck positions for two configurations. The location of the neck pivot, whether mounted at the front or rear of the chassis, affects how high the head can be elevated off the ground for surveillance. In both cases, the flippers can be used to elevate the head by either using "prairie-dog" (drive on flipper tracks only) or "bulldog" (run on the flipper tips and main tracks) poses. The former results in a higher head position as shown in FIG. 10.

Furthermore, it is possible to "combine" the chassis and the neck as a single entity, and have dual flippers on one end of the vehicle. In this case, the vehicle always rides on one or both sets of lightweight flippers, and the heavy neck can be pivoted about the front axle to supply the weight shifting ability. This concept requires longer flippers to effectively climb stairs, but has the benefit of having most of its weight concentrated in the neck to achieve large CG shifts. The head (which would be at the end of the neck) could be elevated by standing on the flipper tips to achieve the required height. This example is described in a copending Patent Application No. 60/828,606, filed Oct. 6, 2006, and entitled "Robotic Vehicle."

FIG. 11 depicts a robot 1100 in various positions crossing a crevasse. In operation, robot 1100 approaches the crevasse a (FIG. 11a) with neck 305 in a declined position that shifts the weight of the head and neck to move the robot's combined center of gravity (combined CG) to the spot marked CG6. In this configuration, robot 1100 may move straight toward crevasse A and roll forward until the front flipper contacts the opposing side of the crevasse. Because CG6 is never over the crevasse before the leading flipper edge is supported, robot 1100 does not fall.

After reaching the position shown in FIG. 11A, the robot pivots neck 305 to the second position depicted in FIG. 11B. In this position, the robot combined CG is at the point marked CG7, which is over the chassis portions that are supported, and thereby robot 1100 may move forward and complete the crevasse crossing without the trailing end falling into the crevasse. In a preferred embodiment, the robot can traverse from positions 11A to 11B at the same time neck is moving to shift the robot CG, as long as neck gets to position 11B before robot does.

As shown, there are two distinct crevice dimensions, "A" and "B," dictated by the location of the vehicle's CG relative to both of its outermost axles. Since any vehicle crossing a crevice must pass through both of these extremes, the maximum crevice that a vehicle can cross is always the smaller of "A" or "B." Note that for a typical vehicle with a fixed CG location, the sum of A and B is always the total length of the track span. Therefore, the maximum crevice that a fixed-CG vehicle can cross can be no larger than half of the track span, and the CG must reside in the middle of the track footprint to do so. However, if the vehicle is capable of shifting its CG fore and aft, it is possible to cross much larger crevices. In this case, the maximum crevice is still the smaller of A or B, but the sum and A and B is now equal to:

$$A+B=\text{Track Span}+\text{CG Shift}$$

Since the maximum crevice would be when A=B, this gives:

$$\text{Maximum Crevice}=(\text{Track Span}+\text{CG Shift})/2$$

Therefore, the crevice size can be increased by half of whatever CG shifting ability can be achieved, but the vehicle's "average" CG should still be in the middle of the track span or this gain is lost.

Figure 12:
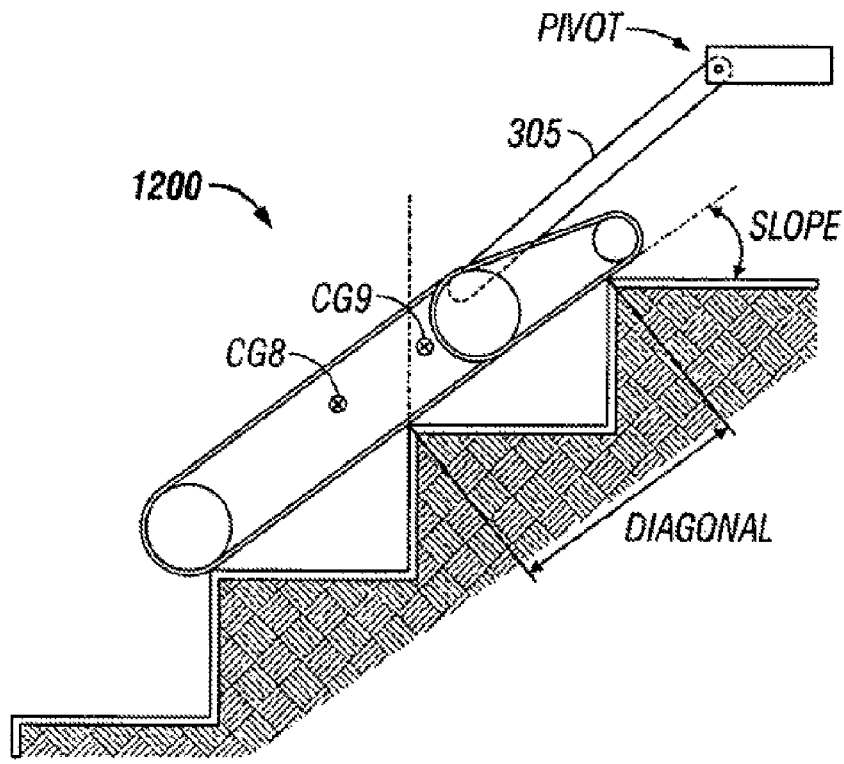
FIG. 12 depicts another robot CG shifting technique.

FIG. 12 depicts another robot CG shifting technique. Climbing stairs becomes very difficult as vehicle size decreases. It is desired that the vehicle be stable at any point during climbing to allow stopping and starting at any time and consistent performance at various speeds. To climb stairs stably, the vehicle CG must always be supported between two step edges. This means that as the CG traverses over the edge of a step, the vehicle must be at least long enough to simultaneously span from the next step edge to the previous step edge as shown below in FIG. 12. This means that the total track footprint (the entire length of track in contact with the ground) must be at least two "step diagonals" long.

The depicted robot 1200 in FIG. 12 has neck 305 deployed in a stair ascending position. Such position requires neck 305 to be pivoted forward such that the head and to neck center of gravities are in front of the chassis. This provides, in the depicted scenario, a robot combined CG located at the point marked CG9. Because this point is in front of the chassis contact with the middle stair when the rearmost chassis contact leaves the lower stair (forward motion), robot 1200 is stabilized. Some embodiments of robots may be so small that forward stair climbing is not possible without such CG shifting. For example, a small robot may have a combined CG at the point CG8, which would not provide stable climbing because the rear end of the robot would sink along the lower step as forward progress is made, possibly even flipping over backwards. Such a robot, equipped with a head and neck as described herein, may shift its CG up to position CG9 for example, and climb successfully.

Figure 13:
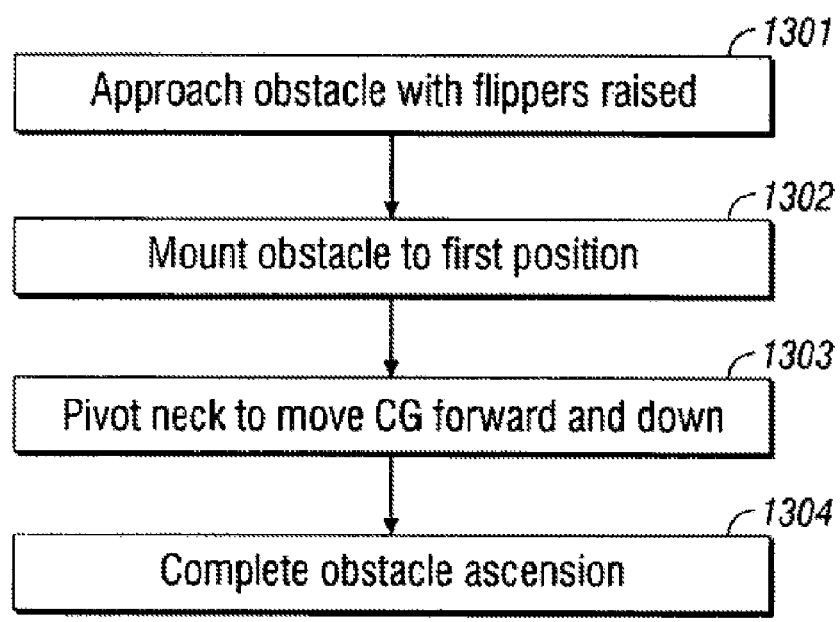
FIG. 13 is a flow chart of a method of ascending an obstacle.

FIG. 13 is a flow chart of a method of ascending an obstacle. The method is preferably employed with small robots having a neck and head as included herein, but may also be employed with larger robots or other vehicles. In Step 1301, the vehicle approaches the obstacle traveling forward and raises flippers (flippers are "front"). In step 1302, the vehicle mounts the obstacle preferably using its drive and flipper tracks, to a position where the vehicle combined CG is either over the top edge of the obstacle or maybe positioned thereby CG adjustment. In step 1303, the vehicle pivots its neck to move the CG forward (toward direction of motion) and preferably downward. In step 1304, flippers and drives are then used to complete the ascension. Various robots may be remotely controlled to perform the various navigational functions described herein, or they may be controlled by a programmed controller, preferably housed on the robot. A combination of such control methods may also be used.

Figure 14:
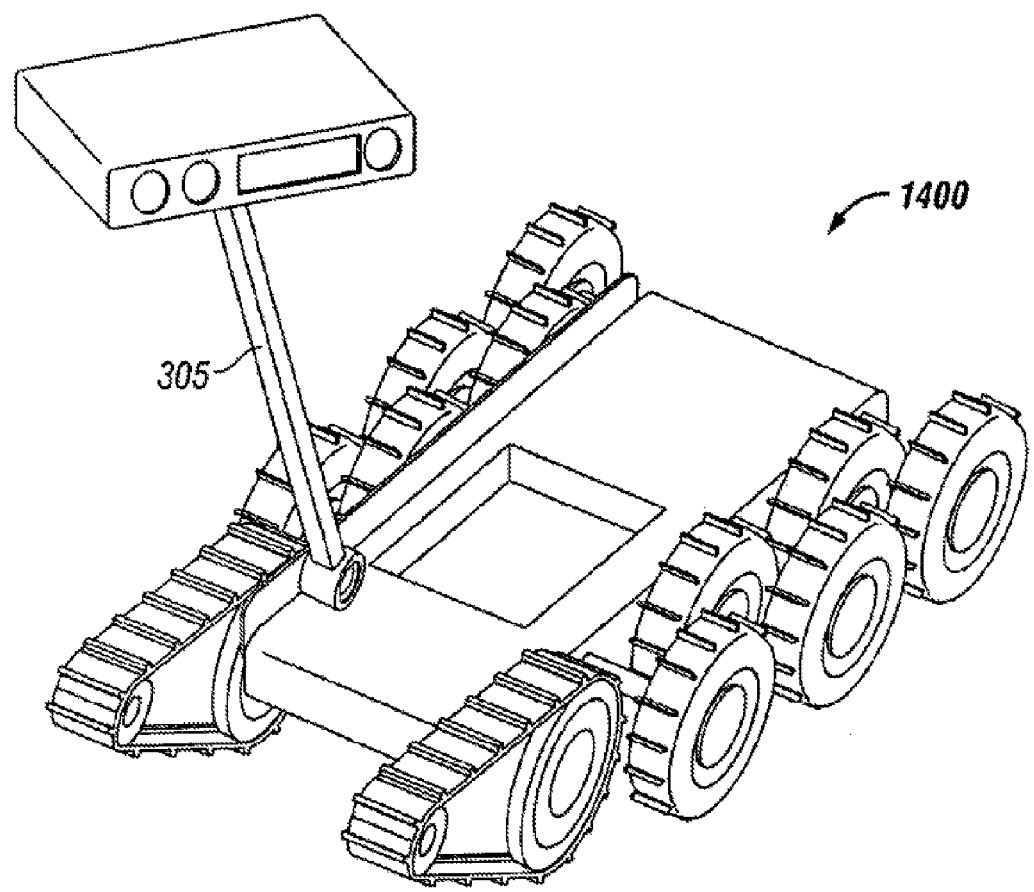
FIG. 14 shows a robot having a wheel drive.

FIG. 14 shows a robot 1400 having a wheel drive 1401. Wheels 1401 may be overlapped to provide track-like maneuvering capability. They may also be provided with independent suspension. Wheels 1401 may be commonly driven or independently driven. Robot 1400 may also perform the various CG shifting functions described herein.

Figure 15:
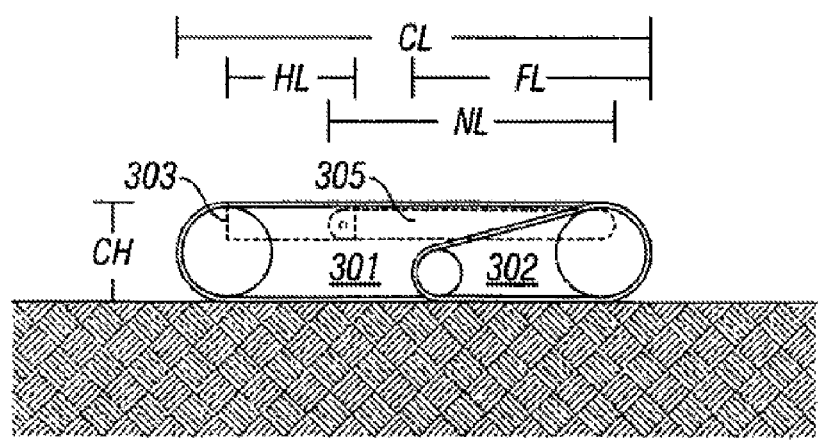
FIG. 15 depicts a robot in a stowed configuration.

FIG. 15 depicts a robot in a stowed configuration. Neck 303 and head 305 are stowed within the dimensions of chassis 301. Flippers 302 are also pivoted back and stowed within the chassis 301. This configuration provides a stowed length equal to the marked chassis length CL. That is, flipper length FL, neck length NL, and head length HL do not add to the combined length of the robot in this stowed position. Further, the flippers, head, and neck in stowed position do not extend beyond the chassis height marked CH (or beyond the chassis width.) One preferred robot design uses a CL of less than 24.5", a CH of less than 7.5", and a chassis width of less than 16".

Figure 16:
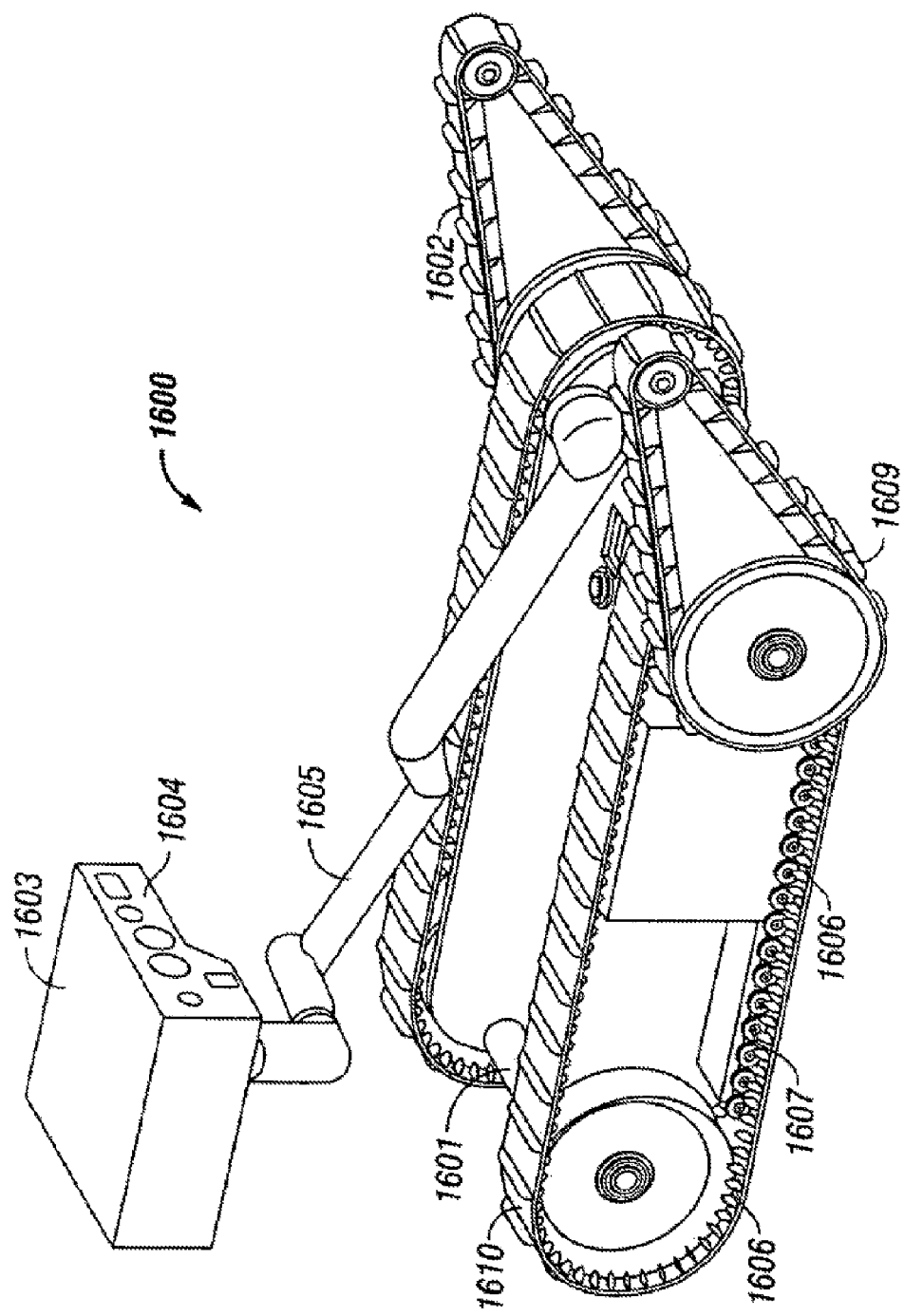
FIG. 16 depicts a perspective view of another robot vehicle.
Figure 17:
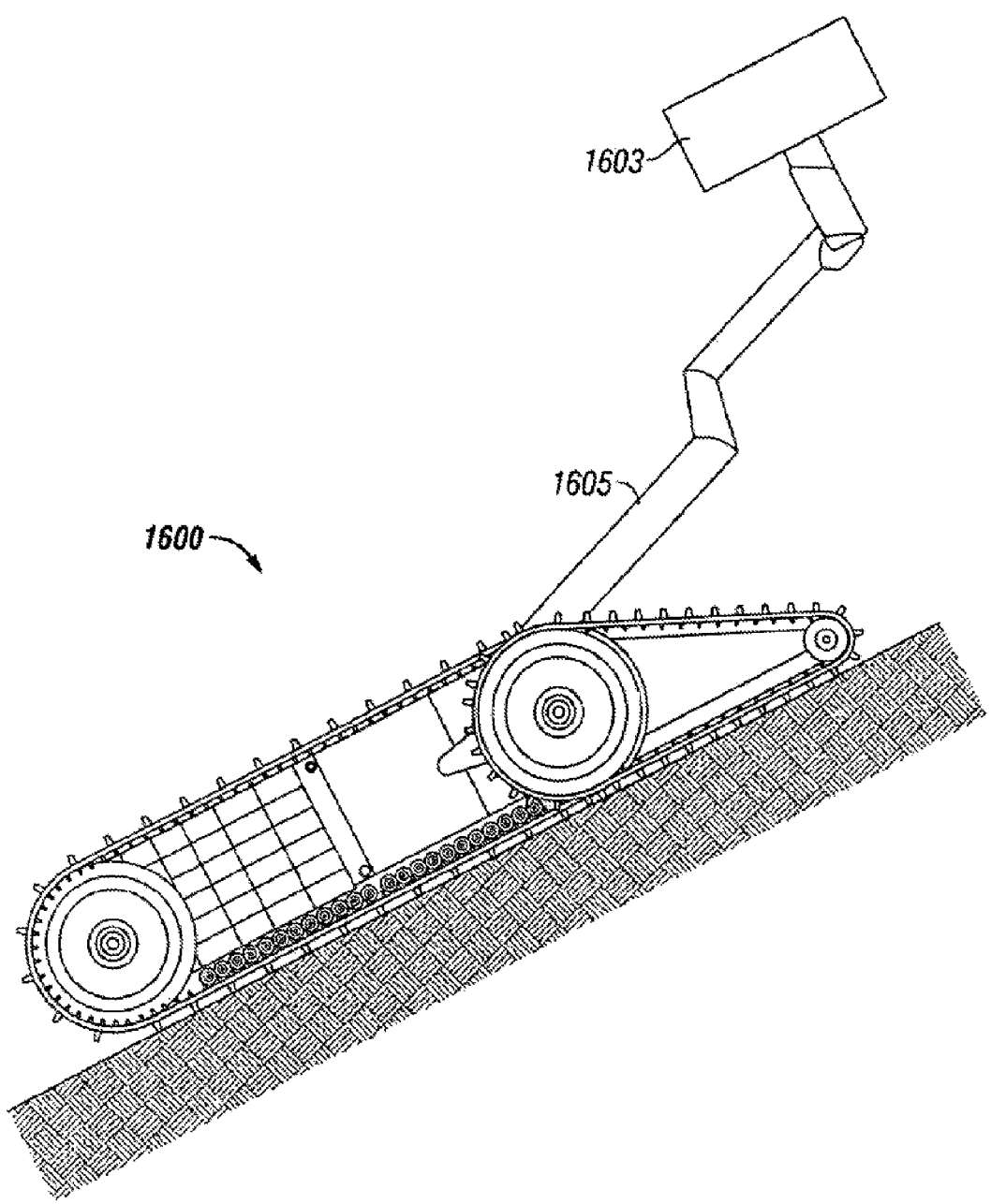
FIG. 17 depicts the robot of FIG. 16 in a climbing configuration.

FIG. 16 depicts a perspective view of another robot vehicle. FIG. 17 depicts the robot of FIG. 16 in a climbing configuration. Referring to FIGS. 16 and 17, the depicted robot vehicle has a chassis 1601 linked to a track drive comprising wheels 1606 and track 1610. The front of robot 1600 is provide with flippers 1602 having tracks driven by wheels 1600, which are linked to drive motors mounted on chassis 1601. The drive is preferably powered by power source 1608, which may be a battery, or other power source mounted to chassis 1601. The drive wheels maybe constructed according to techniques taught in U.S. Pat. No. 6,615,885, which has been incorporated by reference herein.

The depicted robot 1600 has an articulated neck 1605, which may orient head 1603 in various positions. FIG. 16 shows a typical maneuvering position with the neck angled backward, moving the combined center of gravity of robot further toward the rear end. This position may also allow viewing of flippers 1602 through visual sensors 1604. Bogie rollers 1607 support track 1610. Such rollers may be in a single line or may be staggered to provide more constant support for a track as it moves along a stair edge, for example.

FIG. 17 depicts robot 1600 in a position that may improve climbing capability. Flippers 1602 are deployed at a straight angle with the bottom of the chassis track drive. Neck 1605 is pivoted forward to move head 1603 in front of the vehicle and thereby shift forward the vehicle combined CG as described herein. Head 1603 is depicted rotated upon the final articulated portion of neck 1605, which may be employed to direct sensors 1604 to varied directions. The depicted angle of neck 1605 is exemplary, and neck 1605 may be deployed at various angles including below the angle of flippers 1602 in some implementations.

Figure 18:
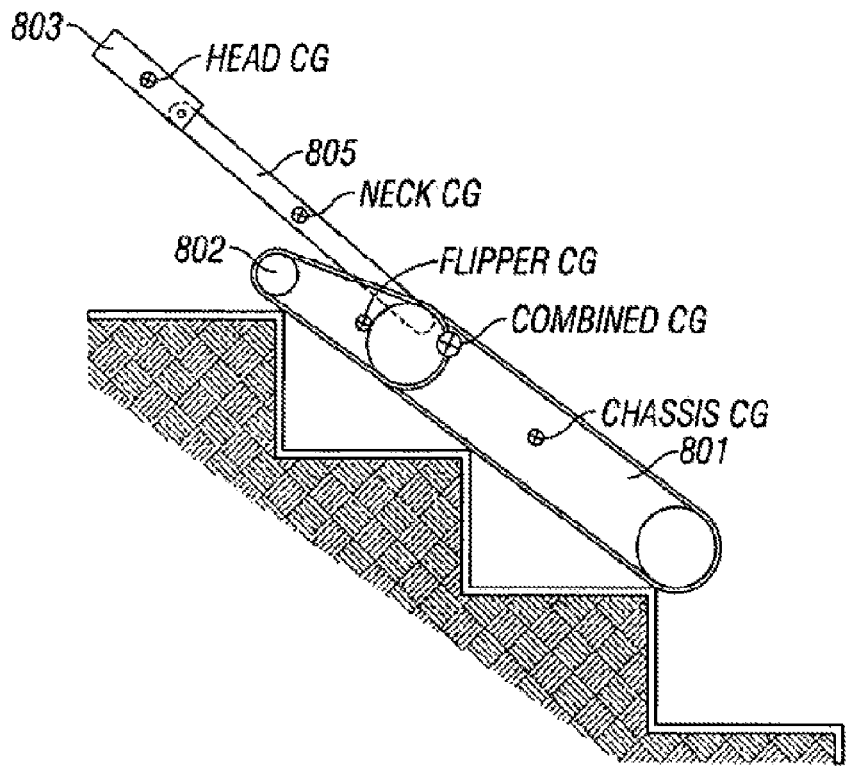
FIG. 18 depicts another robot in a stair climbing position with a forward-shifted combined CG

FIG. 18 depicts another robot in a stair climbing position with a forward-shifted combined CG. The depicted robot has chassis 801 having a chassis CG marked toward its center. The robot is climbing a stairway. Flippers 802 are pivoted in a forward position along the stairway, having their lower track aligned with the bottom of the main drive track of chassis 801. The combined CG is depicted as a large target dot. This combined CG location is produced by orienting the flippers (having the depicted flipper CG) as indicated and by moving neck 805 (having the depicted neck CG) with head 803 (having the depicted head CG). The CG positioned at this point allows smoother climbing as the rearmost track crests the depicted rearmost stair edge. The head is pivoted upward to allow sensors to view directly up the stairs.

Figure 19:
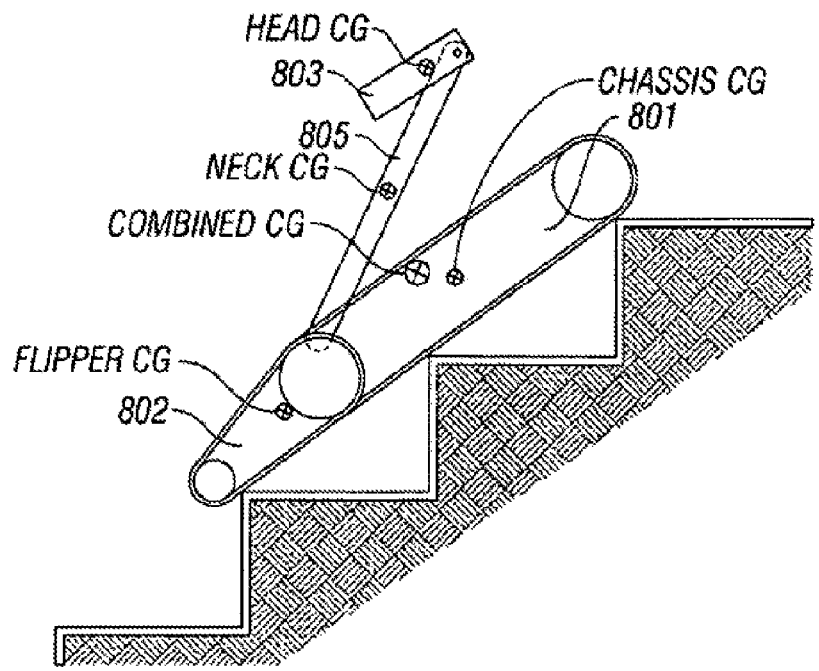
FIG. 19 depicts another robot in a stair descending position. In this configuration the robot has chassis pointing downward.

FIG. 19 depicts another robot in a stair descending position. In this configuration the robot has chassis 801 pointing downward. Neck 805 is pivoted back to move the combined CG (marked as "Combined CG") to its position above the central depicted stair edge. Head 803 is pivoted downward to view the path in front of the robot.

Figure 20:
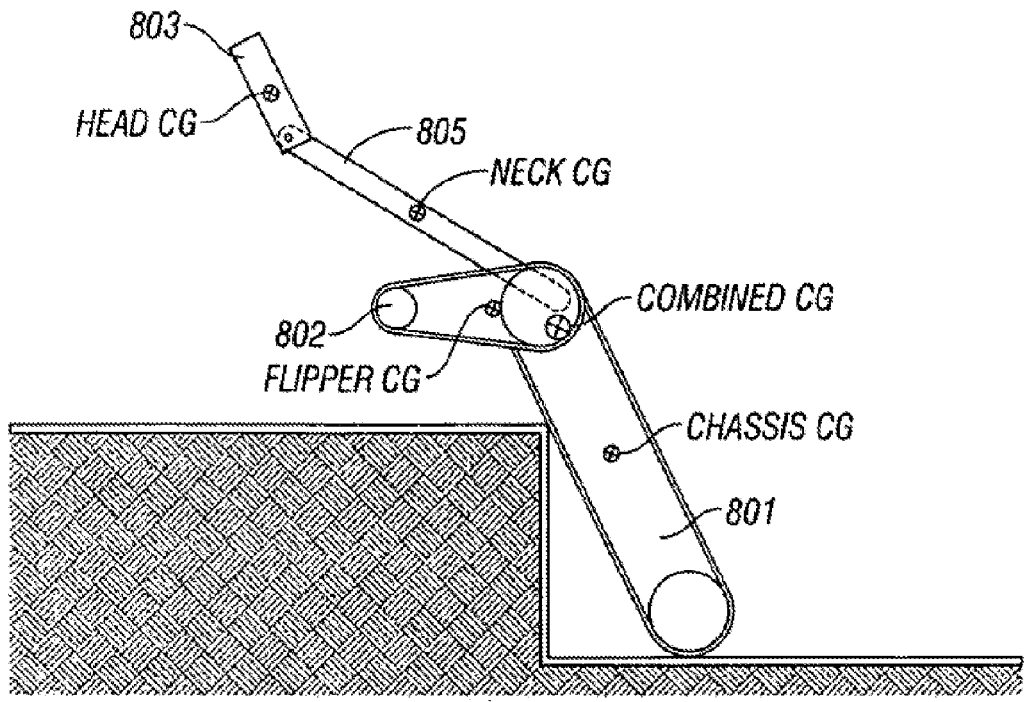
FIG. 20 depicts a robot climbing an obstacle forward.

FIG. 20 depicts a robot climbing an obstacle forward. The depicted robot employs its flipper 802 track drives and chassis 801 drive to crest the obstacle, then pivots forward flippers 802 and neck 805. Such movement shifts component weight to provide a combined CG at the depicted point above the crest of the obstacle, which allows forward movement of the total robot mass on top of the obstacle.

Figure 21:
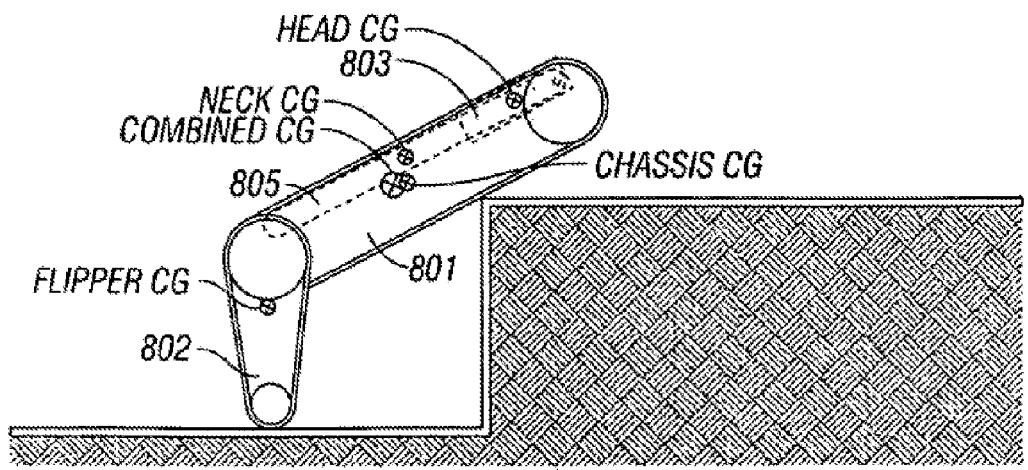
FIG. 21 shows a robot mounting an obstacle backwards.

FIG. 21 shows a robot mounting an obstacle backwards. The depicted robot preferably approaches the obstacle in a manner depicted in FIG. 8. Neck 805 and head 803 are then stowed to move the combined CG lower and toward the desired direction of movement. This technique preferably places the combined CG above the crest of the obstacle as indicated and makes forward movement possible up the obstacle.

Figure 22:
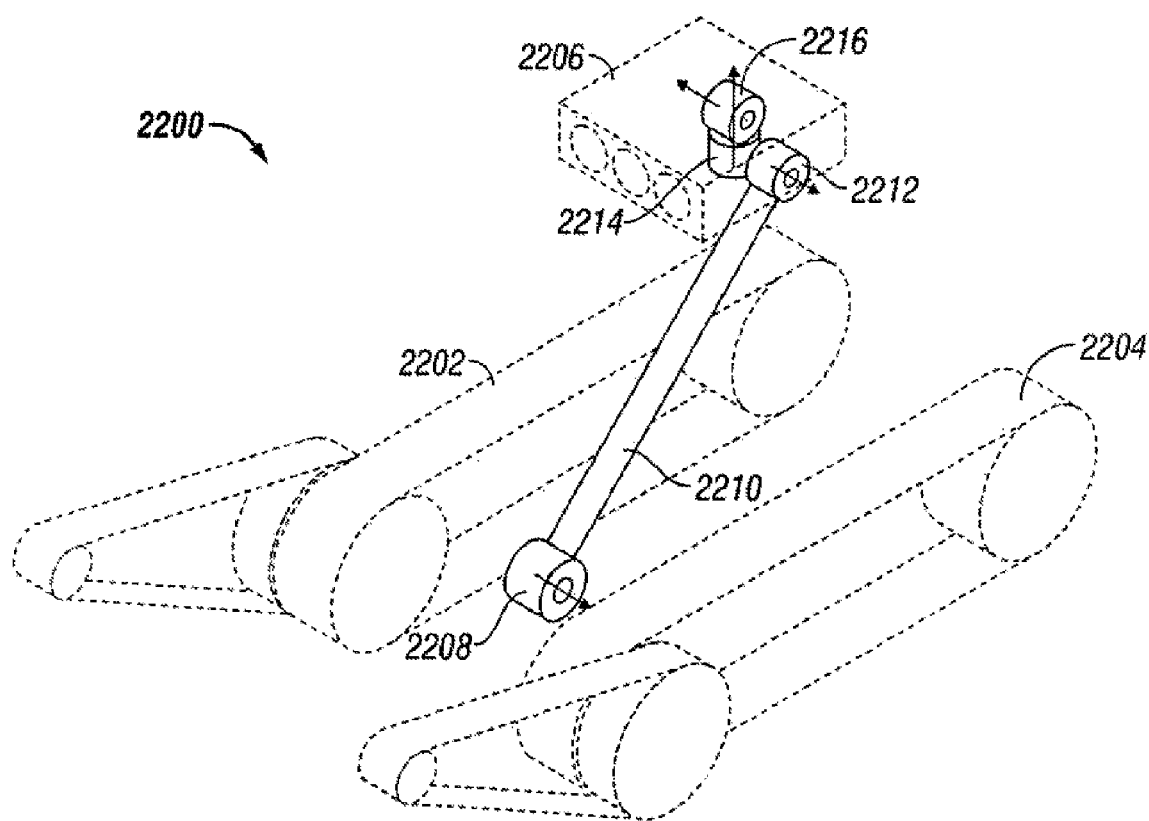
FIG. 22 shows a robot with a four degree of freedom system for positioning a sensor head.

FIG. 22 depicts a cutaway perspective view of a robot 2200 according to another embodiment. The view highlights the morphology of moving joints along the robot's neck extension and sensor head. Each depicted axis allows for pivotal or panning movement about the central axis arrows depicted for illustration only. Robot 2200 includes generally a right track assembly 2202, a left track assembly 2204, and a head 2206, which are illustrated in dotted lines to show their position relative to the depicted actuated joints or axes.

Specifically, the depicted robot also includes a shoulder axis or actuated joint 2208, a neck 2210, a first tilt axis or actuated joint 2212, a pan axis or actuated joint 2214, and a second tilt axis or actuated joint 2216. Each depicted axis allows for pivotal or panning movement about the central axis arrows depicted for illustration only. The depicted axes are actuated joints moveable by robotic actuators coupled thereto. A preferred joint or axis design includes an actuator module with a motor, a motor driver, and digital logic for motor control. Axes employed herein may have variations of size, actuator power, and other parameters based on design considerations. For example, shoulder actuated joint or axis 2208 may be more powerful than the other depicted axes in some designs because of neck/head weight. Appropriate gears may also couple the actuators to the attached moveable joints. One preferred actuator design scheme is further described below, but any suitable actuators may be used.

Shoulder axis 2208 is mounted toward one end of the robot 2200 and is used to elevate the neck 2210. Preferably, actuated joint 2208 has a movement range limited only by the chassis of robot 2200. The movement range thereby extends below parallel toward both ends of robot 2200 in a preferred design. Preferred actuator circuitry is further described below. Toward the distal end of neck 2210, is first tilt axis 2212. Tilt axis 2212 is, in this embodiment, parallel to shoulder axis 2208. Connected to one side of tilt axis 2212 is pan axis 2214, which is used for panning the head. Connected along the top of pan axis 2214 is the second tilt axis 2216. The depicted sensor head 2206 is fixed to the top of tilt axis 2216. Preferably, neck 2210 is constructed to provide a large range of movement at each of the depicted axes.

Figure 23:
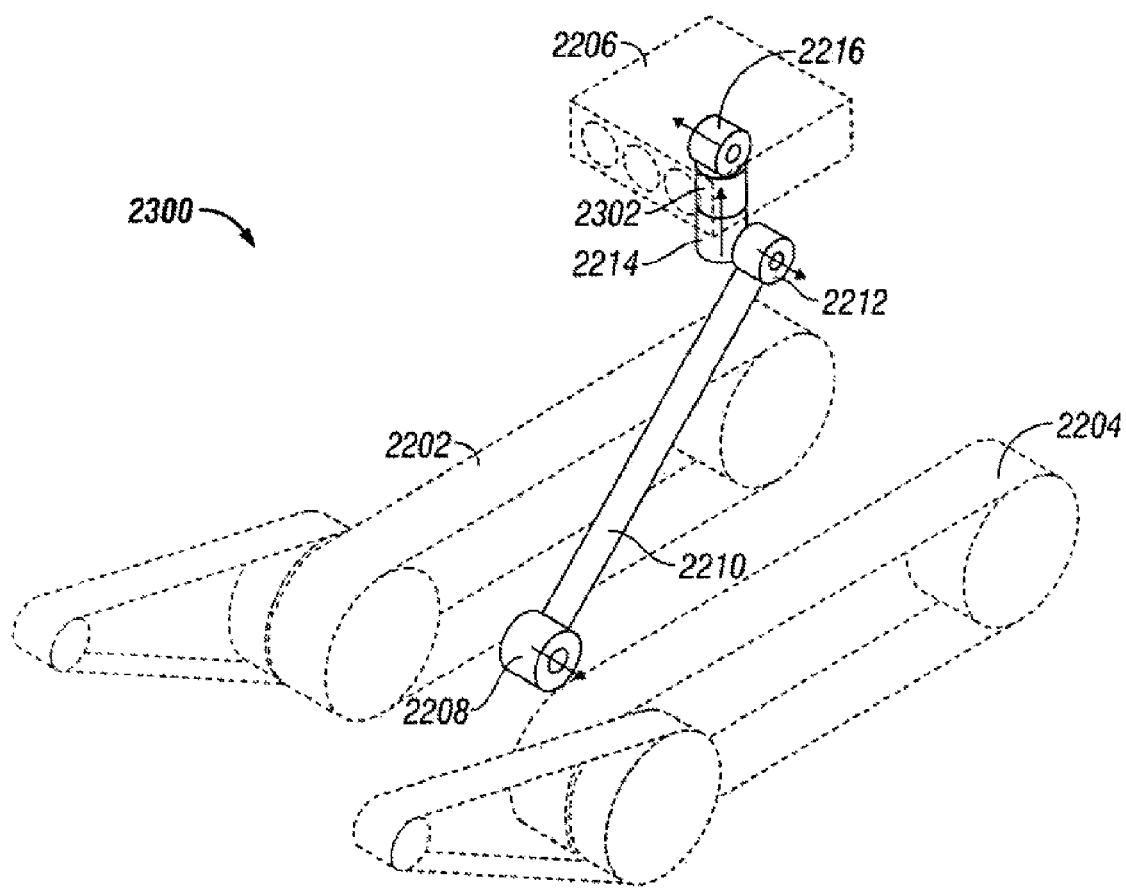
FIG. 23 shows a robot with four degrees of freedom and a "pan-link" section for positioning a head.

FIG. 23 illustrates a cutaway perspective view of another robot 2300. The depicted view highlights the different neck-head axis topology. Each depicted axis allows for pivotal or panning movement about the central axis arrows depicted for illustration only. In this embodiment, the robot 2300 comprises right track assembly 2202, left track assembly 2204, and head 2206. Robot 2300 also comprises shoulder axis 2208, neck 2210, and first tilt axis 2212. The first tilt axis 2212 is attached to a pan link 2302. The pan link is also attached to the second tilt axis 2216, and the second tilt axis 2216 is movably coupled to the head 2206. The pan link 2302 in general is an assembly with a panning axis and one or more extended pieces which may include bends. A pan link may be packaged into an assembly including a first piece perpendicular to neck 2210, an actuator, and a second piece pivotable in a plane approximately parallel to neck 2210. (A preferred pan axis is further described below). The depicted axes or "joints" are preferably implemented with actuators constructed as described herein. Various embodiments may employ different configurations to implement axes or joints depicted herein. As will be described further below, the pan link may be constructed with a height that is approximately equivalent to the height of a single actuator.

Figure 24:
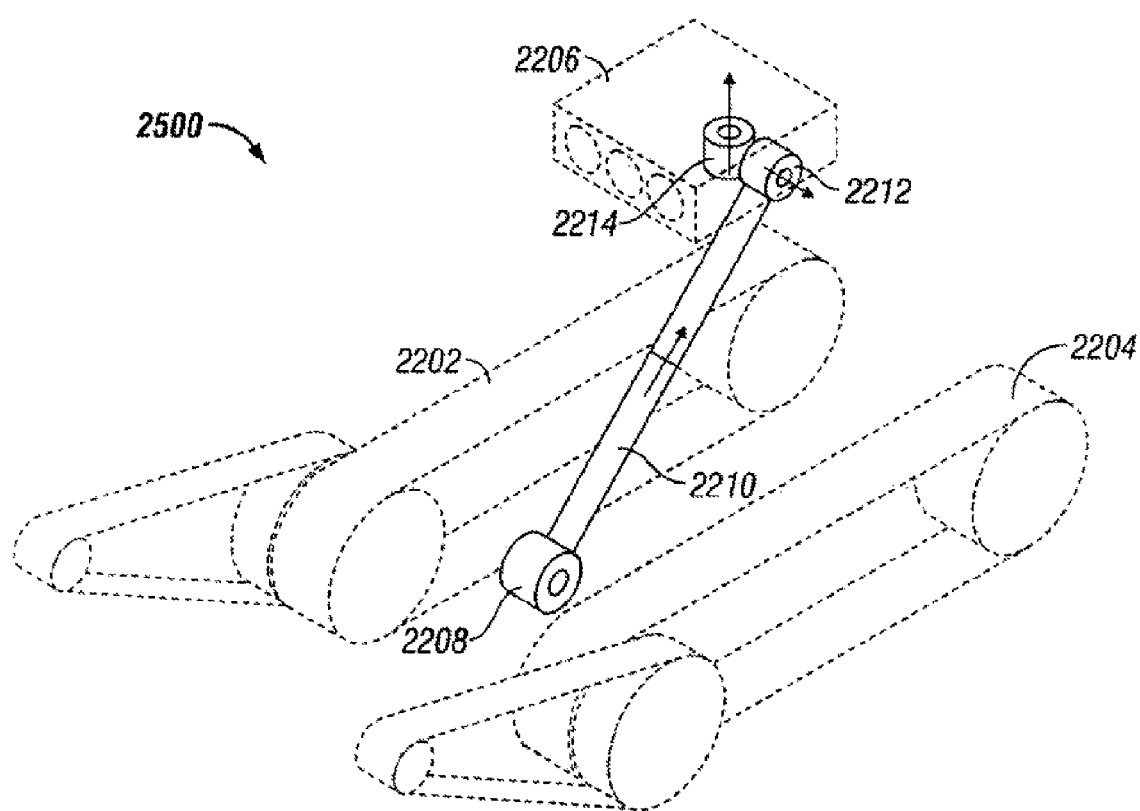
FIG. 24 shows a robot that implements a possible four degree of freedom system for positioning a head employing another joint morphology.

FIG. 24 depicts a cutaway perspective view of a robot 2500 according to another embodiment. Each depicted axis allows for pivotal or panning movement about the central axis arrows depicted for illustration only. The depicted axes are preferably implemented with actuators constructed as described herein. In this embodiment, robot 2500 comprises right track assembly 2202, left track assembly 2204, and head 2206. Robot 2500 in this embodiment also includes shoulder axis 2208, neck 2210, first tilt axis 2212, and tilt axis 2214. First tilt axis 2212 is movably attached to tilt axis 2214, which is directly attached to head 2206. Panning capability provides the fourth degree of freedom of movement, and is enabled by twist joint 2502. An actuator providing joint movement for twist joint 2502 may be provided in the interior of neck 2210 or mounted to the exterior. This variation provides four degrees of freedom for movement while positioning three axes or actuated "joints" with a short lever arm to move sensor head 2206.

Figure 25:
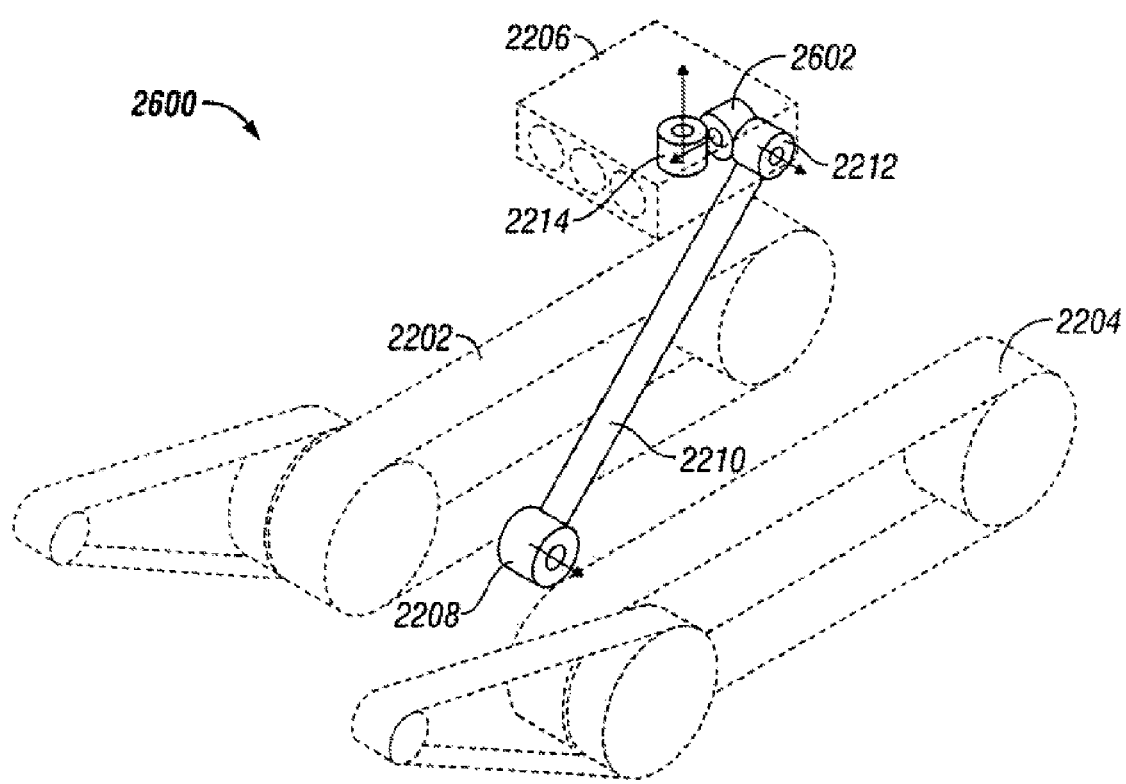
FIG. 25 shows another robot that implements a possible four degree of freedom system for positioning a head employing another joint morphology.

FIG. 25 depicts another example of a robot 2500 in a perspective view. Each depicted axis allows for pivotal or panning movement about the central axis arrows depicted for illustration only. The depicted axes are preferably implemented with actuators constructed as described herein. In this embodiment, robot 2600 includes right track assembly 2202, left track assembly 2204, and head 2206. Robot 2500 also comprises shoulder axis 2208, neck 2210, first tilt axis 2212, and pan axis 2214. In this embodiment, first tilt axis 2212 is mounted toward the distal end of neck 2210. A second tilt axis 2602 is connected to one side of tilt axis 2212. Tilt axis 2602 is connected to a piece of tilt axis 2212 that is moveable with respect to neck 2210, and the second tilt axis is similarly coupled to the pan axis 2214 to allow panning movement of head 2206.

Figure 26:
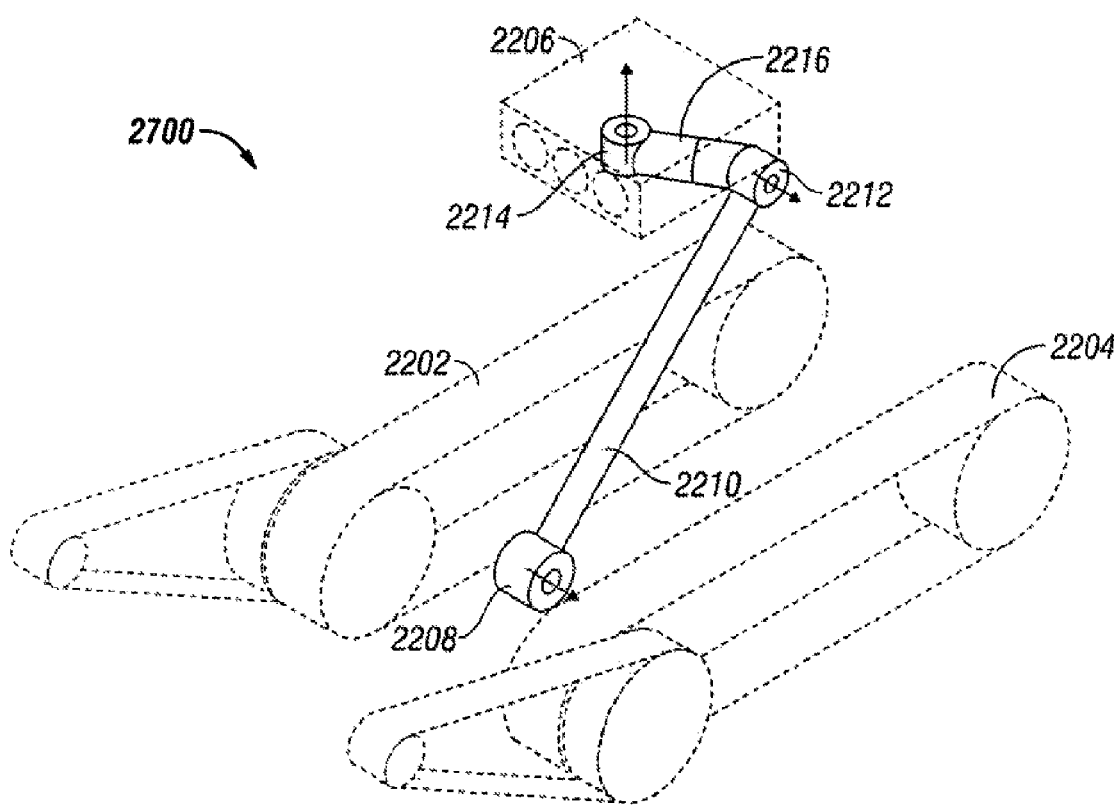
FIG. 26 shows another robot that implements a possible four degree of freedom system for positioning a head using a joint morphology that includes a 45-degree link.

FIG. 26 depicts a perspective view of a robot 2600 according to another embodiment. Each depicted axis allows for pivotal or panning movement about the central axis arrows depicted for illustration only. The depicted axes or "joints" are preferably implemented with actuators constructed as described herein. In this embodiment, robot 2600 includes right track assembly 2202, left track assembly 2204, and head 2206. Robot 2600 also includes shoulder axis 2208, neck 2210, and first tilt axis 2212 mounted toward the distal end of neck 2210. First tilt axis 2212 is movably coupled by the actuator tilt action to a 45-degree link section 2702. The 45-degree link section 2702 may be capable of rotational motion about its length. Pan axis 2214 is fixed at the distal end of link section 2702, and head 2206 is thereby moveably mounted to the top of pan axis 2214.

Figure 27:
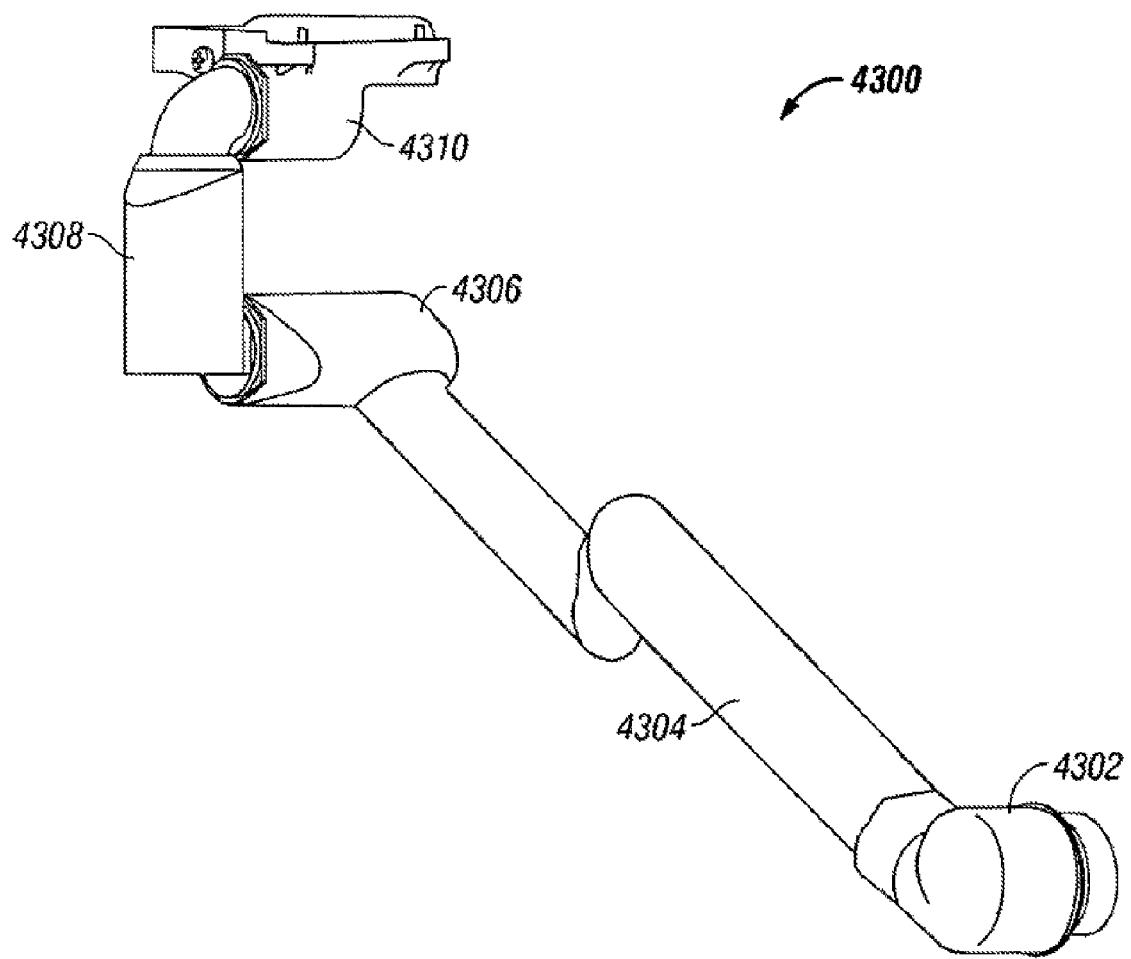
FIG. 27 illustrates a possible configuration of a preferred design for a neck extension and actuator assembly.

FIG. 27 illustrates a possible configuration of a preferred design for a neck extension and actuator assembly 4300 ("assembly 4300") having a pan axis. Assembly 4300 comprises a shoulder actuated joint 4302, a neck 4304, a first actuated tilt joint 4306, a actuated pan link 4308, and a second actuated tilt joint 4310. The robot's sensor head is meant to be mounted atop the actuated tilt joint 4310. The depicted pan link design is a presently preferred embodiment of a pan link (FIG. 23). Shoulder actuated joint 4302 is coupled to neck 4304, and neck 4304 is coupled to first actuated tilt joint 4306. First actuated tilt joint 4306 is movably coupled to pan link 4308. Pan link 4308 in this configuration is movably coupled to actuated tilt joint 4310, and is capable of panning the actuated tilt joint 4310. The depicted axes are preferably implemented with actuators constructed as described herein.

Actuated pan link 4308 provides further degrees of freedom head movement over other embodiments described herein with less than four degrees of freedom. The center of gravity shifting (CG shifting) techniques described herein may also be enhanced with use of pan link 4308. Specifically, the pan link may be pivoted or extended backward to achieve maximum rearward CG shifting described herein for tasks such as the beginning phases of an obstacle climb. Similarly, actuated pan link 4308 maybe pivoted forward and the head tilted down to achieve maximum forward-down CG shifting for tasks such as stair ascending and completing a large obstacle ascension, for example.

Figure 28:
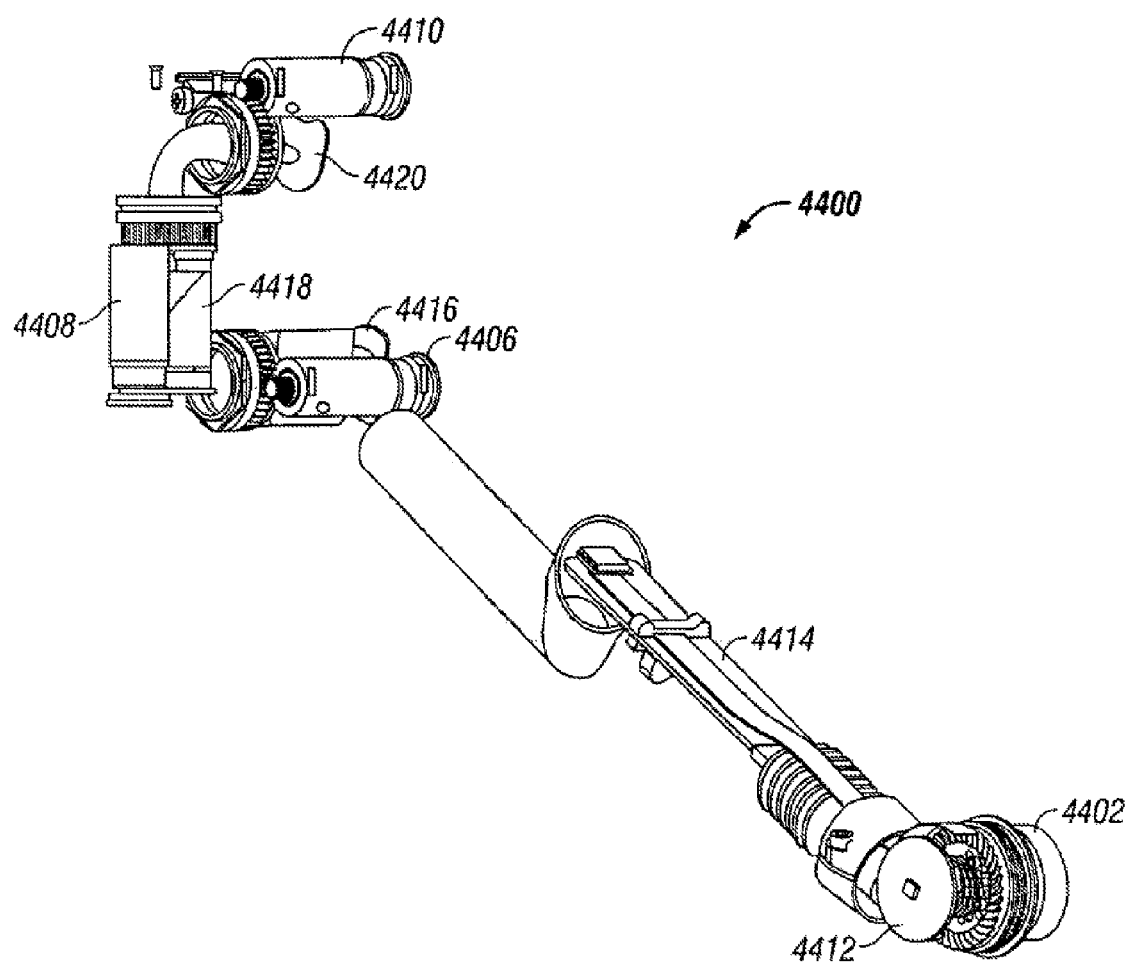
FIG. 28 illustrates a cutaway view of a possible embodiment of the actuator assembly of FIG. 27.

FIG. 28 illustrates a cutaway view of a possible embodiment of a robotic actuator assembly 4400 of FIG. 27. In this view, some of the outer housings have been removed in order to reveal that the assembly 4400 includes a shoulder axis actuator 4402, a first tilt axis actuator 4406, a pan link actuator 4408, and a second tilt axis actuator 4410. In this view, it can also be seen that the assembly 4400 also includes a shoulder axis circuit board 4412, a neck circuit board 4414, a first tilt axis circuit board 4416, a pan link circuit board 4418, and a second tilt axis circuit board 4420. Each the circuit boards 4412 through 4420 provide the circuit connectivity, power regulation, motion control, sensors, and other functions related to each axis, and the circuit boards 4412 through 4420 may be rigid circuit boards, flexible polyimide circuits, or other circuit modules or combinations thereof.

Figure 29:
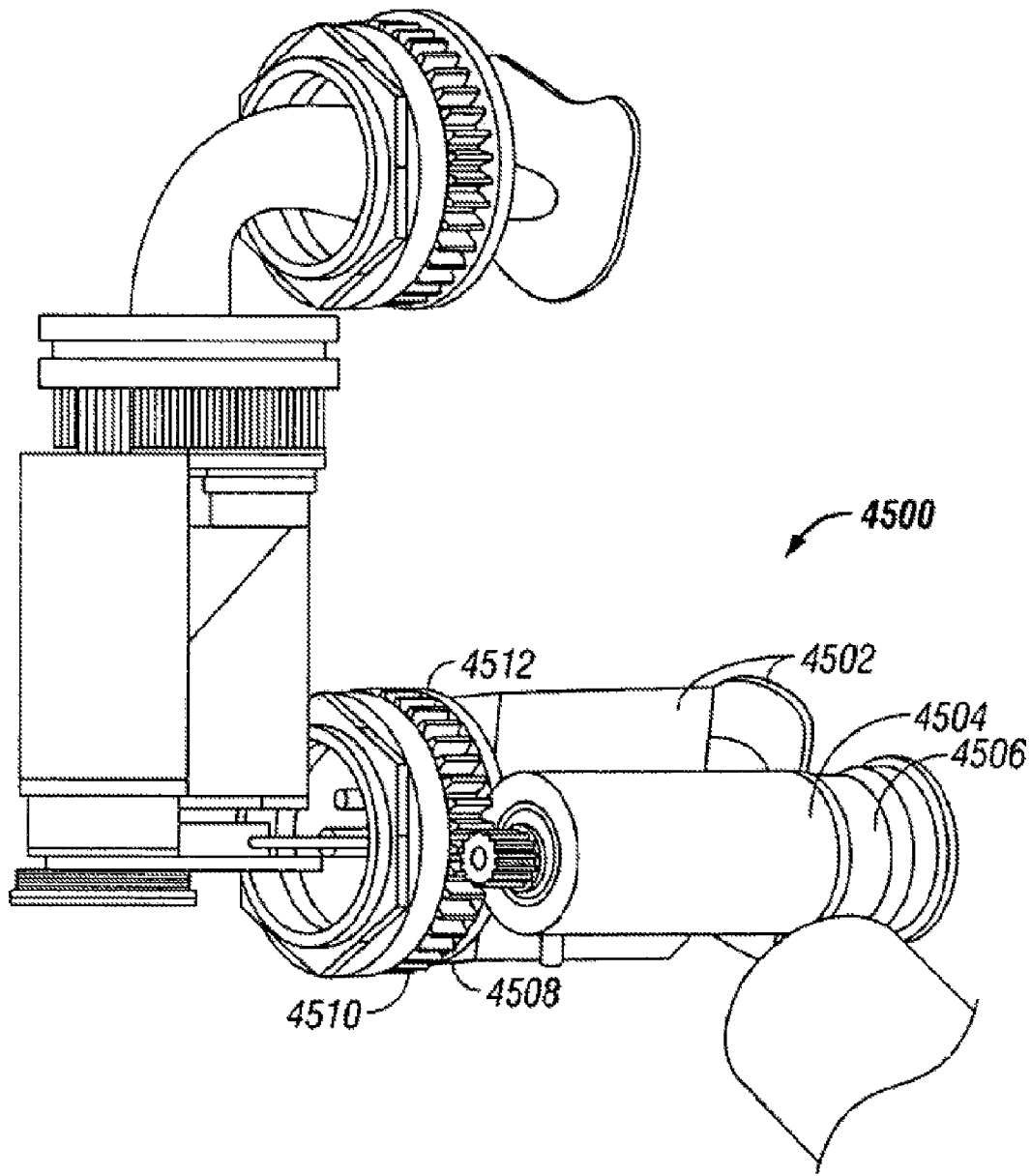
FIG. 29 depicts a cutaway view of a possible embodiment of a first tilt axis of the actuator assembly of FIG. 27.

FIG. 29 depicts a cutaway view of a possible embodiment of a first tilt axis 4500. In this view, the outer housing of the axis 4500 has been removed to reveal internal components that include circuit boards 4502, a motor 4504, a ring gear 4506, a pinion gear 4508, a output gear 4510, and a slip ring 4512. Circuit boards 4502 and slip ring 4512 may be rigid circuit boards, flexible polyimide circuits, or other circuit modules or combinations thereof, and may provide power regulation, motion control, sensors, and other functions related to the axis 4500. Motor 4504 is coupled to ring gear 4506, and ring gear 4506 is mechanically linked to pinion gear 4508 via a collection of planetary gears (hidden in this view). Ring gear 4506, pinion gear 4508, and the hidden planetary gears form a "planetary" gear system which transfers power from the motor 4504 to the output gear 4510 and provides a gear ratio. Slip ring 4512 provides electrical connections that may conduct power, communications, and other signals.

Figure 30:
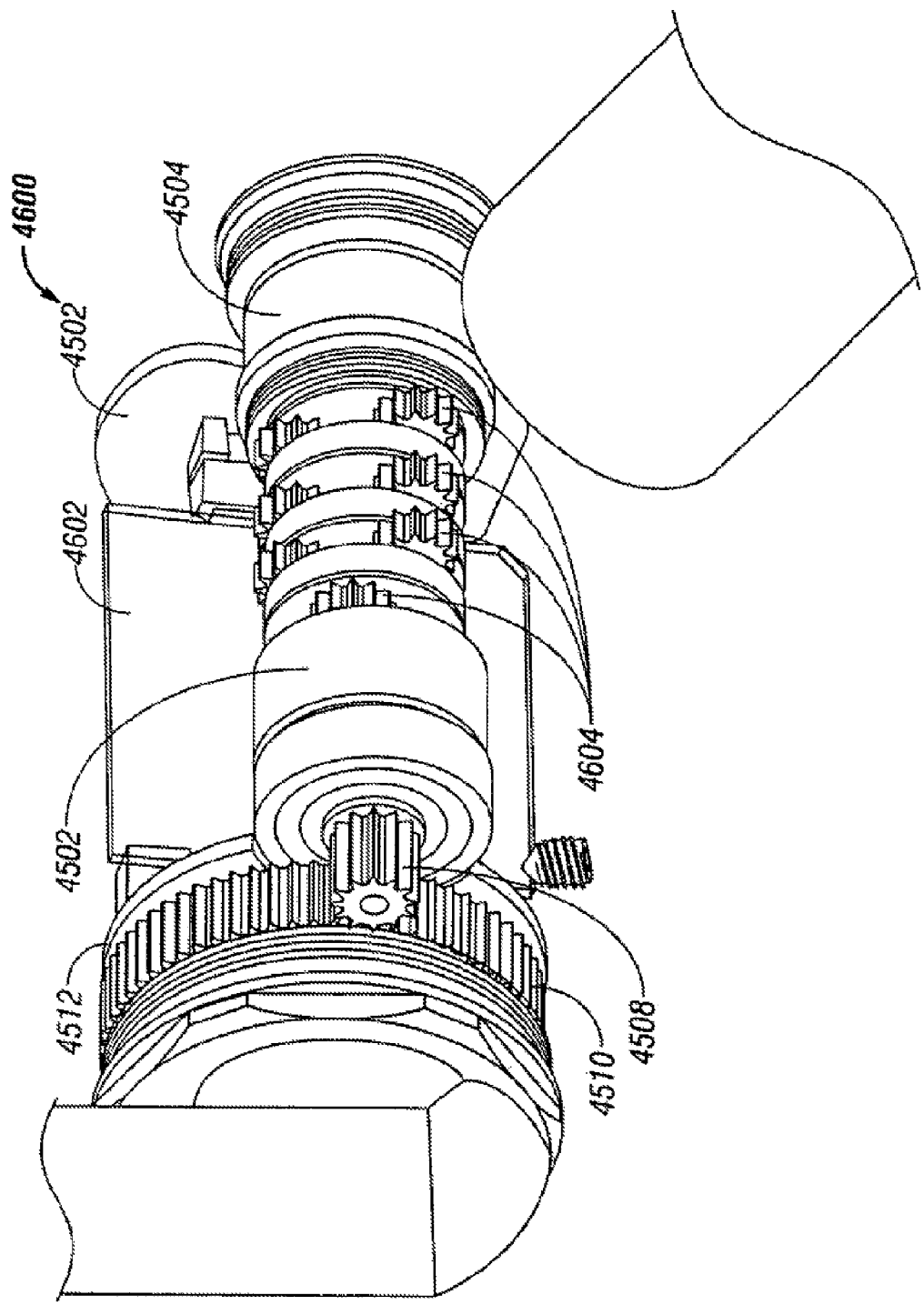
FIG. 30 depicts another cutaway view of a possible embodiment of a first tilt axis of the actuator assembly of FIG. 27.

FIG. 30 depicts another cutaway view of a possible embodiment of a first tilt axis 4600. In this view, the outer housing and ring gear have been removed. In this view, circuit boards 4502, motor 4504, pinion gear 4508, output gear 4510, and slip ring 4512 are all visible. In this view, it can be seen that axis 4600 also includes a slip clutch 4602 and a collection of planet gear assemblies 4604. The depicted slip clutch 4602 may help mitigate damage to the gears from outside pressure rotating the robot neck, for example. One preferred slip clutch design slips at about 400 inch-pounds of force. Other slip clutches may be used. The depicted motor actuator assembly is preferably backdriveable. Referring again to the actuated joints depicted in FIG. 27, actuated tilt joint 4306, actuated pan joint 4308, an actuated tilt joint 4310, each employ backdriveable actuator motor in preferred embodiments. Preferably, the actuator modules employed in these three actuated joints are interchangeable. That is the modules employed his same motor, geared slip clutch, and gear electronics. In a preferred embodiment the actuated shoulder joint 4302 is non-backdriveable.

Figure 31:
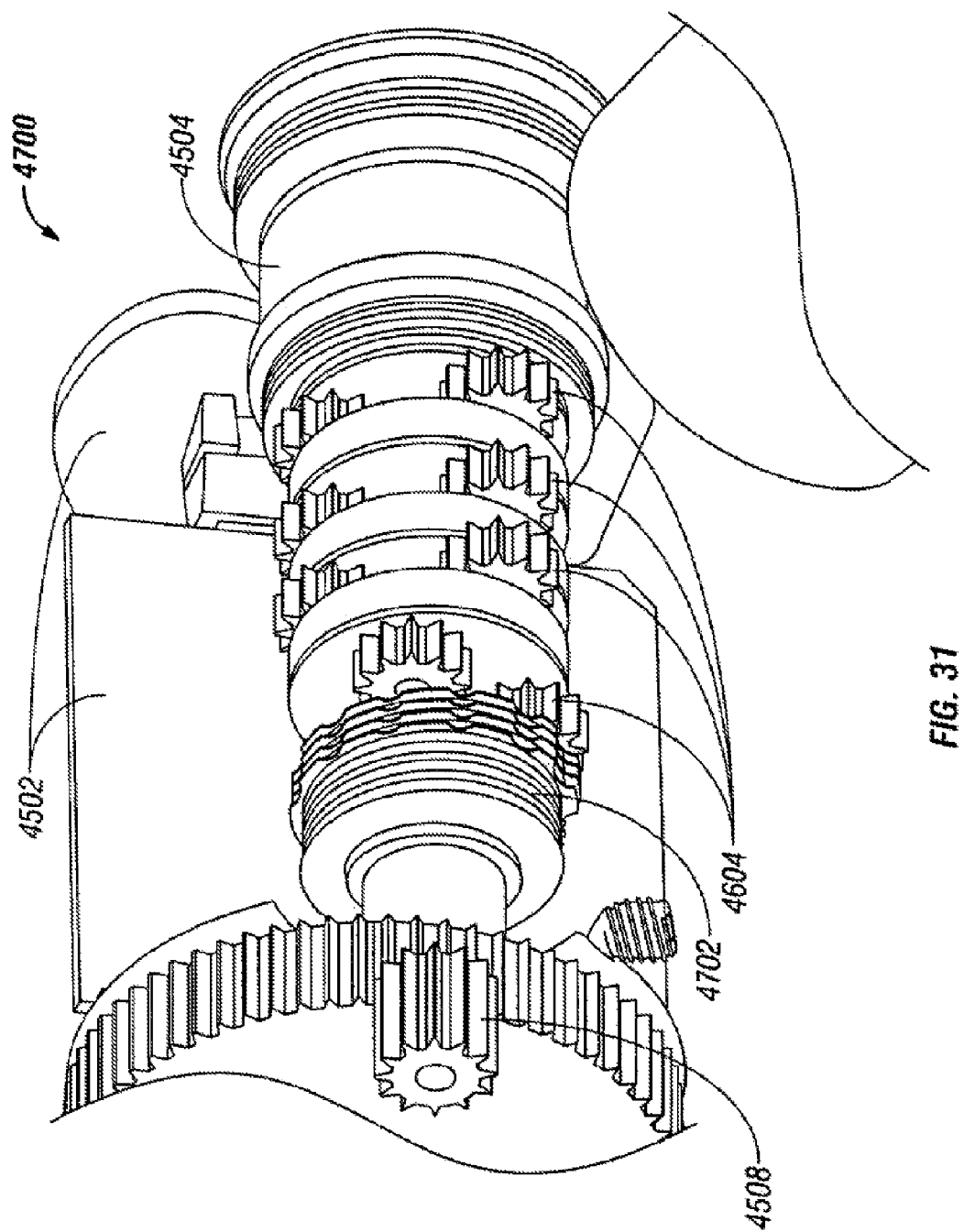
FIG. 31 depicts yet another cutaway view of a possible embodiment of a first tilt axis of the actuator assembly of FIG. 27.

FIG. 31 depicts a cutaway view of a possible embodiment of a first tilt axis 4700. This view has the outer housing and ring gear removed and depicts circuit boards 4502, motor 4504, pinion gear 4508, and planet gear assemblies 4604.

This view also has the slip clutch housing removed to reveal the clutch pack 4702. The clutch pack includes a collection of clutch wafers and springs. While one slip clutch embodiment is disclosed, other suitable clutches maybe employed depending on size, actuator design, performance requirements, and other design constraints.

Figure 32:
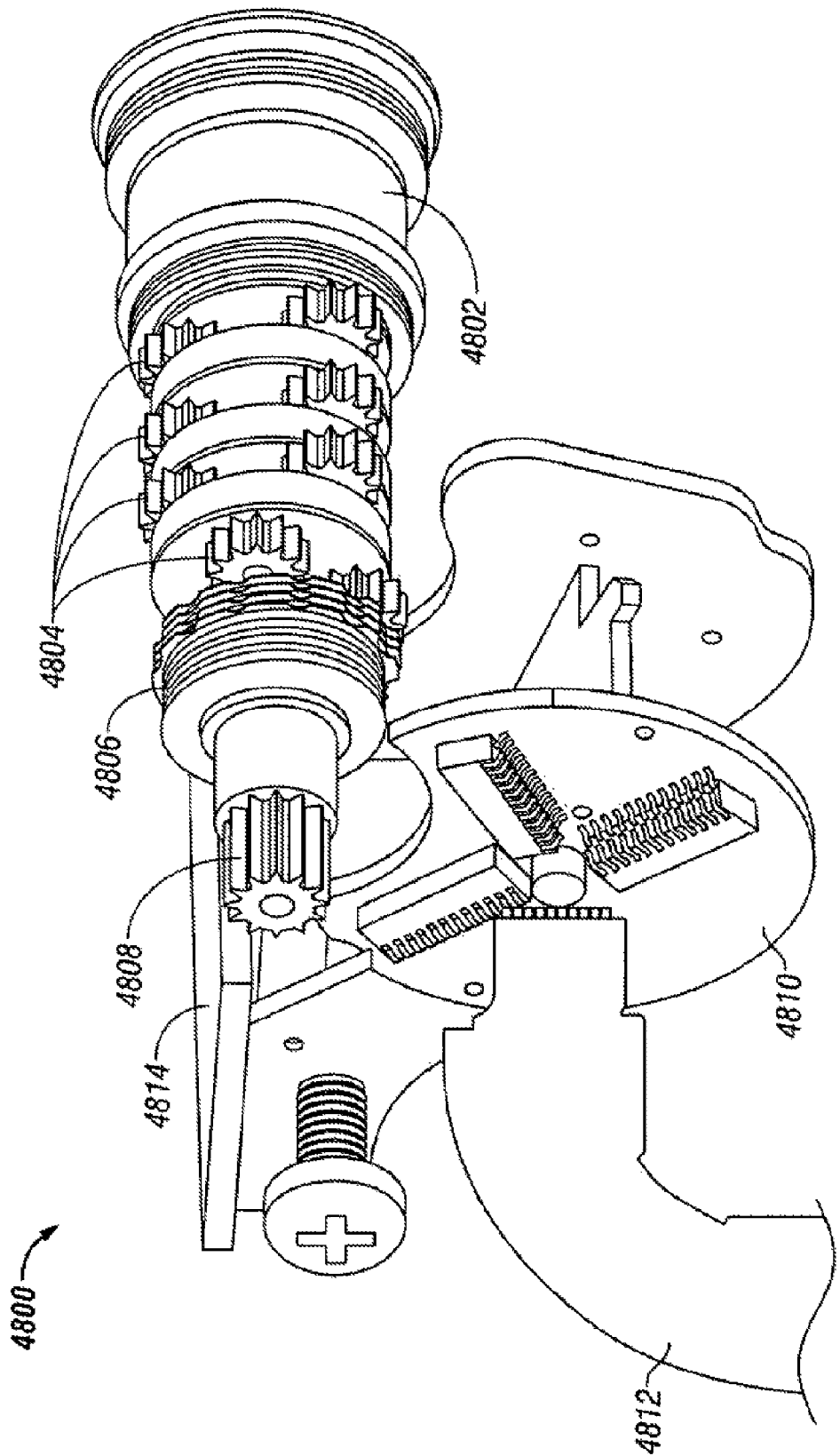
FIG. 32 illustrates a cutaway view of a possible embodiment of a second tilt axis of the actuator assembly of FIG. 27.

FIG. 32 illustrates a cutaway view of a possible embodiment of a second tilt axis 4800. This assembly includes an outer housing (removed in this view), a ring gear (removed in this view), a motor 4802, a collection of planet gears 4804, a clutch pack 4806, and a sun gear 4808. The axis 4800 also includes a slip ring 4810, and in this view half of the slip ring has been hidden in order to reveal a collection of electrical contacts 4812 that may conduct power, communications, and other signals from the visible half of slip ring 4810 to the hidden half. Circuit boards 4810 and 4814 maybe rigid circuit boards, flexible polyimide circuits, or other circuit modules or combinations thereof, and may provide power regulation, motion control, sensors, and other functions related to the axis 4800.

Figure 33:
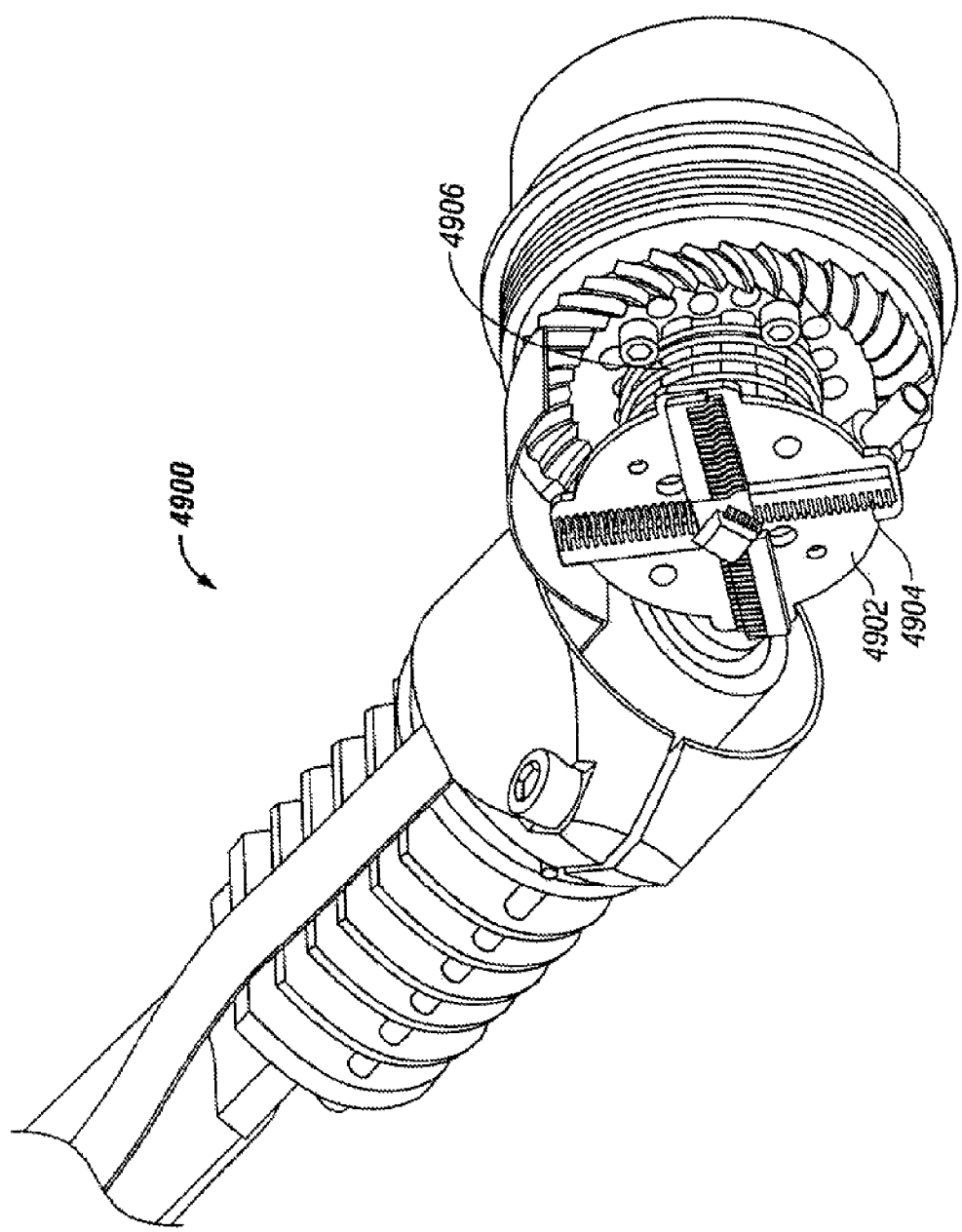
FIG. 33 illustrates a cutaway view of a possible embodiment of a neck attachment or "shoulder" axis of the actuator assembly of FIG. 27.

FIG. 33 illustrates a cutaway view of a possible embodiment of a neck attachment or "shoulder" axis 4900. Various components have been hidden in this view in order to reveal that the neck axis 4900 includes a slip ring 4902. In this view, half of the slip ring has been hidden to reveal that the slip ring includes a collection of electrical contacts 4904 that may conduct power, communications, and other signals from the hidden half to the visible half of slip ring 4902. Neck axis 4900 also includes a spring 4906 mounted behind the slip ring 4902. This spring 4906 may allow the slip ring to float, and this may allow the axis 4900 to be constructed using greater mechanical tolerances than may otherwise be allowed.

Figure 34:
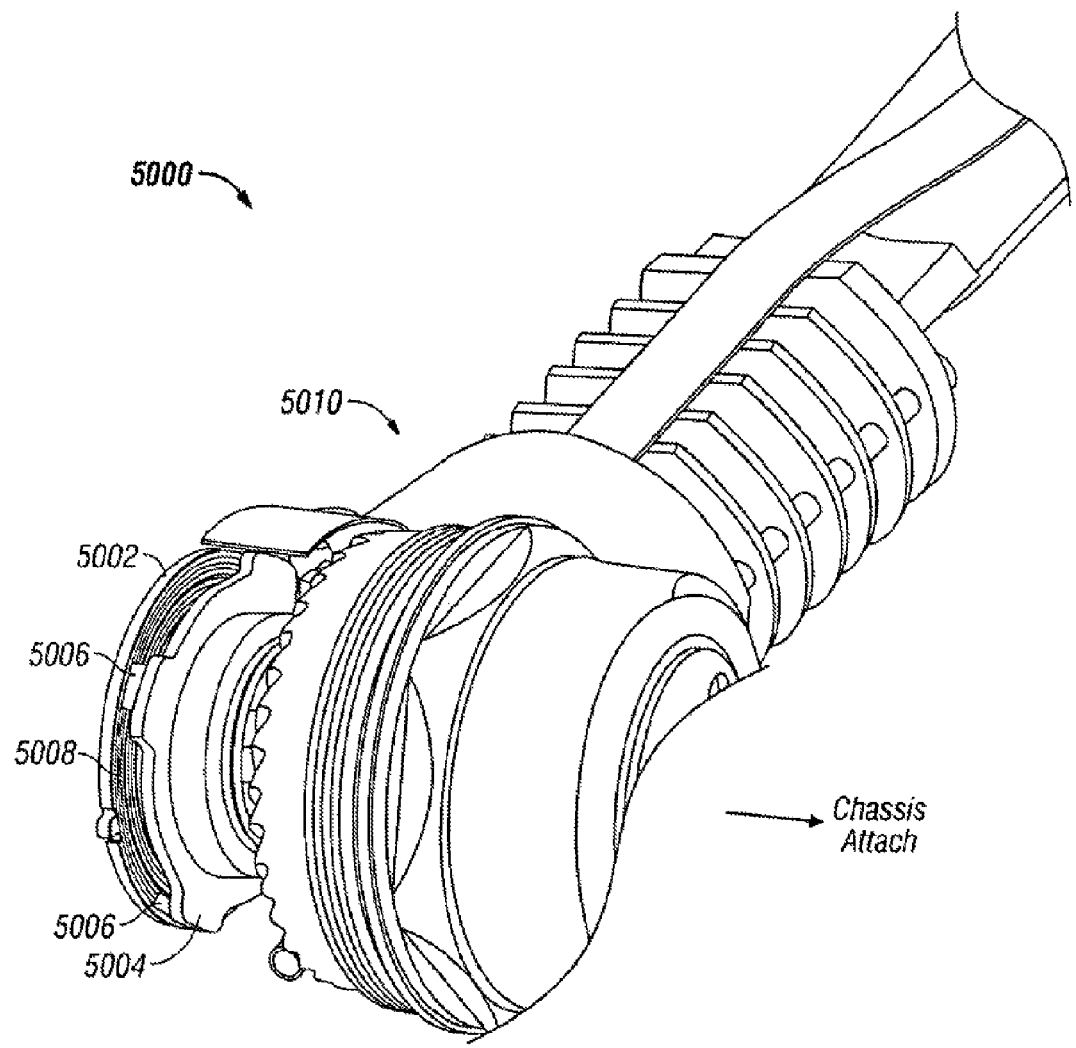
FIG. 34 illustrates another cutaway view of a possible embodiment of a neck attachment or "shoulder" axis of the actuator assembly of FIG. 27.

FIG. 34 depicts another cutaway view of a possible embodiment of a neck axis 5000. Various components have been hidden in this view in order to reveal that the neck axis 5000 includes a first slip ring half 5002, a second slip ring half 5004, and a collection of electrical contacts 5006. Contacts 5006 maintain electrical contact with a collection of concentric electrical traces 5008. Slip ring components 5002 through 5008 may be used to conduct power, communications, and other signals. First slip ring half 5002 and second slip ring half 5004 may be constructed such that when the neck axis 5000 is disassembled, the halves 5002 and 5004 separate. Such construction preferably allows a wire free connection of robot neck and head. In certain embodiments, the first slip ring half 5002 and second slip ring half may be used as an absolute encoder pair.

Figure 35A:
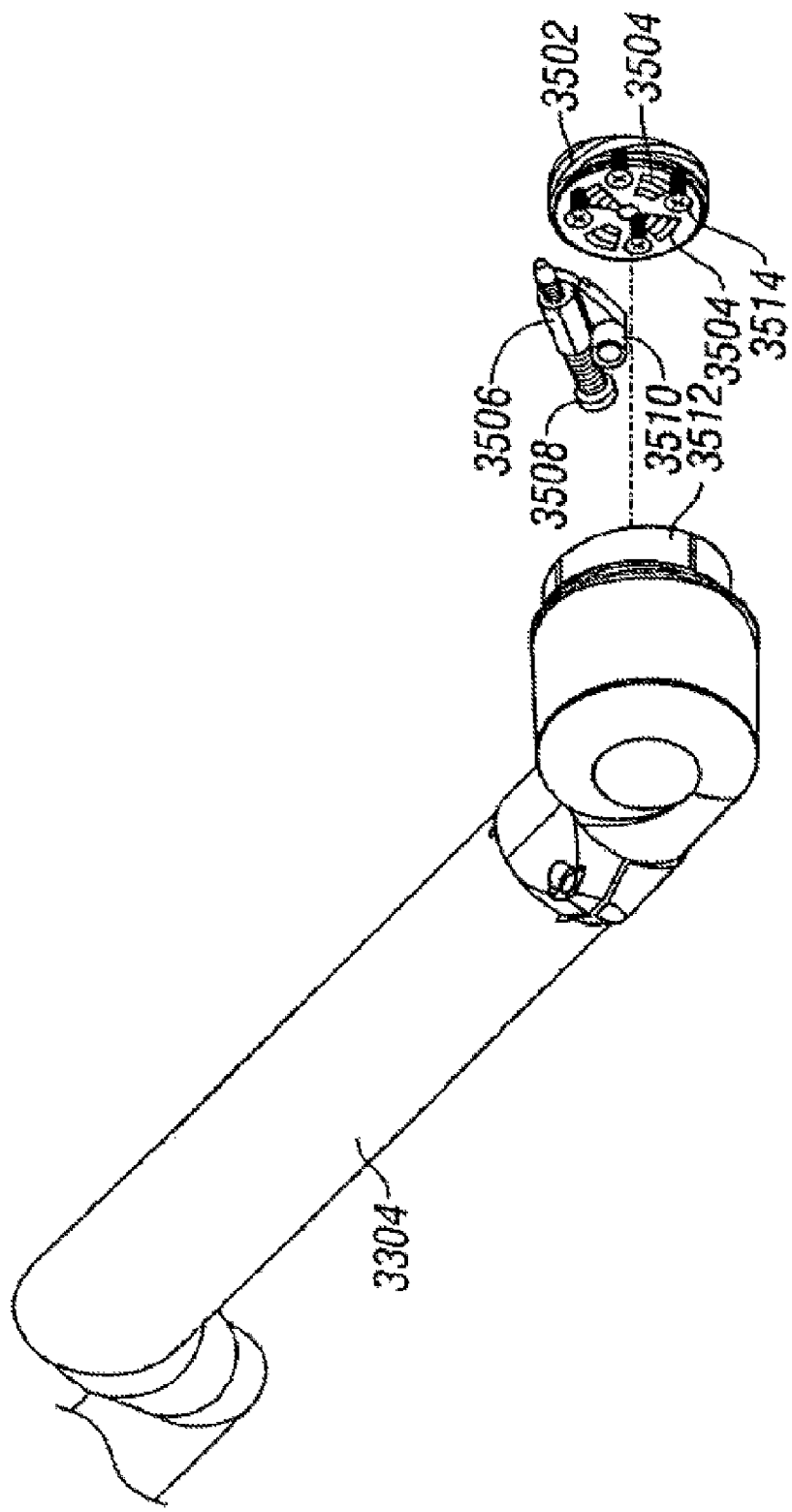
FIG. 35A depicts an exploded perspective view of a neck extension connector.
Figure 35B:
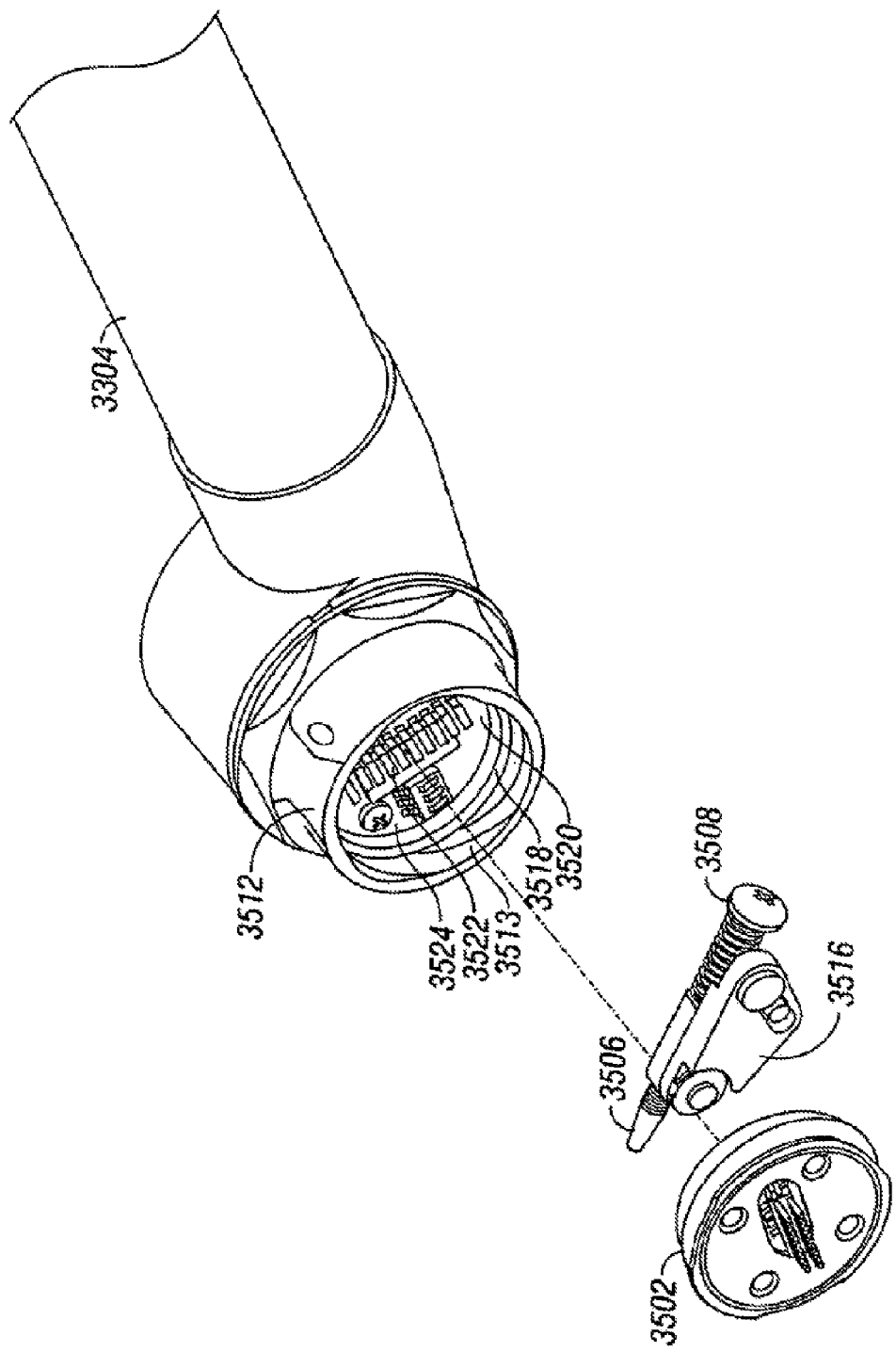
FIG. 35B depicts another exploded perspective view of a neck extension connector.

FIG. 35A and FIG. 35B show two exploded perspective views of a neck extension connector according to one embodiment. The depicted connector base 3502 is preferably mounted to chassis 301 on an interior-facing surface such as an inside surface of the drive housing as depicted in several examples herein. The connector may of course be mounted in other positions such as a centrally located post or on an outer-facing surface. The inner surface is preferred. Connector base 3502 is provided with threads preferably arranged to provide a quarter-turn screw-on sequence for neck 3304. Base 3502 may be milled, machined, molded, or manufactured with other suitable techniques. A preferred embodiment is molded high-strength plastic, but other materials such as metals may be used. In a preferred embodiment connector base 35 at two is an engaging mount that has few threads. The threads have a very large pitch, and open angle, and preferably no thread completes much more than a quarter perimeter. While quarter turn threads are taught, this is not limiting and other thread arrangements may be used. Preferably movement with less than half a rotation may assemble the opposing pieces of the connector. Interruptions may be provided along the perimeter between threads.

The neck connector piece 3512 is preferably a metal piece with interior threads adapted to screw onto the outer threads of base 3502. In some embodiments, connection may be made with a quarter turn engagement. That is, the neck or payload may be attached with a twist to engage the threads on the base 3502 without a friction or interference fit. Such a connection is secured with the use of a latch or other securing piece. Electrical contact pads 3504 are expressed on a circuit board which is fitted into base-3502. Contacts 3504 match to corresponding electrical contacts 3522 (FIG. 35B) present inside the neck connector piece. Contacts 3522 are clocked to screw on and align with contacts 3504. Electrical connection is made through base 35 through pins projecting from the back of base 3502 to provide electrical conductivity into the chassis circuitry.

Referring to FIG. 35B, neck connector piece 3512 is attached to neck 3304 via screwing or welding or other suitable technique, or neck connector piece 3512 may be machined as part of the neck housing of neck 3304. Neck connector piece 3512 has interior threads 3513. Behind threads 3513 is a scaling o-ring or seal ring 3518. Seal ring 3518 preferably forms a seal against base 3502 in the connector closed position. Behind the seal ring 3518 is a small circuit board 3520 fit into neck connector piece 3512. Preferably circuit board 3520 is sealed with a second o-ring 3524. Contacts 3522 are, in this embodiment, mounted to circuit board 3520.

A latch 3506 is used to latch the depicted connector arrangement in a closed position. Latch 3506 is shown with plunger 3508 spring loaded therein. Plunger 3508 may be screwed into latch 3506 to adjust the latch closing force. In preferred scenario the closing forces is adjusted similarly to a vice grips. That is plunger 3508 is screwed into latch 3506 and the closing force tested until the latch can no longer be closed. Then plunger 3508 is screwed out slightly to allow the latch to close at its maximum closing force position. Such position provides, in preferred embodiments, a zero-backlash connection. Latch 3506 is rotatably mounted to a latch base 3516 which in one embodiment is screw-mounted to the chassis. In another embodiment the latch base may be mounted to neck connector piece 3512.

Figure 35C:
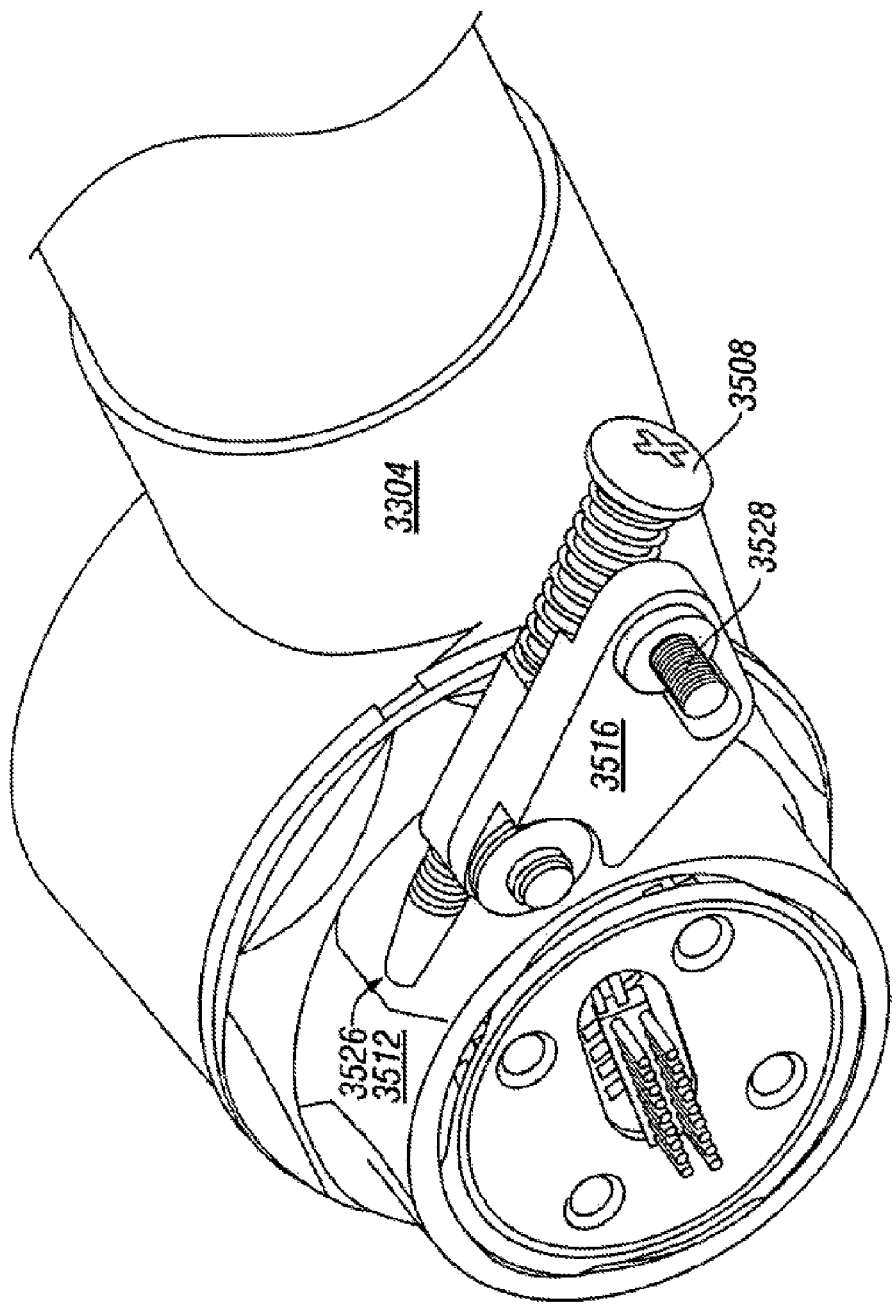
FIG. 35C depicts a perspective view of an assembled and latched neck extension connector.

FIG. 35C depicts the neck extension connector latched and secured. The view is shown from the robot chassis side, with the robot chassis not shown in this cutaway view for clarity. After connection, the depicted connector arrangement is secured by latch 3506. A plunger or screw 3508 is moved into a matching hole or receiving slot 3526 on neck connector piece 3512 to secure the neck to the chassis. Such an arrangement provides a mounting scenario with no tools, wires or screws, and provides an adjustable latch which allows for different types of payloads to be mounted to connector 3502.

The depicted latch in a closed position provides a zero backlash connection in that, once latched, the depicted neck connector has no freedom of movement. The assembly may be referred to as a quick-connect zero backlash connector. Other suitable connector designs may be employed to provide a quick connect zero backlash capability. The plunger must be pulled out of receiving slot 3526 in order to disconnect the connector. The unlatching movement is accomplished by pushing upward on the head end of plunger 3508, thereby rotating latch base 3516 upward about screw 3528, while at the same time rotating the tip of plunger 3508 downward along the surface of neck connector piece 3512 until contact is cleared. Assembly and disassembly are preferably accomplished with a single quarter turn movement and a latching or unlatching movement.

While the depicted connector is shown holding the robot neck assembly 3304 onto the robot chassis, however such a connector maybe used as a payload connector to quick connect a variety of payloads to a robot chassis, or quick connect other robot pieces together while providing a sealed housing and electrical connection as well as a zero backlash mechanical connection. Various payloads may be connected. For example a cargo platform, or a manipulator arm may be connected. Various sensing payloads or weapons payloads may also be connected.

Figure 36:
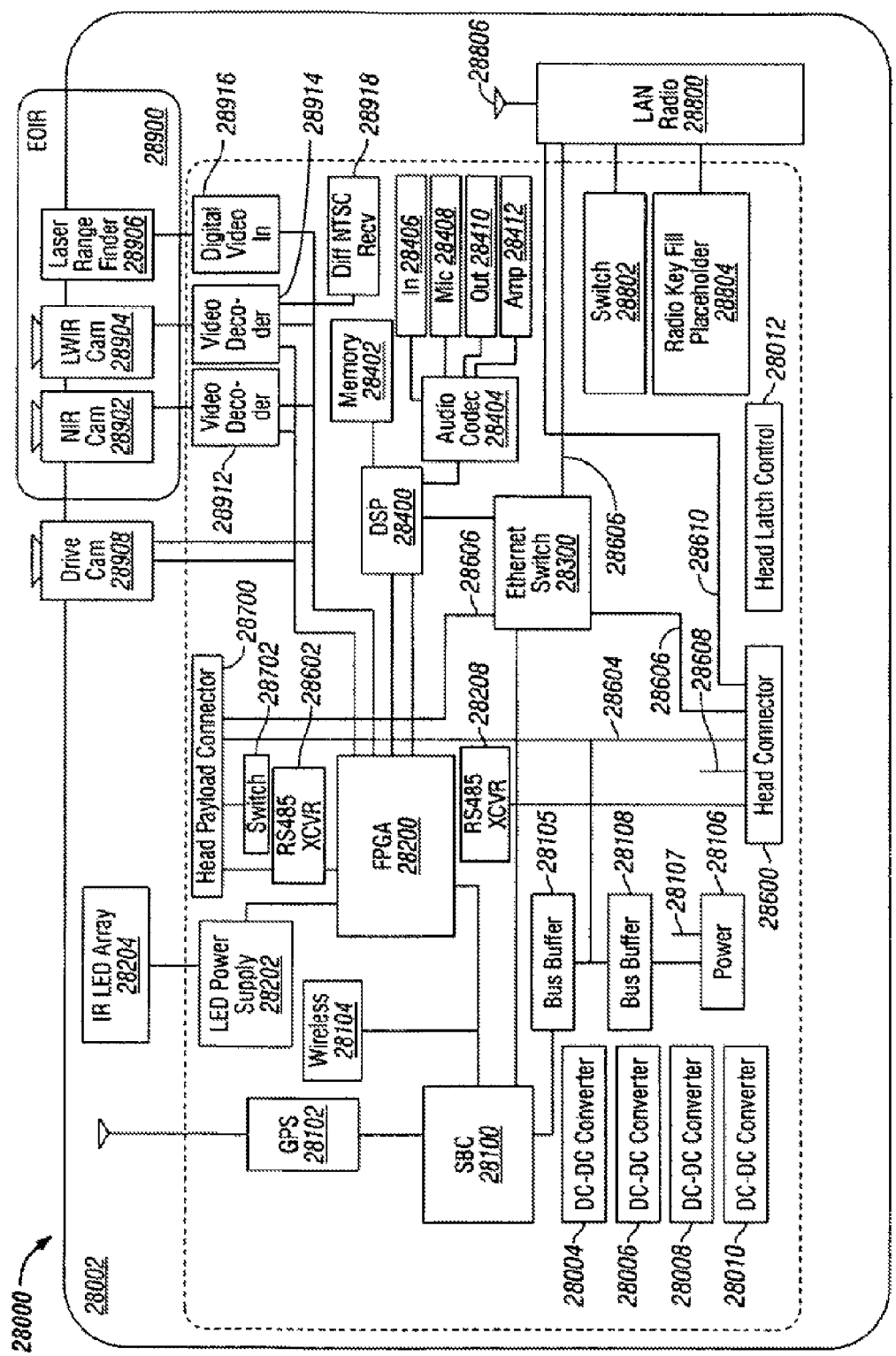
FIG. 36 illustrates a block diagram of a robot sensor head.

FIG. 36 is a block diagram 28000 of one possible embodiment of a robot head 28002 ("head", "robot head," "sensor head"). The head 28002 includes a head housing 28002 in which is mounted one or more circuit boards or circuit modules. Rigid circuit boards, flexible polyimide circuits, multichip modules, or other circuit modules or combinations may be used. The depicted head 28002 has various cameras, sensors, and antenna mounted therein or thereto, and is typically itself mounted to a robot neck extension such as those described herein.

In this embodiment head 28002 includes a single board computer (SBC) 28100, and in a preferred embodiment the SBC 28100 is a Freescale MPC5200. Further, in one preferred embodiment the SBC is the controller for the entire robot. SBC 28100 is connected to a global positioning system (GPS) module 28102 by a serial bus, and in a preferred embodiment the GPS 28102 is a uBlox Super Sense GPS module. The GPS module is also connected to a GPS antenna 28108. The SBC 28100 also uses a PCI bus to connect to a wireless Ethernet transceiver 28104 and a field-programmable gate array (FPGA) 28200. In a preferred embodiment, the FPGA 28200 is a Xilinx XC3S1000. SBC 28100 is electronically connected to a first bus buffer 28105, which in a preferred embodiment is a Linear Technology LTC4304, which is connected to a PMBus 28604. A microcontroller power module 28106, which receives power from VSTBY power 28107, is also connected to PMBus 28604 by a second bus buffer 28108.

Referring now to the centrally depicted FPGA in FIG. 36, FPGA 28200 is provided in robot head 28002 to perform various digital logic and data routing functions such as multiplexing the video or sensor signals to appropriate destinations, as well as, in this embodiment, interfacing to an actuator data communications bus known as FARnet. FPGA 28200 is electronically connected to control an LED power supply 28202, which supplies power to an infrared LED array 28204. FPGA 28200 is electronically connected to a pair of RS485 transceivers 28206 and 28208, and the transceivers 28206 and 28208 are connected to a four-conductor FARnet bus 28602. FPGA 28200 is also electronically connected to a digital signal processor (DSP) 28400, which processes audio signals that may be input from microphones or output to speakers. In one preferred embodiment, the DSP 28400 is a Texas Instruments TMS320DM642. DSP 28400 is electronically connected to an electronic memory 28402, which may be RAM, SDRAM, flash, etc., or may be connected to any combination of one or more of such types of memory. Preferably a combination of flash memory and SDRAM is employed for program and data storage, and operating memory. DSP 28400 is electronically connected to an audio codec 28404, which in a preferred embodiment is a Texas Instruments TLV320A1C23, and the audio codec 28404 is connected to an audio line input 28406, a microphone input 28408, a line output 28410, and an amplifier 28412.

The head 28000 also includes an electro-optic infrared (EOIR) module 28900. EOIR 28900 includes a near infrared (NIR) camera 28902 (in a preferred embodiment, Sony 980), a long wave infrared (LWIR) camera and a laser range finder 28906. The EOIR cameras 28902 and 28904 are connected to a pair of video decoders 28912 and 28914 (in a preferred embodiment, Analog Devices ADV7180). Laser range finder 28906 is connected to a digital video input 28916. The video decoders 28912 and 28914, the digital video input 28916, as well as a drive camera 28908 are connected to FPGA 28200 by a CCIR-656 video communications bus and a serial bus. Video decoder 28914 is also connected to a differential NSTC receiver 28918.

The depicted head 28000 also includes an Ethernet switch 28300 (in a preferred embodiment, Marvell 88E6063) which connects the SBC 28100 to a head payload connector 28700, a head connector 28600 providing connectivity to the robot base, and a local area network (LAN) radio 28800. The Ethernet switch 28300 connections are made using a collection of four-conductor Ethernet busses 28606. The LAN radio is connected to a LAN radio antenna 28806, a switch 28802, and a radio key 28804, which may be employed to enable certain functions on secure radios such as JTRS radios. The head 2800 includes a head latch control 28102, which may be operable to enable opening of the head housing or disconnection from the neck.

Head connector 28600 connections for FARnet 28208, PMBus 28604, and Ethernet bus 28606. Head connector 28600 also includes a differential NSTC signal conductor 28610 and a two-conductor power conductor 28608. Head payload connector 28700 includes connections for FARnet 28208, PMBus 28604, Ethernet bus 28606, and power conductor 28608. In this embodiment, the power provided on conductors 28608 is converted by the four depicted DC-DC converters, shown as 28004 through 28010. VSTBY is standby voltage. The second depicted 3.3V out converter supplies the digital logic such as the SBC 28100 (3.3V external) and audio codec 28404. The third depicted converter supplies 5V output to as needed to circuits such as the radio 28800 and sensors and cameras 28902, 28904, 28906, and 28908. The fourth depicted converter 28010 supplies various voltages required to operate FPGA 28200 (3.3V).

Figure 37:
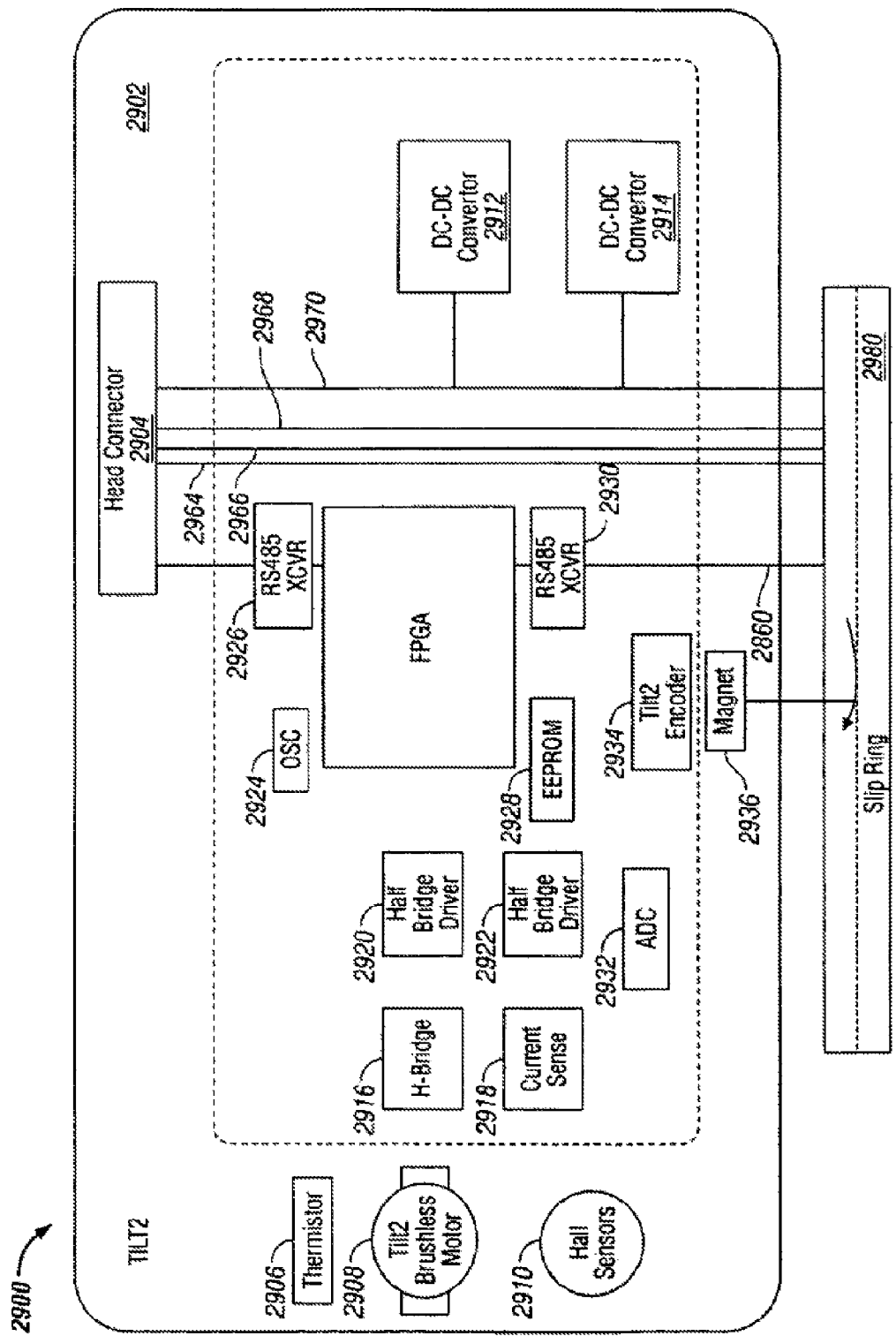
FIG. 37 illustrates a block diagram of a robot neck tilt module.

FIG. 37 is a block diagram 2900 of one possible embodiment of a first tilt module 2902. Tilt modules of this design may be used to implement the various tilt axes employed in robots designs herein toward the distal end of the robot's neck. Module 2902 houses one or more circuit boards or circuit modules. Rigid circuit boards, flexible polyimide circuits, or other circuit modules or combinations may be used. The depicted module 2902 has various motors and sensors mounted therein or thereto, and is typically itself mounted to a robot neck extension such as those described herein. Module 2902 may electrically connect to the robot head 28002 through electrical connections provided in a head connector 2904, and these connections may include a four-conductor FARnet bus 2960, a four-conductor Ethernet bus 2964, a 2-conductor PMBus 2966, a differential NSTC bus 2968, and 2-conductor power bus 2970. Busses 2960 through 2970 are also electrically connected to a slip ring 2890. Power bus 2970 is electrically connected to DC-DC converters 2912 and 2914, and these converters 2912 and 2914 provide power for the electrical components included in first tilt module 2902.

An FPGA 2950 is provided in module 2902 to perform various digital logic and data routing functions such as multiplexing the video or sensor signals to appropriate destinations, as well as, in this embodiment, interfacing to the actuator data communications bus known as FARnet. In a preferred embodiment, FPGA 2950 is a XC3S500. FPGA 2950 is connected to oscillator 2924, an EEPROM 2928, and RS485 transceivers 2926 and 2930. Transceivers 2926 and 2930 are in communication with FARnet bus 2960. The depicted FARnet busses are actuator control busses that, in one embodiment, are RS-485 serial busses. Their interconnection herein forms a noded network of actuators. The FARnet bus scheme preferably operates as a noded scheme rather than detecting collisions on a common bus, but a common bus scheme may be used. In this embodiment, each node receives commands, implements the commands addressed to itself, and forwards the other commands along the FARnet network.

Module 2902 also includes components used for motion control, such as a pair of h-bridge drivers 2920 and 2922. Other motion control components included in the first tilt module 2902 include an h-bridge 2916, a current sense module 2918, an ADC 2932, a first tilt encoder 2934, and an encoder magnet 2936. The depicted encoders at each actuator herein are preferably absolute position encoders rather than (or in conjunction with) differential encoders. Such encoders allow absolute position controlling of the actuated joints. This scheme is advantageous especially when combined with the slip clutches described herein which may prevent reliance on differential encoder tracking in some situations. Other motion control components include a thermistor 2906, a brushless motor 2908, and a collection of hall sensors 2910.

Figure 38:
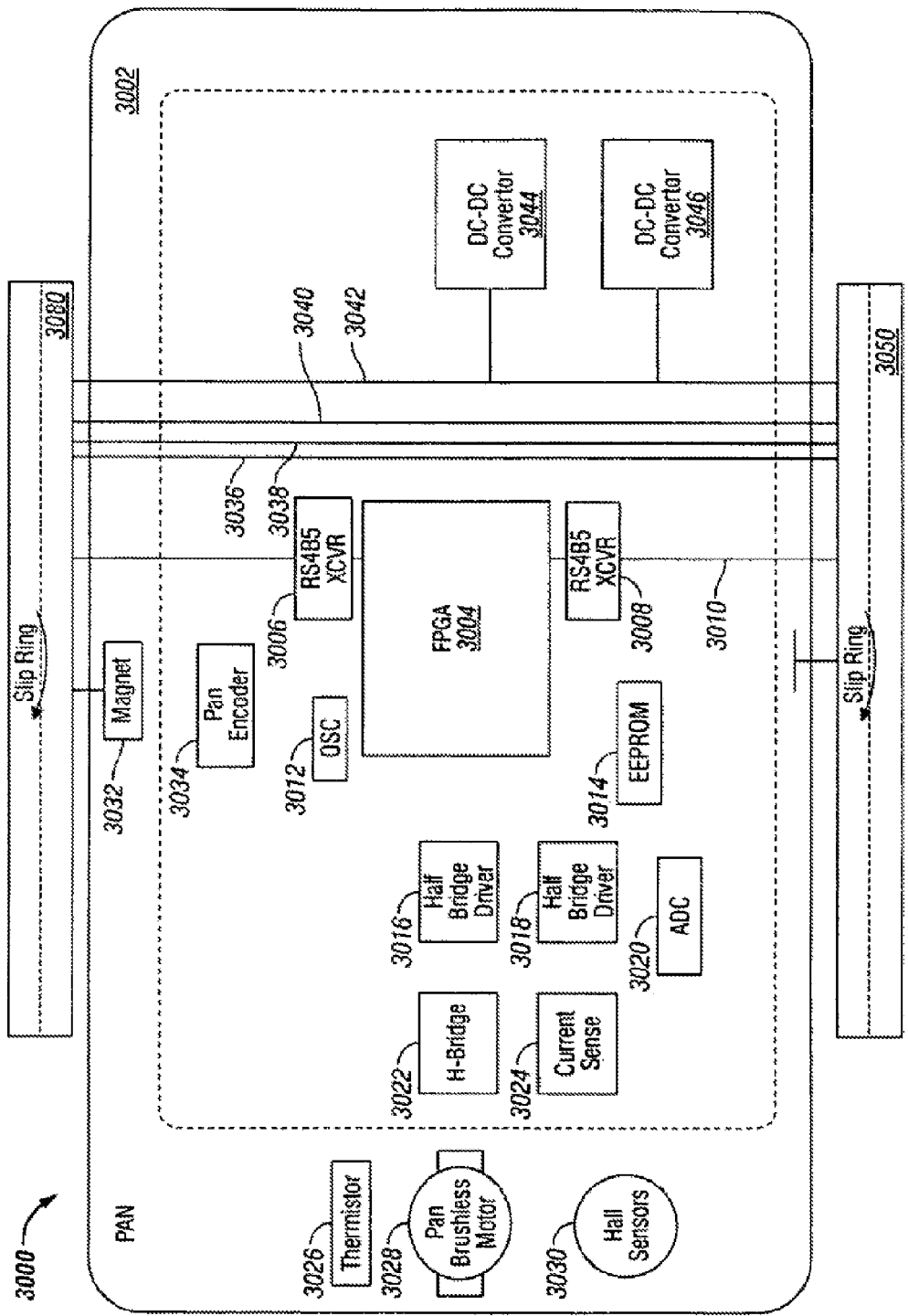
FIG. 38 illustrates a block diagram of a robot neck pan module.

FIG. 38 is a block diagram 3000 of one possible embodiment of a pan module 3002. A pan module of this design may implement pan axes along a robot's neck according to various designs herein. The module 3002 houses one or more circuit boards or circuit modules. Rigid circuit boards, flexible polyimide circuits, or other circuit modules or combinations maybe used. The depicted module 3002 has various motors and sensors mounted therein or thereto, and is typically itself mounted to a robot neck extension such as those described herein. Module 3002 may electrically connect to the robot head 2902 through electrical connections provided in a slip ring 3080. Slip ring 3080 is preferably electrically coupled to slip ring 2980 (FIG. 37) with a passthrough connector passing through the interior of the depicted upper curved portion of pan link 4308 (FIG. 27). Such connections may include a four-conductor FARnet bus 3010, a four-conductor Ethernet bus 3036, a 2-conductor PMBus 3038, a differential NSTC bus 3040, and 2-conductor power bus 3042. Busses 3010, 3036, 3038, 3040, and 3042 are also electrically connected to a slip ring 3050. Power bus 3042 is electrically connected to DC-DC converters 3044 and 3046, and these converters 3044 and 3046 provide power for the electrical components included in pan module 3002.

Depicted in FIG. 38, an FPGA 3004 is provided in robot tilt module 3002 to perform various digital logic and data routing functions such as multiplexing the motion control or sensor signals to appropriate destinations, as well as, in this embodiment, interfacing to the actuator data communications bus known as FARnet. In a preferred embodiment, FPGA 2950 is a XC3S500. FPGA 3004 is connected to oscillator 3012, an EEPROM 3014, and RS485 transceivers 3006 and 3008. Transceivers 3006 and 3008 are in communication with FARnet bus 3010.

Pan module 3002 also includes components used for motion control, such as a pair of half bridge drivers 3016 and 3018. Other motion control components included in the pan module 3002 include an h-bridge 3022, a current sense module 3024, an ADC 3020, a pan encoder 3034, and an encoder magnet 3032. Other motion control components include a thermistor 3026, a brushless motor 3028, and a collection of hall sensors 3030.

Figure 39:
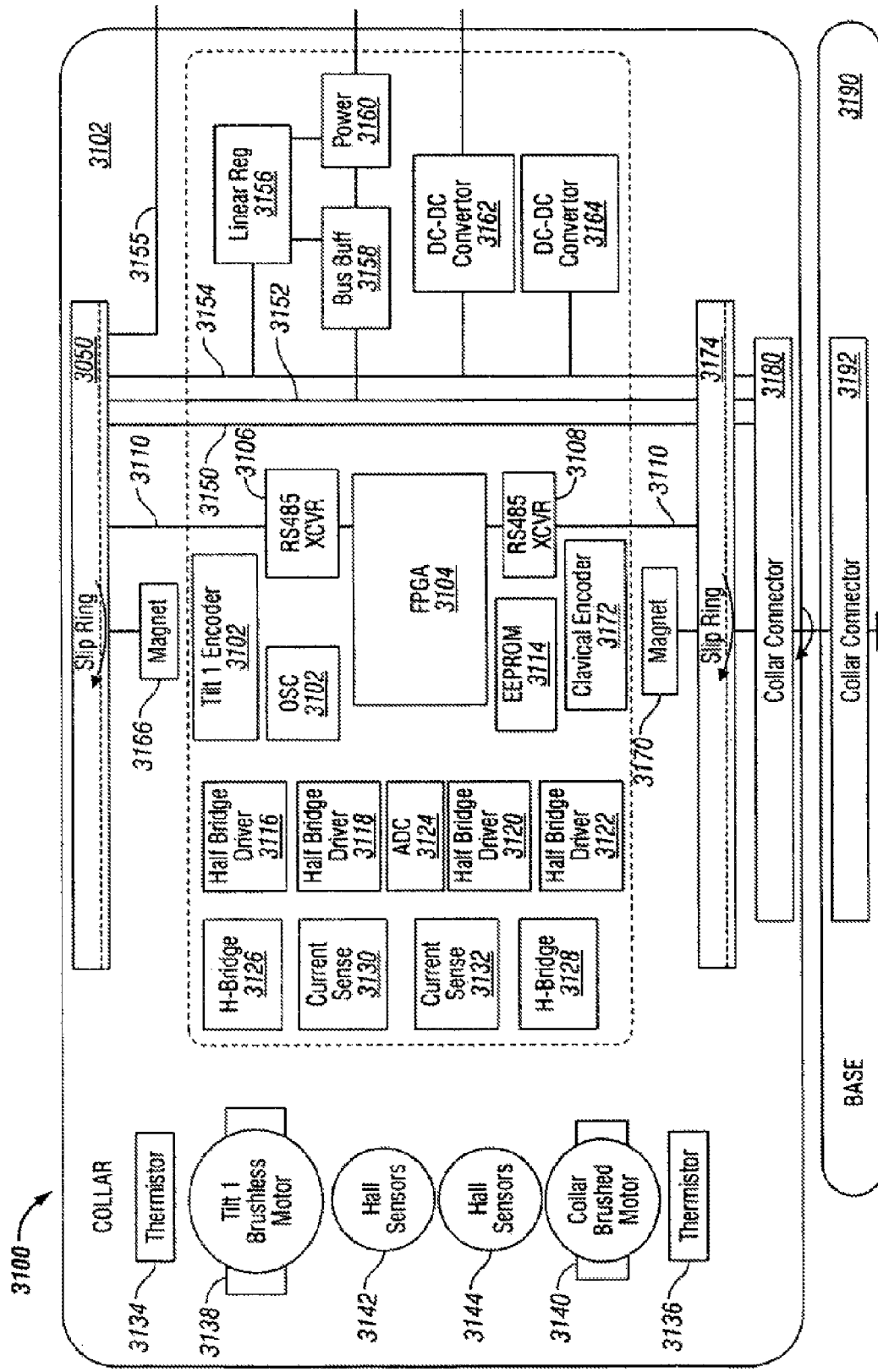
FIG. 39 illustrates a block diagram of a robot neck attachment tilt module.

FIG. 39 is a block diagram 3100 of a robot lower neck assembly according to one embodiment. The assembly 3100 includes the entire lower neck assembly from the chassis or base attachment 3192 including shoulder or "collar" actuator 4302 (FIG. 27) and first tilt actuator 4306 (FIG. 27). In this embodiment, the assembly 3100 is represented as a combined lower neck assembly module 3102 housing both shoulder actuator and first tilt actuator modules, shown together in this case because the depicted circuits do not move with respect to each other. The lower neck assembly module 3102 includes one or more circuit boards or circuit modules and both sets of actuator motors and gears. Rigid circuit boards, flexible polyimide circuits, or other circuit modules or combinations may be used. The depicted module 3102 has various motors and sensors mounted therein or thereto, and is typically itself mounted to a robot neck extension such as those described herein. Module 3102 may electrically connect to the pan module 2902 through electrical connections provided in slip ring 3050. Such connections may include a four-conductor FARnet bus 3110, a four-conductor Ethernet bus 3150, a 2-conductor PMBus 3152, a differential NSTC bus 3155, and 2-conductor power bus 3154. Busses 3150, 3152, and 3155 are also electrically connected to a collar connector 3180. Power bus 3154 is electrically connected to DC-DC converters 3162 and 3164, and these converters 3162 and 3164 provide power for the electrical components included in shoulder tilt module 3102. Power bus 3154 is also electrically connected to a linear regulator 3156 and a bus buffer 3158, and regulator 3156 and buffer 3158 both electrically connect to a power module 3160.

Depicted toward the center of the block diagram in FIG. 39 is FPGA 3104, which is provided in module 3102 to perform various digital logic and data routing functions such as multiplexing the motion control or sensor signals to appropriate destinations, as well as, in this embodiment, interfacing to the actuator data communications bus known as FARnet. In a preferred embodiment, FPGA 3104 is a XC3S500. FPGA 3104 is connected to oscillator 3112, an EEPROM 3114, and RS485 transceivers 3106 and 3108. Transceivers 3106 and 3108 are in communication with FARnet bus 3110. FPGA 3104 and its associated transceivers perform as a single FARnet node which receives control signals addressed to each of first tilt module actuator motor 3138 and shoulder tilt module actuator motor 3140.

Lower neck assembly module 3102 also includes components used for motion control, such as four half bridge drivers 3116 through 3122. In a preferred embodiment, h-bridge drivers 3116 through 3122 are Intersil HIP2101. Other motion control components included in the module 3102 include a pair of h-bridges 3126 and 3128, a pair of current sense modules 3130 and 3132, an ADC 3124, a first tilt encoder 3168, a first tilt encoder magnet 3116, a clavical encoder 3172, and a clavical encoder magnet 3170. Other motion control components include a pair of thermistors 3134 and 3136, a pair of brushless motors 3138 and 3140, and a collection of hall sensors 3142 and 3144. Electrical connection from assembly 3102 to the robot base 3190 is made through a slip ring 3174 and color connector 3180. Slip ring 3174 allows connectivity despite actuator movement of the shoulder joint. The depicted collar connectors 3180 and 3192 represent the connectors that join the neck to the chassis (FIG. 35A-C).

Figure 40:
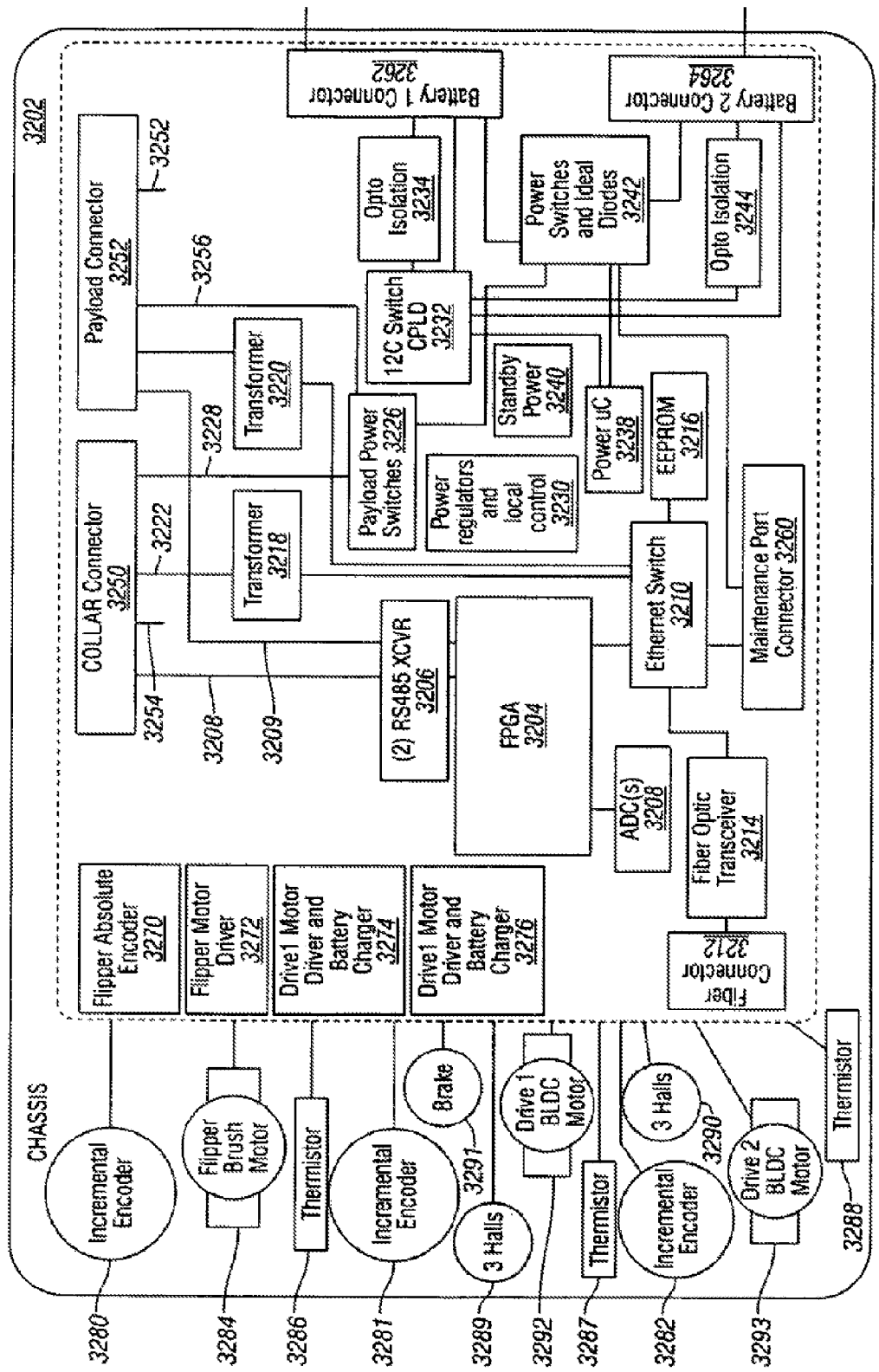
FIG. 40 illustrates a block diagram of circuit components in robot chassis or base.

FIG. 40 shows a block diagram 3200 for one possible embodiment of a robot chassis or base 3202. Preferably, base 3202 generally houses the power supply (such as batteries) and much of the power control circuitry for portable robot designs herein. The base 3202 may electrically connect to the robot neck at (module 3102) through electrical connections provided in a collar connector 3250. Such connections may include a first four-conductor FARnet bus 3208, a four-conductor Ethernet bus 3222, a 2-conductor PM. Bus 3254, and a 2-conductor power bus 3228.

Centrally located in FIG. 40, an FPGA 3204 is provided in the base circuit 3202 to perform various digital logic and data routing functions such as multiplexing the motion control or sensor signals to appropriate destinations, as well as, in this embodiment, interfacing to the actuator data communications bus known as FARnet. In a preferred embodiment, FPGA 3204 is a XC3S1000. FPGA 3204 is connected to a pair of RS485 transceivers 3206. Transceivers 3206 are in communication with first FARnet bus 3208 and a second FARnet bus 3209.

Base 3202 also includes components used for motion control, such as an ADC 3208, a flipper absolute encoder 3270, a flipper motor driver 3272, a drive1 motor driver and battery charger 3274, and a drive2 motor driver and battery charger 3276. Other motion control components include a set of three thermistors 3286, 3287, and 3288, a pair of BLDC motors 3292 and 3293, a flipper brushless motor 3284, a set of three incremental encoders 3280, 3281, and 3282, a brake 3291, and a collection of hall sensors 3289 and 3290.

Base 3202 also includes other various components used for power and communications, such as fiber connector 3212 which is optically connected to fiber optic transceiver 3214 for connection of remote control tethers. Transceiver 3214 converts the fiber optic based communications to four-conductor electrical communications, and the Ethernet bus that carries this converted communications is electrically connected to an Ethernet switch 3210. Ethernet switch 3210 is connected to EEPROM 3216. Ethernet switch 3210 is in electrical communication with a maintenance port connector 3260, a collar connector 3250 via a first isolation transformer 3220, and a payload connector A (3252) via a second isolation transformer 3220. A collection of payload power switches 3226 electrically connects to collar connector 3250 via power bus 3226, payload connector 3252 via a 2-conductor power bus 3256, and a set of power switches and ideal diodes 3242. Payload power switches 3226 is also electrically connected to a power microcontroller 3238, which is also connected to the power switches and ideal diodes 3242. The base 3202 also includes a collection of power regulators and local controls 3230 for controlling drive motors and other functions in base 3202, such as flipper movement, for example. Payload connector 3252 also includes electrical conductors for PM Bus 3254.

Visible in the left-central area of FIG. 32 is a 12C switch complex programmable logic device (CPLD) 3232. CPLD 3232 is electrically connected to a battery connector 1 3262 via opto-isolator 3234, and a battery connector 3264 via opto-isolator 3244.

Figure 41:
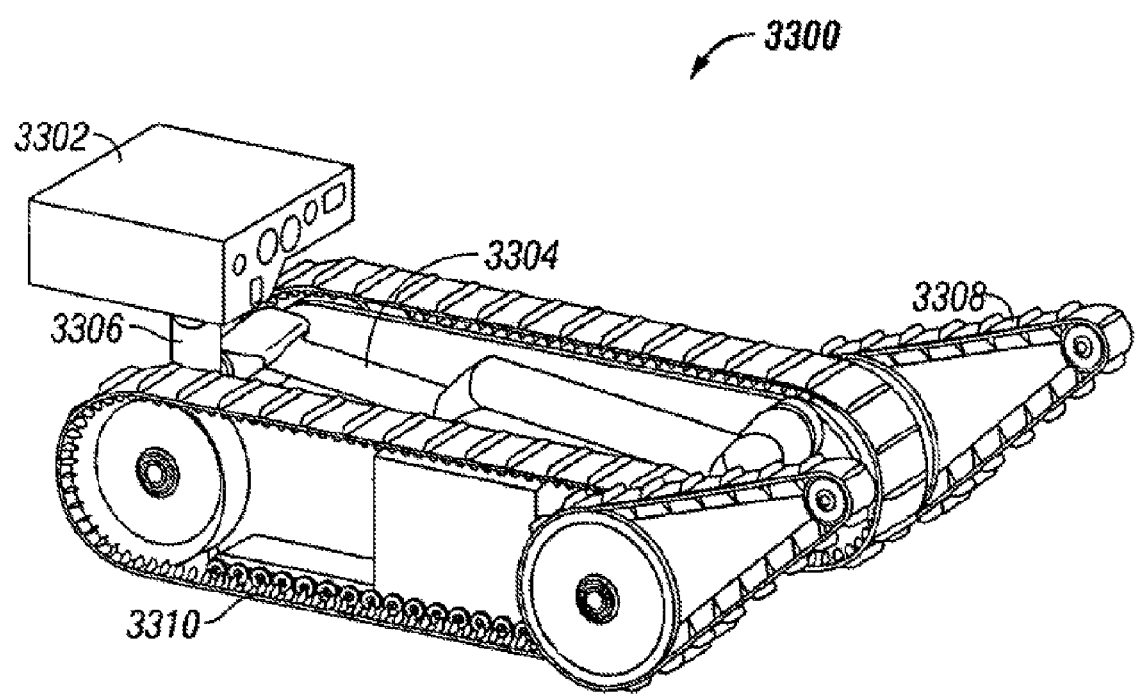
FIG. 41 shows a robot using an extended pan-link section in a low profile pose.

FIG. 41 illustrates an embodiment of a robot 3300 that comprises a head 3302, a neck 3304 in a stowed position, a pan link 3306 in an extended position, a set of flipper tracks 3308, and a set of drive tracks 3310. The robot is depicted in a low-profile pose. In this configuration, the robot 3300 is able to maintain a low overall profile while still allowing the head 3302 to pan horizontally without colliding with any other part of the robot 3300. This configuration may be useful for situations such as inspecting the undersides of vehicles, buildings, inspecting culverts and other such confined spaces, roving underneath fences, and similar tasks. If a lower profile is required for roving, the pan link 3306 may be rotated into a stowed position in order to gain additional clearance. Placing the pan link 3306 in a stowed position may also allow the robot 3300 to achieve a highly compact stowed position for storage and/or transport.

The depicted pose in FIG. 41 may be further described with reference to the position of the various actuated joints shown in FIG. 27. Pursuant to independent commands propagated along the networks to the independent motor modules, as shown in FIG. 41, actuated tilt joint 4302 rotates itself to orient the neck flat or slightly elevated from flat. A flat backward angle with respect to the chassis may be described as the base or 0° position of actuated tilt joint 4302. Actuated tilt joint 4306 rotates itself to orient the pan link to a substantially 90° angle from neck 3304. Actuated pan joint 4308, to achieve the depicted pose, rotates itself to its 0° pan position, that is with the robot sensor face oriented toward the front of the robot. This pose allows, of course, panning movement in pan axis 4308. Actuated tilt joint 4310 rotates itself to its base or 0° tilt position, that is with the depicted sensor face oriented at a 90° angle from the depicted vertical portion of pan link 3306.

Figure 42:
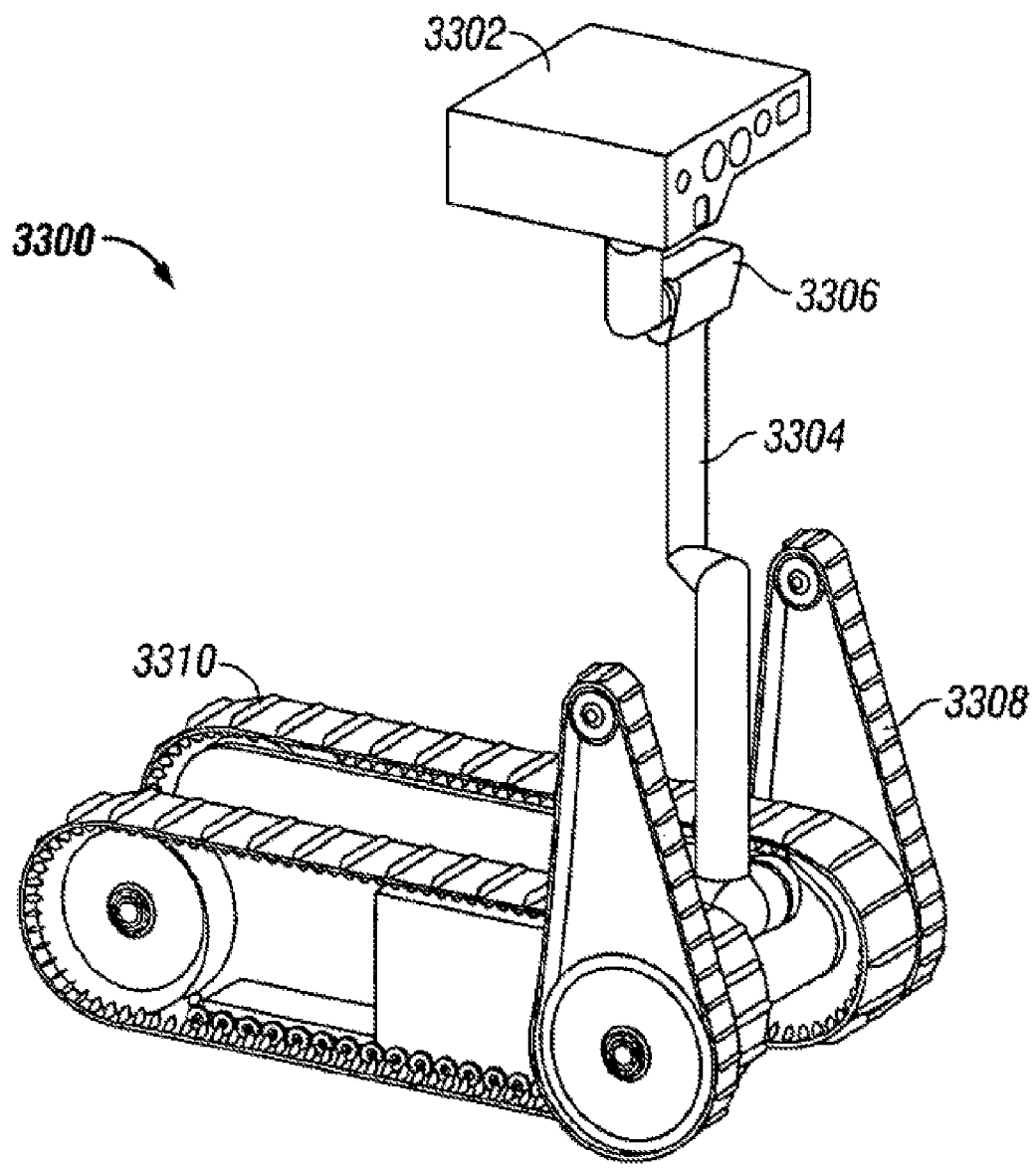
FIG. 42 shows a robot in a pose for looking through windows.

FIG. 42 illustrates an example of robot 3300 in another possible position. In this configuration, the robot 3300 is largely horizontal with the neck 3304 and head 3302 positioned in a largely vertical position. Pan link 3306 may also be extended in order to achieve additional height for the head 3302. This stance may be useful for maintaining a stable position while observing over obstacles, inspecting tabletops, observing though automobile windows, navigating through vegetation, navigating through low-hanging fog or other gasses, etc.

To achieve the depicted pose, pursuant to independent commands propagated along the network to the independent motor modules, flippers 3308 orient themselves in an upright 90° position. Referring again to the joints described in FIG. 27, actuated tilt joint 4302 rotates itself to orient the neck at the 90° upright position. Actuated tilt joint 4306 rotates itself to orient the pan link 3306 at a 0° parallel angle to neck 3304. Actuated pan joint 4308, if needed, rotates itself to its 0° pan position. Actuated tilt joint 2310 rotates itself to its 0° tilt position.

Figure 43:
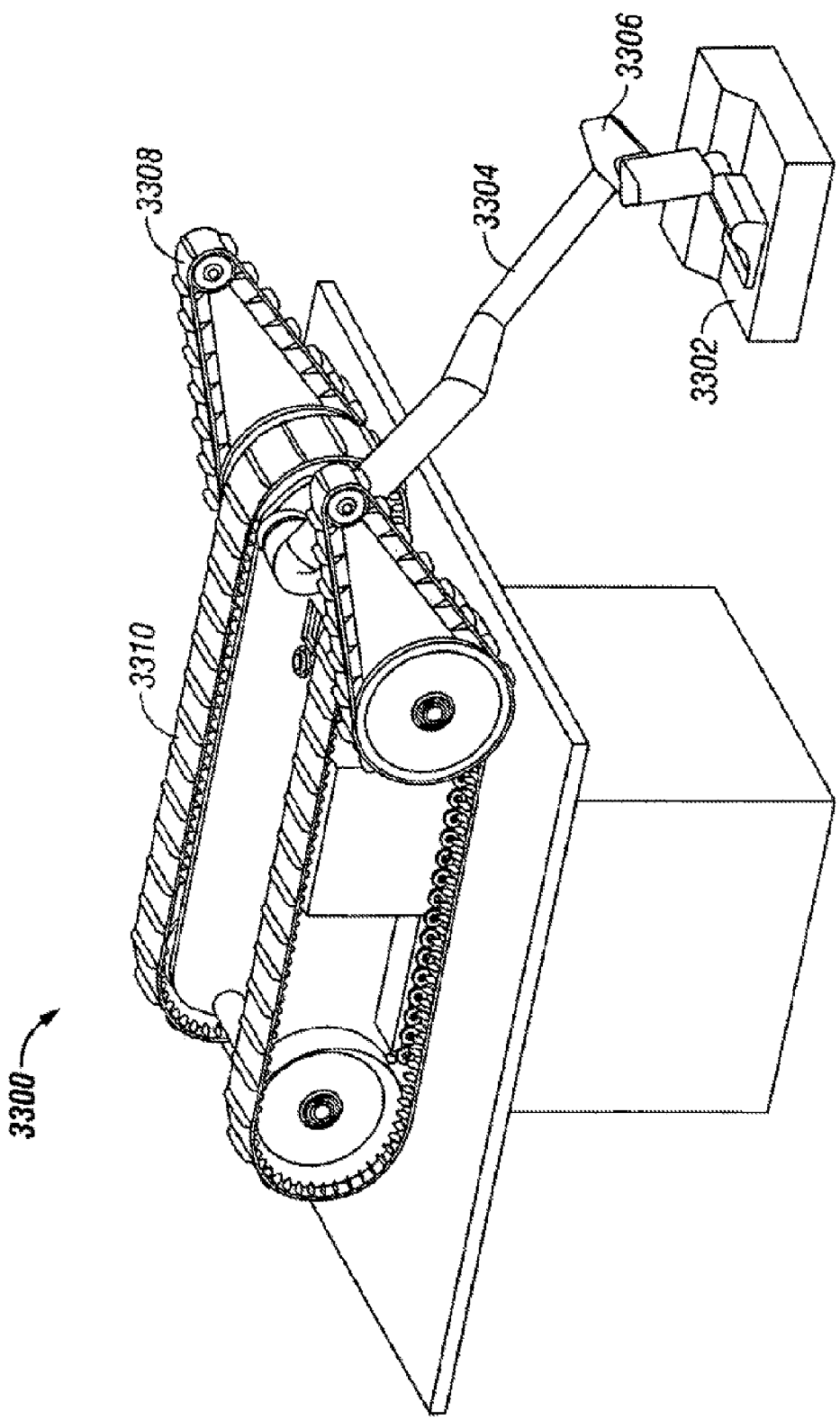
FIG. 43 shows a robot in a pose for observing underneath its supporting surface.

FIG. 43 depicts robot 3300 in a possible position that may be suitable for inspecting the entrance to a hole, cave, manhole, culvert, or other such opening that may be below the plane of the ground around it. This illustration shows that robot 3300 is capable of placing the neck in a position such that the head is positioned below the plane of the drive tracks 3310. Pan link 3306 may also be extended to position the head 3302 an additional distance below the ground plane. In the depicted position, robot 3300 may be able to observe objects underneath the surface that it is resting upon. With pan link 3306 extended downward, the robot 3300 is able to turn head 3302 and observe in several directions, for example, through a hole in a floor.

The depicted pose in FIG. 43 may be further described with reference to the position of the various actuated joints shown in FIG. 27. Actuated tilt joint 4302 rotates itself to orient the neck to an angle of about 210° or greater. The depicted pose may require actuated tilt joint 4302 to rotate to its greatest allow extent. Actuated tilt joint 4306 rotates itself to orient the pan link to a substantially 30 to 45° angle from neck 3304. Actuated tilt joint 4310 rotates itself to substantially 5 to 10° forward of its base position. This angle may of course vary depending on whether the pose is looking into a hole, underneath a balcony, or inspecting the underside of its own supporting surface, for example. A backward angle may be used to observe in a hole. A greater angle around 15 to 30° would be needed to inspect the underside of its supporting surface.

Figure 44:
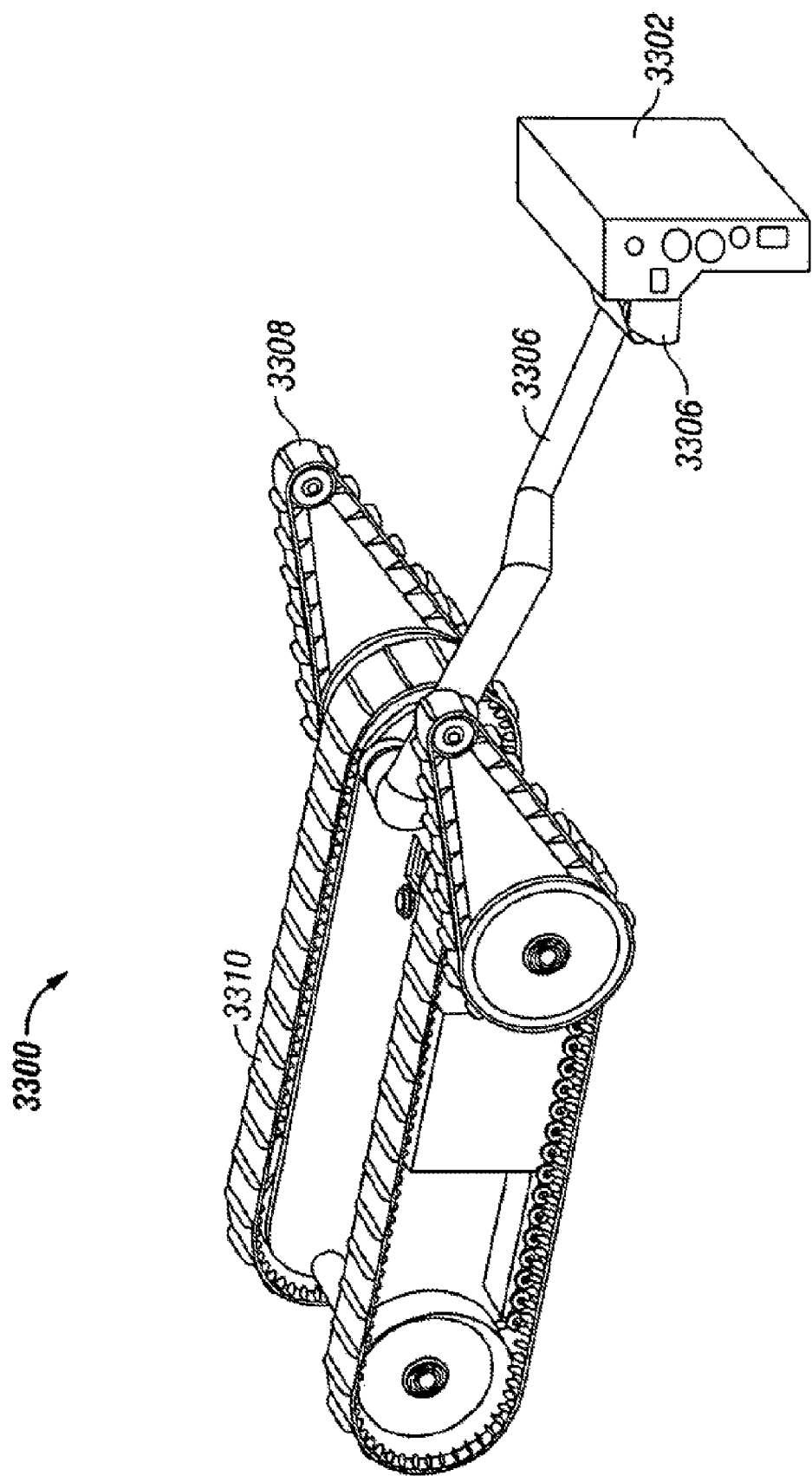
FIG. 44 shows a robot in a pose for looking around a corner.

FIG. 44 depicts robot 3300 in a possible position where the neck 3304 is in a largely forward position and head 3302 is rotated to one side. This position may be useful for observing around corners or other such obstacles while keeping the rest of the robot 3300 protected or out of view. In use, an operator may move the robot toward a corner until it detects the stopping point, at a designated distance to present the extended neck beyond the corner. Then the operator commands the robot to move to the depicted extended position for around-corner viewing.

The depicted pose in FIG. 44 may also be described with reference to the position of the various actuated joints shown in FIG. 27. Actuated tilt joint 4302 rotates itself to orient the neck, at substantially a 180° to 190° angle from its 0° position. Actuated tilt joint 4306 rotates itself to orient the pan link to substantially 0 to 10° backward angle from neck 3304, needed to compensate for greater than 180° angle of neck. Actuated pan joint 4308, to achieve the depicted pose, rotates itself to a 90° right pan position. A pose for looking around corners to the left would of course be achieved by rotating actuated pan joint to a 90° left position.

Figure 45:
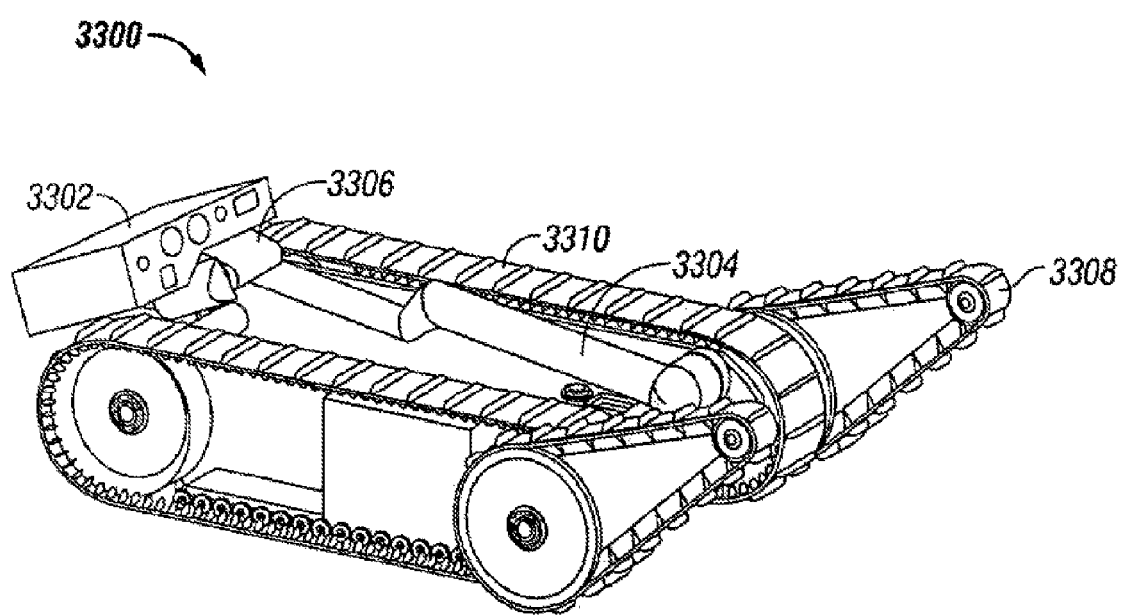
FIG. 45 shows a robot in an alternate low profile pose.

FIG. 45 depicts robot 3300 in another possible position. In this configuration, neck 3304, and pan link 3306 are tilted rearward and the second tilt axis 4310 (FIG. 27) is tilted forward so that the sensor face of head 3302 has a forward view. This position may achieve the minimum possible overall height for the robot 3300, and may be useful for inspecting the underside of vehicles, buildings, etc., for navigating under or though passages that require low clearance, etc.

The depicted pose in FIG. 45 may also be described with reference to the position of the various actuated joints shown in FIG. 27. Actuated tilt joint 4302 rotates itself to orient the neck slightly elevated from the flat or 0° position, for example, about 5°. Actuated tilt joint 4306 rotates itself to orient the pan link 3306 backward to a substantially 15 to 20° angle from neck 3304. Actuated pan joint 4308 rotates itself to its 0° pan position. Actuated tilt joint 4310 rotates itself as far forward of its 0° or upright position is possible without interference with pan link 3306, preferably up to a 90° forward rotation. This angle preferably orient the sensor face close to parallel with the pan link 3306.

Figure 46:
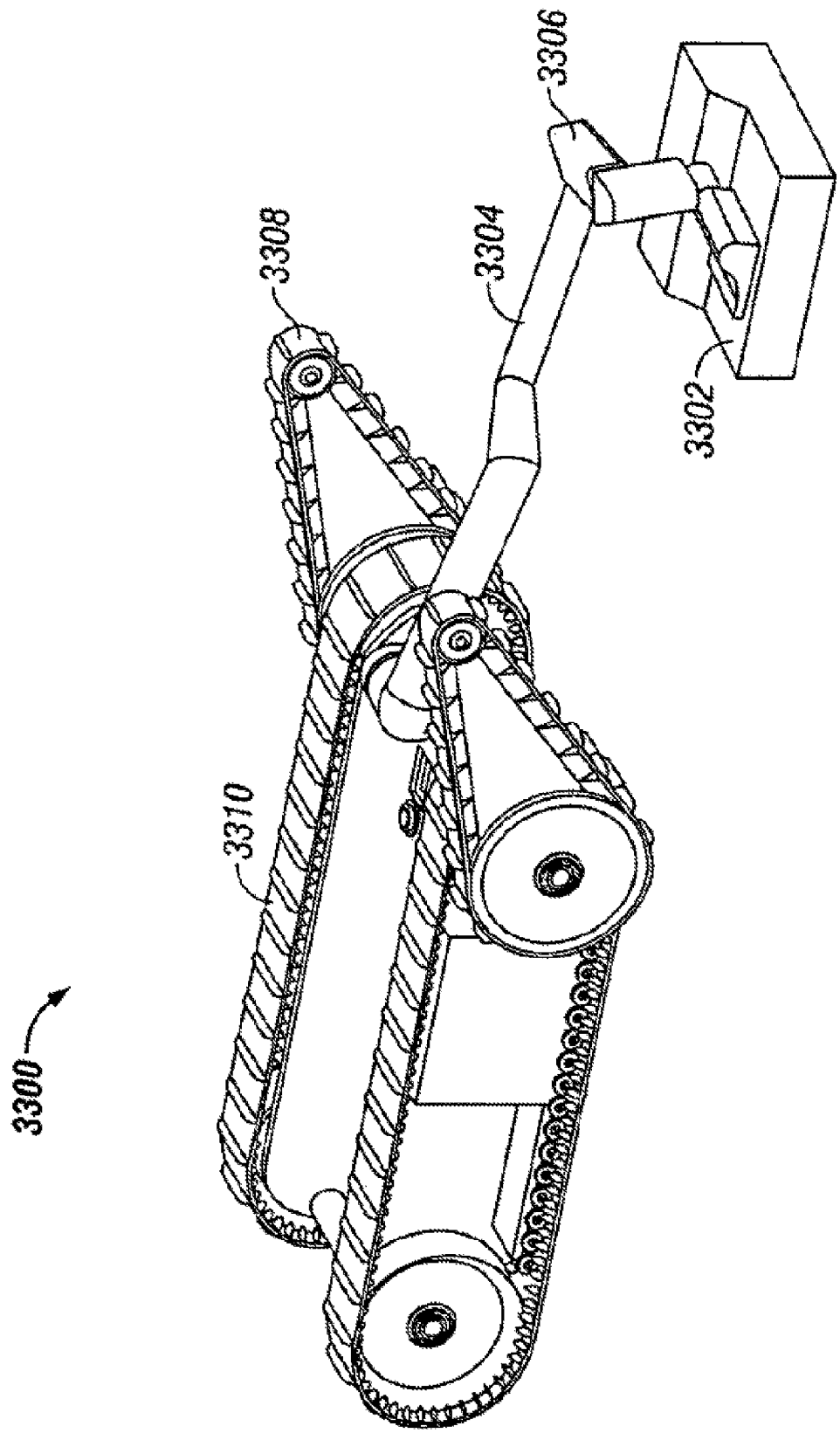
FIG. 46 shows a robot in an under vehicle self inspection pose.

FIG. 46 depicts robot 3300 in a position where neck 3304 is placed in a largely forward position, and the head 3302 is rotated such that the head 3302 faces the robot 3300. This position may be useful for inspecting the front of the tracks or the underside of robot 3300, The depicted pose in FIG. 46 may also be described with reference to the position of the various actuated joints shown in FIG. 27. Actuated tilt joint 4302 rotates itself to orient the neck at substantially a 180° to 190° angle from its 0° position. Actuated tilt joint 4306 rotates itself to orient the pan link to substantially 70 to 80° forward angle with respect to the neck. Actuated pan joint 4308 rotates itself to its 0° pan position. Actuated tilt joint 4310 or take itself substantially 10° forward of its base position to orient a sensor face back toward a robot chassis. Preferably the movements of actuated tilt joints 4306 and 4310 precede the final movement of actuated tilt joint 4302 to avoid the floor interfering with head movement. Such coordinated movement may be provided as a preprogrammed sequence to obtain a preset position which, like the other positions described herein, may be mapped to a remote operator control unit button or menu as a preset position.

Figure 47:
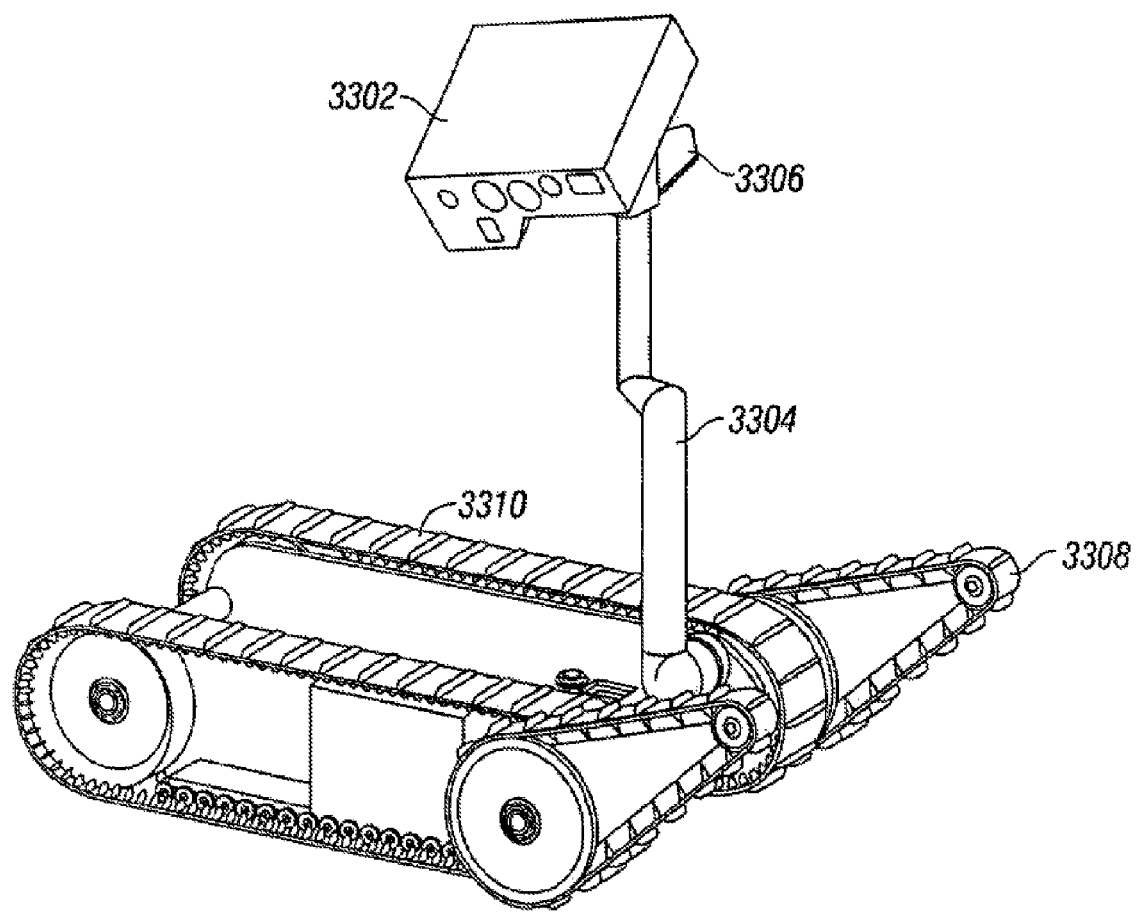
FIG. 47 shows a robot in another self inspection pose.

FIG. 47 depicts robot 3300 in another possible position. In this position, neck 3304 is in a largely vertical position and head 3302 is in a downward-facing position. This stance may be useful for inspecting flipper tracks 3308, drive tracks 3310, or other parts of the robot 3300.

The depicted pose in FIG. 47 may also be described with reference to the position of the various actuated joints shown in FIG. 27. The depicted pose, like the others here shown herein, is preferably achieved pursuant to independent commands propagated along the network to the independent motor modules. Referring again to the joints described in FIG. 27, actuated tilt joint 4302 rotates itself to orient the neck at the 90° upright position. Actuated tilt joint 4306 rotates itself to orient the pan link 3306 at a 0° parallel angle to neck 3304. Actuated pan joint 4308, rotates itself to substantially a 90 to 100° right-hand pan position. Further panning may provide inspection of rearward portions of the right-hand track. Actuated tilt joint 2310 rotates itself to substantially a 45° downward tilt position from its 0° upright position.

Figure 48:
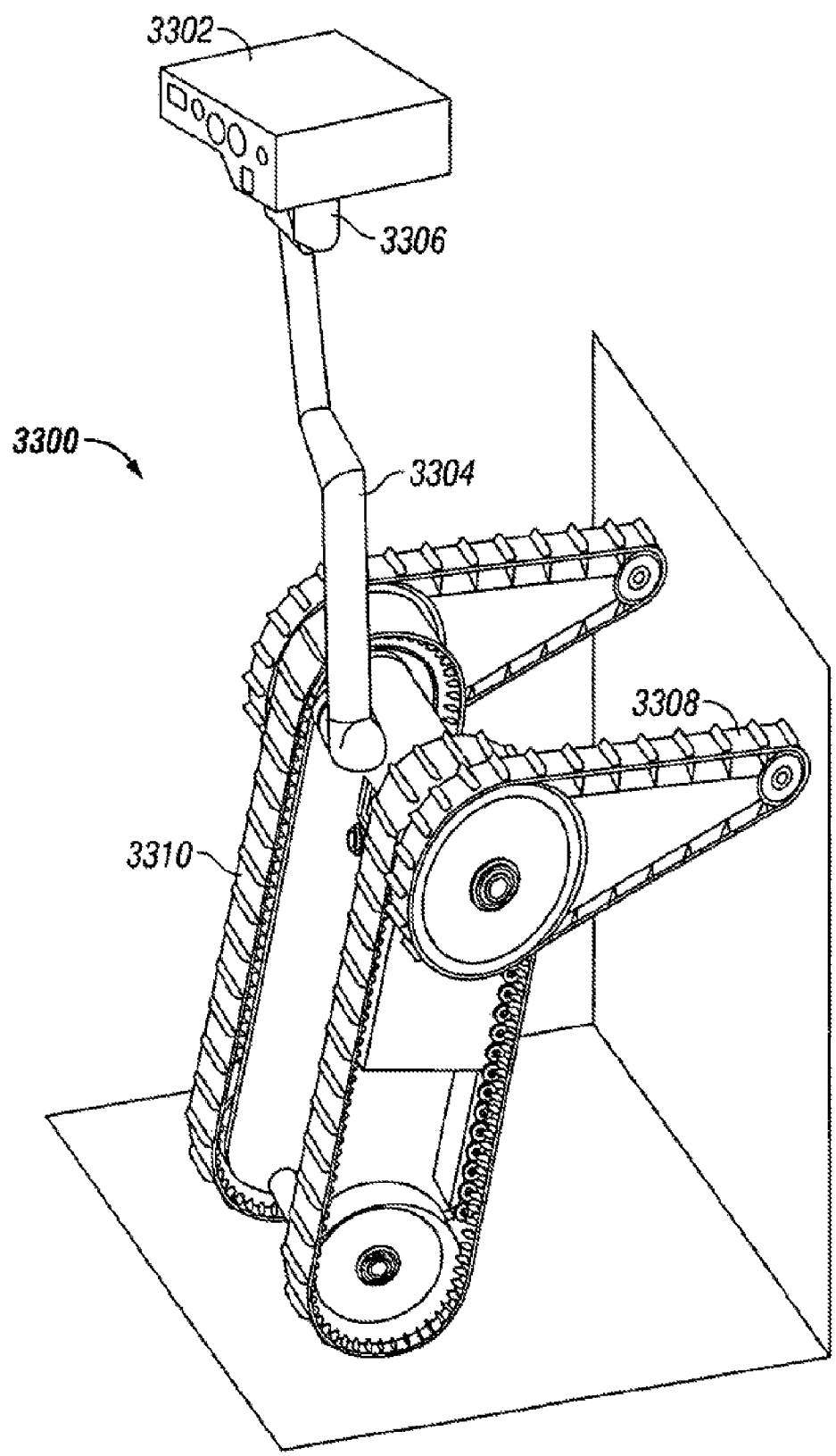
FIG. 48 shows a robot in a high profile observation pose.

FIG. 48 illustrates an example of robot 3300 in another possible position. The depicted robot 3300 is shown "standing" or oriented largely vertically to elevate the sensor head as high as possible. Such a pose may be useful for observation or radio transmission, for example. The depicted pose may be made leaning against a wall or other obstacle, or in some embodiments may be achieved with the use of rear flippers such as those disclosed above. The flipper angle to the wall shown is not exclusive, and a much lower angle may be employ to more align the flippers with the robot chassis. To enter the depicted pose, the robot 3300 may be navigated to contact a wall or other similar surface, and using a set of flipper tracks 3308 the robot 3300 may "climb" up the wall in order to achieve a largely vertical stance. To begin the climbing operation, the neck may be pivoted backward to a position substantially 30° up from its flat, stowed position by actuated joint 4302 (FIG. 27) to help alter the center of gravity for the robot 3300 in order to enhance climbing capability. Preferably, as the chassis climb angle increases, the neck is pivoted upward to eventually reach its depicted angle.

The depicted pose in FIG. 48 may also be described with reference to the position of the various actuated joints shown in FIG. 27. To achieve the depicted pose, pursuant to independent commands propagated along the network to the independent motor modules, flippers 3308 orient themselves downward from a forward position parallel to the chassis. Depending on the obstacle and friction of the surface is involved the angle may be anywhere from 0° to 90° forward rotation. Slight backward rotation may also be used. Referring again to the joints described in FIG. 27, actuated tilt joint 4302 rotates itself to orient the neck at substantially a 165-170° forward rotation, to orient the neck 3304 and substantially vertical position from the ground. Actuated tilt joint 4306 rotates itself to orient the pan link 3306 at a 0° parallel angle to neck 3304. Actuated pan joint 4308 rotates itself to its 180° pan position. In the depicted pose, actuated pan joint 4308 may rotated in all directions for observation. Actuated tilt joint 4310 rotates itself to substantially its 0° tilt position.

Figure 49:
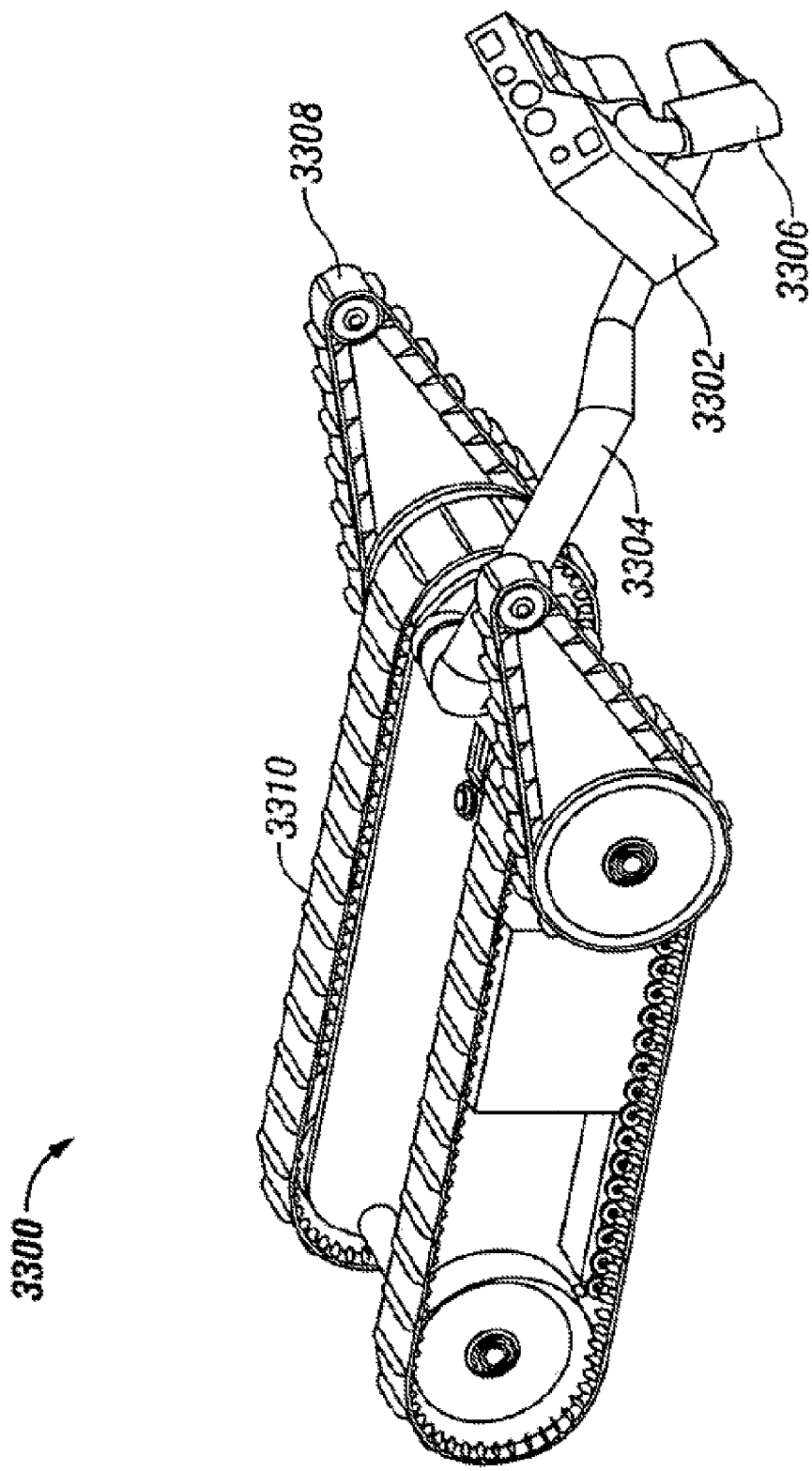
FIG. 49 shows a robot in a pose for inspecting under low obstacles.

FIG. 49 is an illustration that depicts robot 3300 in another possible position. In this example, the robot 3300 is largely horizontal, the neck 3304 is placed in a largely forward position, and the head is in an upward-facing position. This stance may be, useful for inspecting the undersides of objects, for peering upward from underneath an obstacle with low clearance, and other similar tasks.

The depicted pose in FIG. 49 may also be described with reference to the position of the various actuated joints shown in FIG. 27. Actuated tilt joint 4302 rotates itself to orient the neck at substantially a 180 to 190° angle from its 0° position. Actuated tilt joint 4306 rotates itself to orient the pan link to substantially 100 to 115° backward angle from neck 3304. Actuated pan joint 4308, to achieve the depicted pose, rotates itself to substantially a 0° forward pan position. Left and right panning motion may be employed in the depicted pose. Actuated tilt joint 4310 rotates itself to substantially its 35 to 45° backward tilt position.

Figure 50:
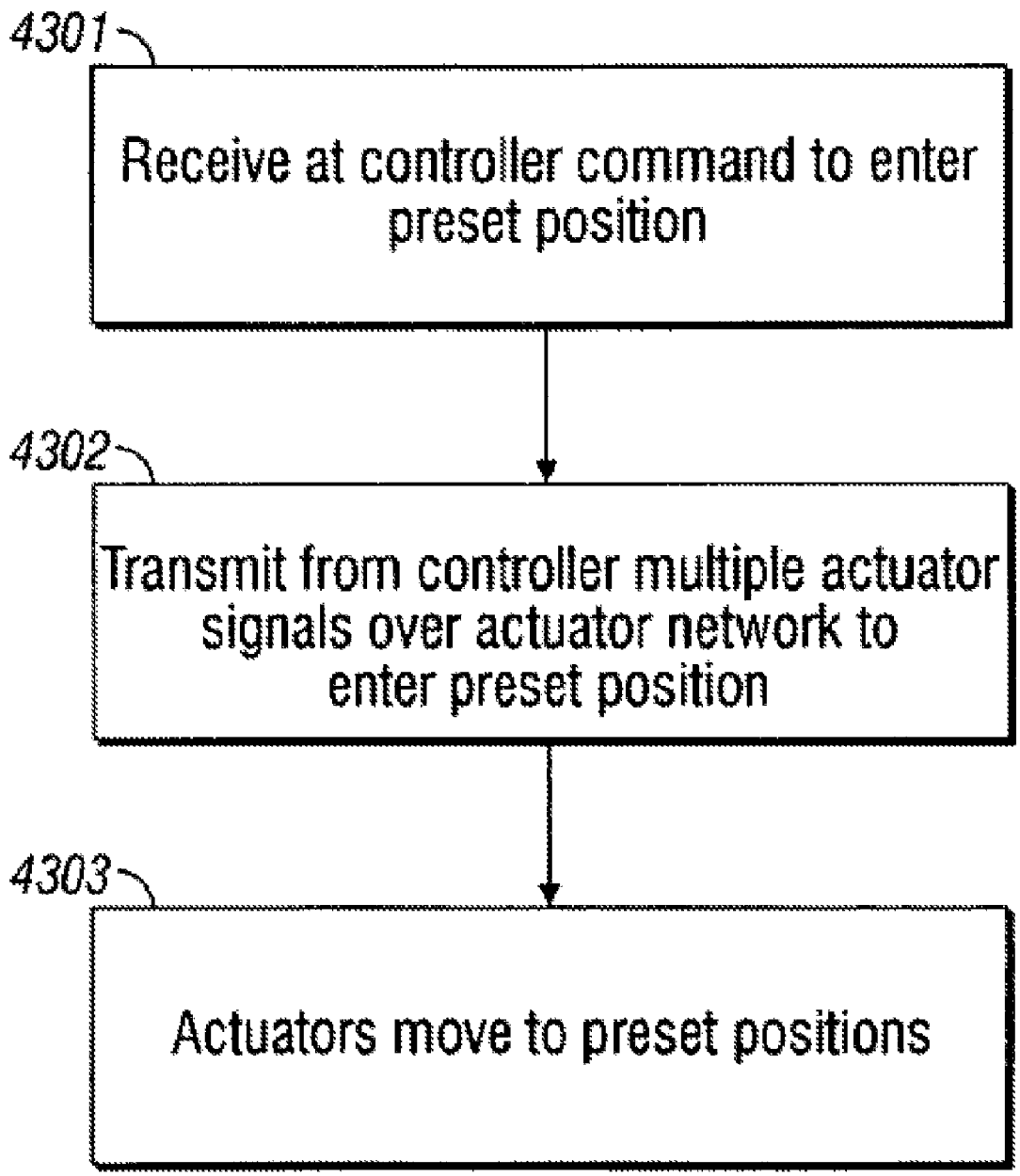
FIG. 50 depicts a flow chart for moving to preset positions.

FIG. 50 depicts a flow chart for moving to preset positions. Any of the positions described herein, and other positions, may be set as preset conditions. Typically, a preset position may be selected by an operator or an autonomous control program in response to operating conditions or scenarios. Preferably, an operator selects preset positions by selecting a preset button or combination, or selecting the position from a control menu as will be further described. In the depicted flow chart, robot 3300 receives a present position command at its control computer in step 4301. Such a command may also be generated by autonomous control programs running on the control computer or a remotely-located control computer. The controller then transmits actuator control signals in step 4302 to enter the preset position. In various embodiments such control signals may take various forms, such as absolute position commands to particular actuators, or the controller may sense a present actuator position and issue relative commands. Such sensing may be left to local actuator control circuitry. The preset position commands may be sent to the shoulder and neck actuators as described herein, but may also move the robot flippers and tracks to certain present positions or movement scenarios. For example, a particular operator command may be present to carry out a specific sequence such as an obstacle climbing sequence involving a series of movements by one or more actuators as well as track movements.

Preferably, actuator position commands are transmitted over a nodded actuator network such as the FARnet network described herein. Other suitable control bus schemes may be used. In step 4303 the various actuators move to their preset positions. Movement may be simultaneous or may be in a pre-designated order necessary to achieve a particular desired movement sequence. For example, for the center of gravity shifting (CG-shifting) positions described herein, certain head and neck movements may be needed in a particular position to achieve desired CG-shifting movements appropriate for particular climbing sequences.

Other robotic vehicle details and features combinable with those described herein may be found in a U.S. Provisional application filed concurrently herewith, entitled "Robotic Vehicle With Dynamic Range Actuators" and assigned Ser. No. 60/878,877, the entire contents of which are hereby incorporated by reference for all purposes.

A number of embodiments of the invention have been described. Nevertheless, it will be understood that various modifications may be made without departing from the spirit and scope of the invention. For example, various construction materials may be used. Further, other techniques besides the depicted neck and head designs may be employed to do center of gravity shifting. Accordingly, other variations are within the scope of the following claims.

What is claimed is:

1. A robot capable of addressing various obstacles, the robot comprising:
   a chassis defining a central open volume and having a chassis center of gravity;
   a steerable drive supporting the chassis;
   a set of driven flippers, each flipper having a proximal end, a distal end, and a flipper center of gravity therebetween, each the proximal end of each flipper coupled to the chassis near the leading end of the chassis;
   a neck having a pivot end, a distal end, and a neck center of gravity therebetween, the neck pivotable about a second pivot axis substantially at the leading end of the chassis, having at least two tilt axis actuators along a length thereof; and
   a sensor head at the distal end of the neck, the head having a pivot end, a distal end, and a head center of gravity therebetween, the head pivotable with respect to the neck about a third pivot axis at the distal end of the neck;
   the neck and sensor head being movable between different configurations including:
   (i) a stable stair ascending position in which the centers of gravity of the head, neck, and flippers are positioned to shift a vertical projection of the overall center of gravity of the robot to at least one step span in front of the rearmost main track ground contact point and at least one step span behind the foremost flipper track ground contact point; and
   (ii) an unstable stair ascending position in which the centers of gravity of the head, neck, and flippers are positioned to shift a vertical projection of the overall center of gravity of the robot to outside the stable range.

2. The robot of claim 1, further comprising a pan link extension having a one-axis actuator along a length thereof, the pan link comprising at least first and second sectional pieces disposed at an angle to offset the sensor head from the neck extension such that the sensor head may move to point the sensor face to a right angle to the neck in a first active position and the sensor head may move to point the sensor face approximately parallel to the neck extension in a second stowed position.

3. The robot of claim 1, wherein the neck includes an offset for receiving the head in line with a portion of the neck in a stowed position in which the head and neck are substantially within a chassis profile.

4. The robot of claim 1, wherein the robot is capable of moving to one or more preset positions in response to a respective single operator command.

5. The robot of claim 1, wherein the head houses at least part of a robot energy storage device.

6. The robot of claim 1, wherein a total weight of the robot is less than about 30 pounds, the sensor head comprises about 15 percent of a total weight of the robot and the neck comprises about 5 percent of a total weight of the robot.

7. The robot of claim 1, wherein the neck extension comprises one or more pass-through regions therein through which one or more power cables are disposed, the one or more power cables providing power from batteries disposed on the chassis or steerable drive to a controller in the sensor head.

8. The robot of claim 7, further comprising a network switch disposed on the chassis, the network switch operably coupled to at least one network cable connected to the sensor head from the chassis through the one or more pass-through regions and operably coupling the network switch to the controller.

9. The robot of claim 7, further comprising power management circuitry disposed on the chassis and operably coupled to circuitry in the sensor head through a power management bus at least partially disposed in the pass-through regions.

10. A robot comprising:
    a chassis
    a steerable drive supporting the chassis;
    a neck extension removably coupled to the chassis by a neck connector;
    a pan link extension having proximal and distal ends and being coupled to the neck extension at the proximal end with a first tilt axis actuator, the pan link extension having a one-axis actuator along a length thereof, the pan link extension having at least one angled bend; and a sensor head coupled to the distal end of the pan link extension with a second tilt axis actuator, the sensor head movable using the first and second tilt axis actuators and the pan one-axis actuator;

wherein the neck connector comprises:
a connector base attached to the chassis;
a neck connector piece attached to the neck extension; and
a tool-less connector configured to releasably couple the connector base to the neck connector piece with substantially zero backlash.

11. The robot of claim 10, wherein the tool-less connector comprises a latch rotatably mounted to a latch base coupled to the chassis.

12. The robot of claim 11, wherein the latch comprises a plunger received by a receiving slot defined by the neck connector piece, the plunger securing the neck connector piece to the connector base.

13. The robot of claim 12, wherein the plunger is threadably received by the latch base and adjustable to for setting a closing force position of the latch.

14. The robot of claim 10, wherein the connector base comprises electrical contacts configured to match with corresponding con electrical contacts of the neck connector.

15. The robot of claim 10, wherein the neck extension comprises one or more pass-through regions therein through which one or more power cables are disposed, the one or more power cables providing power from batteries disposed on the chassis or steerable drive to a controller in the sensor head.

16. The robot of claim 15, further comprising a network switch disposed on the chassis, the network switch operably coupled to at least one network cable connected to the sensor head from the chassis through the one or more pass-through regions and operably coupling the network switch to the controller.

17. The robot of claim 15, further comprising power management circuitry disposed on the chassis and operably coupled to circuitry in the sensor head through a power management bus at least partially disposed in the pass-through regions.

18. The robot of claim 10, wherein the chassis defines a central open volume having a stowage cavity, the sensor head further comprises at least one front sensor face, the neck extension and sensor head moveable into a first upright position in which the sensor face points to substantially a right angle from the neck extension, and a second stowed position, the pan link comprising at least first and second sectional pieces disposed at an angle necessary to offset the sensor head from the neck extension such that the sensor head may move to point the sensor face to approximately parallel to the neck extension.

19. The robot of claim 18, wherein the neck extension comprises at least a first piece and a second offset piece, the offset piece being approximately parallel to the first piece and connected to the first piece such that when the sensor head is in the first stowed position, the offset piece is offset below the first piece.

20. The robot of claim 18, wherein the second tilt axis actuator is rotatable 360 degrees.

21. The robot of claim 18, wherein the first and second tilt actuators and the one-axis actuator each comprise an actuator motor, a motor driver, digital logic circuitry for controlling the motor driver, and transceiver circuitry for communicating with an actuator control bus.

22. The robot of claim 18, further comprising a shoulder tilt actuator coupling the neck extension to the chassis, the shoulder tilt actuator comprising an actuator motor, a motor driver, digital logic circuitry for controlling the motor driver, and transceiver circuitry for communicating with an actuator control bus, the transceiver circuitry of the first tilt axis actuator includes first and second transceivers, the first transceiver for communicating over the actuator control bus to the shoulder tilt actuator, the second transceiver for communicating with the one-axis actuator.

* * * * *

UNITED STATES PATENT AND TRADEMARK OFFICE
CERTIFICATE OF CORRECTION

| | | |
|---|---|---|
| PATENT NO. | : 8,079,432 B2 | Page 1 of 1 |
| APPLICATION NO. | : 12/652478 | |
| DATED | : December 20, 2011 | |
| INVENTOR(S) | : Timothy R. Ohm and Michael Bassett | |

It is certified that error appears in the above-identified patent and that said Letters Patent is hereby corrected as shown below:

IN THE CLAIMS:

Column 28, Claim 10, Line 61;
Delete "chassis" and insert -- chassis; --

Column 29, Claim 14, Line 26;
After "responding", delete "con"

Signed and Sealed this
Twenty-first Day of February, 2012

David J. Kappos
*Director of the United States Patent and Trademark Office*